(12) United States Patent
Wu et al.

(10) Patent No.: US 11,885,944 B2
(45) Date of Patent: Jan. 30, 2024

(54) ZOOM LENS GROUP

(71) Applicant: ZHEJIANG SUNNY OPTICS CO., LTD., Zhejiang (CN)

(72) Inventors: Qi Wu, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 96 days.

(21) Appl. No.: 17/541,278

(22) Filed: Dec. 3, 2021

(65) Prior Publication Data
    US 2022/0179183 A1    Jun. 9, 2022

(30) Foreign Application Priority Data
    Dec. 7, 2020    (CN) .......................... 202011416226.1

(51) Int. Cl.
    *G02B 15/14*    (2006.01)
    *G02B 13/00*    (2006.01)
    *G02B 13/02*    (2006.01)
    *G02B 27/00*    (2006.01)

(52) U.S. Cl.
    CPC ... *G02B 15/143105* (2019.08); *G02B 13/009* (2013.01); *G02B 13/02* (2013.01); *G02B 27/0025* (2013.01)

(58) Field of Classification Search
    CPC .......... G02B 15/143105; G02B 13/009; G02B 13/02; G02B 27/0025; G02B 15/173
    See application file for complete search history.

(56) References Cited

U.S. PATENT DOCUMENTS 5,268,793 A * 12/1993 Saka .............. G02B 15/143105
                                                    359/716
    2018/0164557 A1* 6/2018 Sudo ...................... H04N 23/69

FOREIGN PATENT DOCUMENTS

GB          0473099 A1 * 3/1992 ............... G02B 7/10

* cited by examiner

*Primary Examiner* — Alicia M Harrington
(74) *Attorney, Agent, or Firm* — Yu Gang

(57) ABSTRACT

The disclosure provides a zoom lens group, sequentially including, from an object side to an image side along an optical axis: a first lens group with positive refractive power, including a first lens with refractive power and a second lens with refractive power, which are sequentially arranged along the optical axis; a second lens group with negative refractive power, including a third lens with negative refractive power and a fourth lens with refractive power, which are sequentially arranged along the optical axis; and a third lens group with positive refractive power, including a fifth lens with positive refractive power, a sixth lens with refractive power, a seventh lens with negative refractive power and an eighth lens with refractive power, which are sequentially arranged along the optical axis, Positions of the second lens group and the third lens group on the optical axis are adjustable.

18 Claims, 35 Drawing Sheets

ZOOM LENS GROUP

CROSS-REFERENCE TO RELATED APPLICATION(S)

The present invention claims priority to Chinese Patent Application No. 202011416226.1, filed on Dec. 7, 2020 and entitled "Zoom lens group", the contents of which are hereby incorporated by reference in its entirety.

TECHNICAL FIELD

The disclosure relates to the field of optical elements, and particularly to a zoom lens group.

BACKGROUND

In recent years, with the rapid development of intelligent terminals such as mobile phones, camera function of intelligent terminals such as mobile phones has gradually become one of main directions of competition between various major mobile phone manufacturers, and various mobile phone lenses with high-definition camera functions have become increasingly hot.

An internal structure of a mobile phone lens is usually fixed, namely a single mobile phone lens is a prime lens. In order to realize a zoom function, most mobile phone manufacturers adopt "relay baton" type zoom, namely the zoom function is realized mainly by a combination of "wide-angle lens-main camera lens-telephoto lens". Zoom implemented by such a wide-angle-main camera-telephoto gradual magnification manner is referred to as digital zoom. Since digital zoom is zoom implemented by switching lens assemblies with different focal lengths, a picture may be suddenly changed at a switching point, and a powerful image processing algorithm is needed to alleviate such a sudden change. In addition, zoom from a focal length to another focal length may damage the image quality to make a using effect not so good for a user.

SUMMARY

An embodiment of the disclosure provides a zoom lens group, sequentially including, from an object side to an image side along an optical axis: a first lens group with positive refractive power, including a first lens with refractive power and a second lens with refractive power, which are sequentially arranged along the optical axis; a second lens group with negative refractive power, including a third lens with negative refractive power and a fourth lens with refractive power, which are sequentially arranged along the optical axis; and a third lens group with positive refractive power, including a fifth lens with positive refractive power, a sixth lens with refractive power, a seventh lens with negative refractive power and an eighth lens with refractive power, which are sequentially arranged along the optical axis, wherein both an object-side surface and an image-side surface of the fifth lens are convex surfaces, and both an object-side surface and an image-side surface of the seventh lens are concave surfaces. Positions of the second lens group and the third lens group on the optical axis are adjustable.

In an implementation mode, an effective focal length F1 of the first lens group and an effective focal length $F_3$ of the third lens group may meet $5.0<F1/F3<6.0$.

In an implementation mode, a total effective focal length FT of the zoom lens group in a telephoto state, a total effective focal length FM of the zoom lens group in an intermediate state in a process of switching from a wide-angle state to the telephoto state, a total effective focal length RN of the zoom lens group in the wide-angle state and an effective focal length f8 of the eighth lens may meet $4.2<(FT+FM+FW)/f8<5.0$.

In an implementation mode, an effective focal length f1 of the first lens, an effective focal length f2 of the second lens, an effective focal length f3 of the third lens and an effective focal length f4 of the fourth lens may meet $2.5<(f2-f1)/(f4-f3)<5.5$.

In an implementation mode, an effective focal length f5 of the fifth lens, an effective focal length f6 of the sixth lens, an effective focal length f7 of the seventh lens and an effective focal length f8 of the eighth lens may meet $-3.3<(f5+f6)/(f7+f8)<-2.3$.

In an implementation mode, a center thickness CT5 of the fifth lens on the optical axis, a center thickness CT6 of the sixth lens on the optical axis, a center thickness CT7 of the seventh lens on the optical axis, a center thickness CT8 of the eighth lens on the optical axis and a spacing distance T67 of the sixth lens and the seventh lens on the optical axis may meet $1.6<T67/(CT5+CT6+CT7+CT8)<2.1$.

In an implementation mode, a curvature radius R3 of an object-side surface of the second lens, a curvature radius R4 of an image-side surface of the second lens, a curvature radius R1 of an object-side surface of the first lens and a curvature radius R2 of an image-side surface of the first lens may meet $1.5<(R3+R4)/(R1+R2)<2.0$.

In an implementation mode, a curvature radius R5 of an object-side surface of the third lens, a curvature radius R6 of an image-side surface of the third lens, a curvature radius R7 of an object-side surface of the fourth lens and a curvature radius R8 of an image-side surface of the fourth lens may meet $1.7<(R5+R6)/(R7+R8)<2.7$.

In an implementation mode, a center thickness CT1 of the first lens on the optical axis, a center thickness CT2 of the second lens on the optical axis, a center thickness CT3 of the third lens on the optical axis and a center thickness CT4 of the fourth lens on the optical axis may meet $1.1<(CT1+CT2)/(CT3+CT4)<1.5$.

In an implementation mode, TTL is a distance from an object-side surface of the first lens to an imaging surface of the zoom lens group, TTL and an effective focal length F2 of the second lens group may meet $-2.5<TTL/F2<-2$.

In an implementation mode, a total effective focal length FT of the zoom lens group in a telephoto state and a total effective focal length FW of the zoom lens group in a wide-angle state may meet $2.0<FT/FW<3.0$.

In an implementation mode, at least one of the first lens to the eighth lens is a glass lens. At least one of an object-side surface of the first lens to an image-side surface of the eighth lens is an aspheric mirror surface.

Another aspect of the disclosure provides a zoom lens group, which sequentially includes, from an object side to an image side along an optical axis: a first lens group with positive refractive power, a second lens group with negative refractive power, and a third lens group with positive refractive power. Positions of the second lens group and the third lens group on the optical axis are adjustable. An effective focal length F1 of the first lens group and an effective focal length F3 of the third lens group may meet $5.0<F1/F3<6.0$.

In an implementation mode, the first lens group includes a first lens with refractive power and a second lens with refractive power, which are sequentially arranged along the optical axis. The second lens group includes a third lens with negative refractive power and a fourth lens with refractive power, which are sequentially arranged along the optical axis. The third lens group includes a fifth lens with positive refractive power, a sixth lens with refractive power, a seventh lens with negative refractive power, and an eighth lens with refractive power, which are sequentially arranged along the optical axis, wherein both an object-side surface and an image-side surface of the fifth lens are convex surfaces, and both an object-side surface and an image-side surface of the seventh lens are concave surfaces.

In an implementation mode, a total effective focal length FT of the zoom lens group in a telephoto state, a total effective focal length FM of the zoom lens group in an intermediate state in a process of switching from a wide-angle state to the telephoto state, a total effective focal length RN of the zoom lens group in the wide-angle state and an effective focal length f8 of the eighth lens may meet 4.2<(FT+FM+FW)/f8<5.0.

In an implementation mode, an effective focal length f1 of the first lens, an effective focal length f2 of the second lens, an effective focal length f3 of the third lens and an effective focal length f4 of the fourth lens may meet 2.5<(f2−f1)/(f4−f3)<5.5.

In an implementation mode, an effective focal length f5 of the fifth lens, an effective focal length f6 of the sixth lens, an effective focal length f7 of the seventh lens and an effective focal length f8 of the eighth lens may meet −3.3<(f5+f6)/(f7+f8)<−2.3.

In an implementation mode, a center thickness CT5 of the fifth lens on the optical axis, a center thickness CT6 of the sixth lens on the optical axis, a center thickness CT7 of the seventh lens on the optical axis, a center thickness CT8 of the eighth lens on the optical axis and a spacing distance T67 of the sixth lens and the seventh lens on the optical axis may meet 1.6<T67/(CT5+CT6+CT7+CT8)<2.1.

In an implementation mode, a curvature radius R3 of an object-side surface of the second lens, a curvature radius R4 of an image-side surface of the second lens, a curvature radius R1 of an object-side surface of the first lens and a curvature radius R2 of an image-side surface of the first lens may meet 1.5<(R3+R4)/(R1+R2)<2.0.

In an implementation mode, a curvature radius R5 of an object-side surface of the third lens, a curvature radius R6 of an image-side surface of the third lens, a curvature radius R7 of an object-side surface of the fourth lens and a curvature radius R8 of an image-side surface of the fourth lens may meet 1.7<(R5+R6)/(R7+R8)<2.7.

In an implementation mode, a center thickness CT1 of the first lens on the optical axis, a center thickness CT2 of the second lens on the optical axis, a center thickness CT3 of the third lens on the optical axis and a center thickness CT4 of the fourth lens on the optical axis may meet 1.1<(CT1+CT2)/(CT3+CT4)<1.5.

In an implementation mode, TTL is a distance from an object-side surface of the first lens to an imaging surface of the zoom lens group, and TTL and an effective focal length F2 of the second lens group may meet −2.5<TTL/F2<−2.

In an implementation mode, a total effective focal length FT of the zoom lens group in a telephoto state and a total effective focal length FW of the zoom lens group in a wide-angle state may meet 2.0<FT/FW<3.0.

In an implementation mode, at least one of the first lens to the eighth lens is a glass lens. At least one of an object-side surface of the first lens to an image-side surface of the eighth lens is an aspheric mirror surface.

According to the disclosure, the refractive power is reasonably configured, and optical parameters are optimized, so that the provided zoom lens group may implement continuous zoom and smooth picture transition in a zoom process, and is small and high in imaging quality.

BRIEF DESCRIPTION OF THE DRAWINGS

The other features, objectives and advantages of the disclosure become more apparent upon reading detailed descriptions made to unrestrictive implementation modes with reference to the following drawings.

DETAILED DESCRIPTION OF THE EMBODIMENTS

Figure 1:
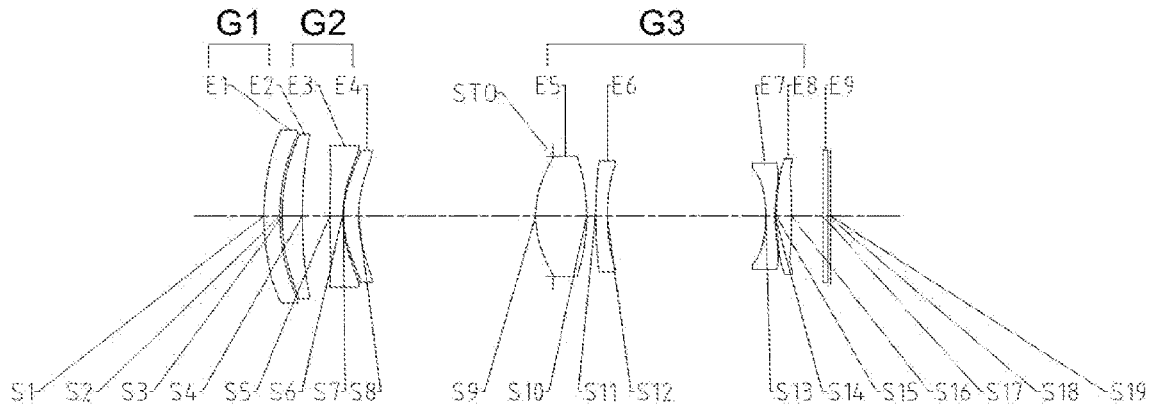
FIG. 1 shows a structure diagram of a zoom lens group in a wide-angle state according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, and the like are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It should also be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

A zoom lens group according to an exemplary implementation mode of the disclosure may include three lens groups with refractive power, i.e., a first lens group, a second lens group, and a third lens group respectively. The three lens groups are sequentially arranged from an object side to an image side along an optical axis. Both the second lens group and the third lens group may move on the optical axis. Positions of the second lens group and the third lens group on the optical axis may be changed to implement continuous zoom of the zoom lens group.

In an exemplary implementation mode, the zoom lens group may further include an optical filter configured to correct a chromatic aberration and/or protective glass configured to protect a photosensitive element on an imaging surface. Positions of the second lens group, the third lens group and the optical filter and/or protective glass may be changed to implement continuous zoom of the zoom lens group.

In an exemplary implementation mode, a focal length of the zoom lens group is changed when the second lens group moves on the optical axis, so an additional optical path difference is generated for light arriving at the imaging surface, which results in the reduction of the image quality. In such case, the position of the third lens group on the optical axis is synchronously adjusted to compensate the optical path difference generated by the second lens group to keep stable image quality.

The zoom lens group according to the exemplary implementation mode of the disclosure may include eight lenses with refractive power, i.e., a first lens, a second lens, a third lens, a fourth lens, a fifth lens, a sixth lens, a seventh lens, and an eighth lens respectively. The eight lenses are sequentially arranged from the object side to the image side along the optical axis. The first lens and the second lens may form the first lens group. The third lens and the fourth lens may form the second lens group. The fifth lens, the sixth lens, the seventh lens and the eighth lens may form the third lens group.

In an exemplary implementation mode, the first lens group may have positive refractive power, the second lens group may have negative refractive power, and the third lens group may have positive refractive power.

In an exemplary implementation mode, the first lens may have positive refractive power or negative refractive power. The second lens may have positive refractive power or negative refractive power. The third lens may have negative refractive power. The fourth lens may have positive refractive power or negative refractive power. The fifth lens may have positive refractive power, and an object-side surface thereof may be a convex surface while an image-side surface may be a convex surface. The sixth lens may have positive refractive power or negative refractive power. The seventh lens may have negative refractive power, and an object-side surface thereof may be a concave surface while an image-side surface may be a concave surface. The eighth lens may have positive refractive power or negative refractive power.

In an exemplary implementation mode, the zoom lens group according to the disclosure may meet $5.0<F1/F3<6.0$, wherein F1 is an effective focal length of the first lens group, and F3 is an effective focal length of the third lens group. More specifically, F1 and F3 may further meet $5.2<F1/F3<5.5$. Meeting $5.0<F1/F3<6.0$ is favorable for configuring the refractive power of each lens reasonably and reducing an aberration.

In an exemplary implementation mode, the zoom lens group according to the disclosure may meet $4.2<(FT+FM+FW)/f8<5.0$, wherein FT is a total effective focal length of the zoom lens group in a telephoto state, FM is a total effective focal length of the zoom lens group in an intermediate state in a process of switching from a wide-angle state to the telephoto state, FW is a total effective focal length of the zoom lens group in the wide-angle state, and f8 is an effective focal length of the eighth lens. More specifically, FT, FM, FW and f8 may further meet $4.3<(FT+FM+FW)/f8<5.0$. Meeting $4.2<(FT+FM+FW)/f8<5.0$ is favorable for the eighth lens to compensate an optical path difference to ensure the image quality.

In an exemplary implementation mode, the zoom lens group according to the disclosure may meet $2.5<(f2-f1)/(f4-f3)<5.5$, wherein f1 is an effective focal length of the first lens, f2 is an effective focal length of the second lens, f3 is an effective focal length of the third lens, and f4 is an effective focal length of the fourth lens. More specifically, f2, f1, f4 and f3 may further meet $2.7<(f2-f1)/(f4-f3)<5.5$. Meeting $2.5<(f2-f1)/(f4-f3)<5.5$ is favorable for configuring the refractive power of each lens reasonably and reducing an aberration.

In an exemplary implementation mode, the zoom lens group according to the disclosure may meet $-3.3<(f5+f6)/(f7+f8)<-2.3$, wherein f5 is an effective focal length of the fifth lens, f6 is an effective focal length of the sixth lens, f7 is an effective focal length of the seventh lens, and f8 is an effective focal length of the eighth lens. More specifically, f5, f6, f7 and f8 may further meet $-3.2<(f5+f6)/(f7+f8)<-2.6$. Meeting $-3.3<(f5+f6)/(f7+f8)<-2.3$ is favorable for configuring the refractive power of each lens reasonably and reducing an aberration.

In an exemplary implementation mode, the zoom lens group according to the disclosure may meet $1.6<T67/(CT5+CT6+CT7+CT8)<2.1$, wherein CT5 is a center thickness of the fifth lens on the optical axis, CT6 is a center thickness of the sixth lens on the optical axis, CT7 is a center thickness of the seventh lens on the optical axis, CT8 is a center thickness of the eighth lens on the optical axis, and T67 is a spacing distance of the sixth lens and the seventh lens on the optical axis. More specifically, T67, CT5, CT6, CT7 and CT8 may further meet $1.7<T67/(CT5+CT6+CT7+CT8)<2.0$. Meeting $1.6<T67/(CT5+CT6+CT7+CT8)<2.1$ is favorable for the spatial distribution of each lens.

In an exemplary implementation mode, the zoom lens group according to the disclosure may meet $1.5<(R3+R4)/(R1+R2)<2.0$, wherein R3 is a curvature radius of an object-side surface of the second lens, R4 is a curvature radius of an image-side surface of the second lens, R1 is a curvature radius of an object-side surface of the first lens, and R2 is a curvature radius of an image-side surface of the first lens. More specifically, R3, R4, R1 and R2 may further meet $1.6<(R3+R4)/(R1+R2)<2.0$. Meeting $1.5<(R3+R4)/(R1+R2)<2.0$ is favorable for adjusting contributions of the first lens and the second lens to an aberration of the zoom lens group reasonably.

In an exemplary implementation mode, the zoom lens group according to the disclosure may meet $1.7<(R5+R6)/(R7+R8)<2.7$, wherein R5 is a curvature radius of an object-side surface of the third lens, R6 is a curvature radius of an image-side surface of the third lens, R7 is a curvature radius of an object-side surface of the fourth lens, and R8 is a curvature radius of an image-side surface of the fourth lens. More specifically, R5, R6, R7 and R8 may further meet $1.9<(R5+R6)/(R7+R8)<2.6$. Meeting $1.7<(R5+R6)/(R7+R8)<2.7$ is favorable for adjusting contributions of the third lens and the fourth lens to an aberration of the zoom lens group reasonably.

In an exemplary implementation mode, the zoom lens group according to the disclosure may meet $1.1<(CT1+CT2)/(CT3+CT4)<1.5$, wherein CT1 is a center thickness of the first lens on the optical axis, CT2 is a center thickness of the second lens on the optical axis, CT3 is a center thickness of the third lens on the optical axis, and CT4 is a center thickness of the fourth lens on the optical axis. More specifically, CT1, CT2, CT3 and CT4 may further meet $1.2<(CT1+CT2)/(CT3+CT4)<1.4$. Meeting $1.1<(CT1+CT2)/(CT3+CT4)<1.5$ is favorable for avoiding the spatial distribution of the lenses being affected by excessively large thicknesses of the lenses and conveniently assembling the zoom lens group.

In an exemplary implementation mode, the zoom lens group according to the disclosure may meet $-2.5<TTL/F2<-2$, wherein TTL is a distance from an object-side surface of the first lens to an imaging surface of the zoom lens group on the optical axis, and F2 is an effective focal length of the second lens group. More specifically, TTL and F2 may further meet $-2.4<TTL/F2<-2.2$. Meeting $-2.5<TTL/F2<-2$ is favorable for keeping the focal length of the second lens group in a reasonable range, thereby facilitating the control over a zoom range of the whole lens group.

In an exemplary implementation mode, the zoom lens group according to the disclosure may meet $2.0<FT/FW<3.0$, wherein FT is a total effective focal length of the zoom lens group in a telephoto state, and FW is a total effective focal length of the zoom lens group in a wide-angle state. More specifically, FT and FW may further meet $2.5<FT/FW<2.7$. Meeting $2.0<FT/FW<3.0$ is favorable for the zoom lens group to implement 2× to 3× optical continuous zoom.

In an exemplary implementation mode, at least one of the first lens to the eighth lens is a glass lens. At least one of an object-side surface of the first lens to an image-side surface of the eighth lens is an aspheric mirror surface. Preferably, at least one surface in the glass lens is an aspheric mirror surface. A glass lens with an aspheric mirror surface may correct a chromatic aberration of the lens group better, and meanwhile, is favorable for improving a temperature drift effect.

In an exemplary implementation mode, the zoom lens group according to the disclosure may further include a diaphragm arranged between the second lens group and the third lens group. For example, the diaphragm may be arranged at the object-side surface of the fifth lens close to the second lens in the third lens group. The disclosure discloses a zoom lens group with the characteristics of continuous zoom, smooth picture transition in a zoom process, small size, high imaging quality, etc. The zoom lens group provided in the disclosure is a purely optical zoom lens group which realizes a zoom function by changing an internal structure of a lens assembly. The focal length of the lens group is changed to implement smooth transition of the image quality in a continuous zoom process (for example, from the wide-angle state to the telephoto state), and the problem of high damage rate of the image quality when the lens group is in the telephoto state may be solved effectively. Under the same condition, a wider hybrid zoom range may be achieved in combination with digital zoom.

The zoom lens group according to the implementation mode of the disclosure may adopt multiple lenses, for example, the above-mentioned eight. The refractive power and surface types of each lens, the center thickness of each lens, on-axis distances between the lenses and the like may be reasonably configured to effectively converge incident light, reduce the optical total length of the imaging lens assembly, improve the machinability of the imaging lens assembly and ensure that the zoom lens group is more favorable for production and machining.

In the implementation mode of the disclosure, at least one of mirror surfaces of each lens is an aspheric mirror surface, namely at least one mirror surface in an object-side surface of the first lens to an image-side surface of the eighth lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With the adoption of the aspheric lens, astigmatic aberrations during imaging may be eliminated as much as possible, thereby improving the imaging quality. Optionally, at least one of the object-side surface and an image-side surface of each lens in the first lens, the second lens, the third lens, the fourth lens, the fifth lens, the sixth lens, the seventh lens, and the eighth lens is an aspheric mirror surface. Optionally, both the object-side surface and an image-side surface of each lens in the first lens, the second lens, the third lens, the fourth lens, the fifth lens, the sixth lens, the seventh lens and the eighth lens are aspheric mirror surfaces. Optionally, both the object-side surface and an image-side surface of the first lens are spherical mirror surfaces; and both the object-side surface and an image-side surface of each lens in the second lens, the third lens, the fourth lens, the fifth lens, the sixth lens, the seventh lens and the eighth lens are aspheric mirror surfaces.

However, those skilled in the art should know that the number of the lenses forming the zoom lens group may be changed without departing from the technical solutions claimed in the disclosure to achieve each result and advantage described in the specification. For example, although descriptions are made in the implementation with eight lenses as an example, the zoom lens group is not limited to eight lenses. If necessary, the zoom lens group may further include another number of lenses.

Specific embodiments applied to the zoom lens group of the above-mentioned implementation mode will further be described below with reference to the drawings.

Embodiment 1

Figure 2:
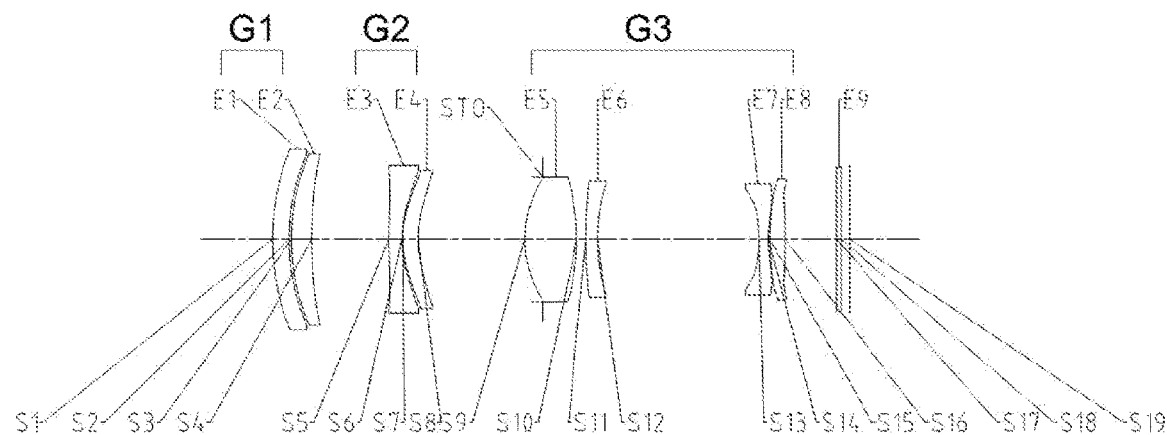
FIG. 2 shows a structure diagram of a zoom lens group in an intermediate state in a process of switching from a wide-angle state to a telephoto state according to embodiment 1 of the disclosure.
Figure 3:
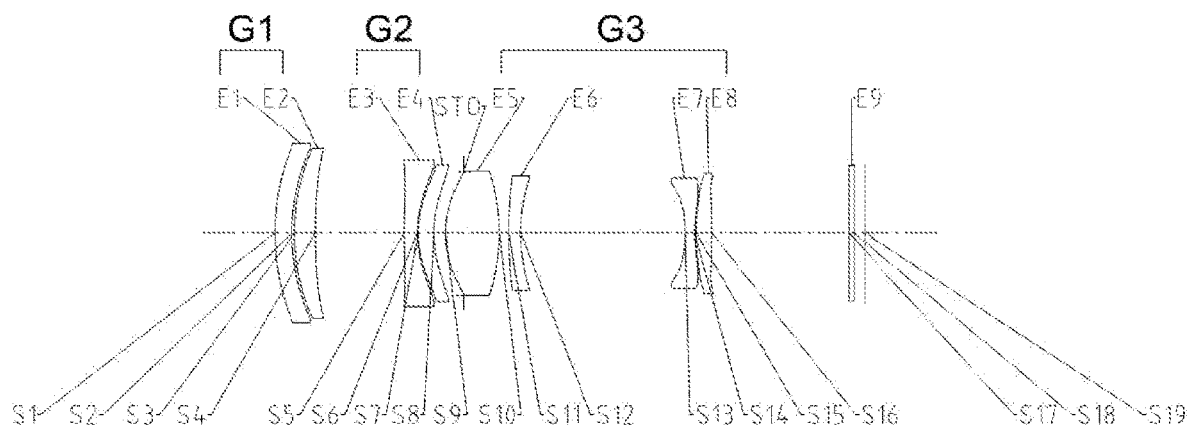
FIG. 3 shows a structure diagram of a zoom lens group in a telephoto state according to embodiment 1 of the disclosure.

A zoom lens group according to embodiment 1 of the disclosure will be described below with reference to FIGS. 1 to 6D. FIG. 1 shows a structure diagram of a zoom lens group in a wide-angle state according to embodiment 1 of the disclosure. FIG. 2 shows a structure diagram of a zoom lens group in an intermediate state in a process of switching from a wide-angle state to a telephoto state according to embodiment 1 of the disclosure. FIG. 3 shows a structure diagram of a zoom lens group in a telephoto state according to embodiment 1 of the disclosure.

As shown in FIGS. 1 to 3, the zoom lens group sequentially includes, from an object side to an image side, a first lens group G1 (a first lens E1 and a second lens E2), a second lens group G2 (a third lens E3 and a fourth lens E4), a diaphragm STO, a third lens group G3 (a fifth lens E5, a sixth lens E6, a seventh lens E7, and an eighth lens E8), an optical filter E9, and an imaging surface S19.

An object-side surface S1 of the first lens E1 is a convex surface, while an image-side surface S2 is a concave surface. An object-side surface S3 of the second lens E2 is a convex surface, while an image-side surface S4 is a concave surface. An object-side surface S5 of the third lens E3 is a convex surface, while an image-side surface S6 is a concave surface. An object-side surface S7 of the fourth lens E4 is a convex surface, while an image-side surface S8 is a concave surface. An object-side surface S9 of the fifth lens E5 is a convex surface, while an image-side surface S10 is a convex surface. The diaphragm STO may be arranged at the object-side surface S9 of the fifth lens E5. An object-side surface S11 of the sixth lens E6 is a convex surface, while an image-side surface S12 is a concave surface. An object-side surface S13 of the seventh lens E7 is a concave surface, while an image-side surface S14 is a concave surface. An object-side surface S15 of the eighth lens E8 is a convex surface, while an image-side surface S16 is a convex surface. The optical filter E9 has an object-side surface S17 and an image-side surface S18. Light from an object sequentially penetrates through each of the surfaces S1 to S18 and is finally imaged on the imaging surface S19.

Table 1 shows a basic parameter table of the zoom lens group of embodiment 1, and units of the curvature radius, the thickness/distance and the focal length are all millimeter (mm).

TABLE 1

| Surface number | Surface type | Curvature radius | Thickness/ distance | Material Refractive index | Abbe number | Conic coefficient |
|---|---|---|---|---|---|---|
| OBJ | Spherical | Infinite | Infinite | | | |
| S1 | Aspheric | 10.9723 | 0.7166 | 1.66 | 20.4 | 0.8337 |
| S2 | Aspheric | 10.0224 | 0.1001 | | | 0.4928 |
| S3 | Aspheric | 10.0224 | 0.8639 | 1.54 | 56.1 | 0.4928 |
| S4 | Aspheric | 25.2412 | D4 | | | 22.7826 |
| S5 | Aspheric | 17.9429 | 0.5500 | 1.69 | 53.2 | −52.8305 |
| S6 | Aspheric | 4.5106 | 0.0350 | | | 0.1121 |
| S7 | Aspheric | 4.2635 | 0.6500 | 1.66 | 20.4 | −0.5210 |
| S8 | Aspheric | 4.7097 | D8 | | | −1.4904 |
| STO | Spherical | Infinite | −0.7539 | | | |
| S9 | Aspheric | 4.3315 | 2.2200 | 1.50 | 81.6 | 0.0549 |
| S10 | Aspheric | −7.6760 | 0.3792 | | | 1.7550 |
| S11 | Aspheric | 16.0379 | 0.5000 | 1.67 | 19.2 | 23.4942 |
| S12 | Aspheric | 7.2793 | 6.8132 | | | 0.6293 |
| S13 | Aspheric | −6.7814 | 0.4000 | 1.54 | 56.1 | 8.4150 |
| S14 | Aspheric | 5.9268 | 0.0599 | | | −6.2328 |
| S15 | Aspheric | 7.6922 | 0.6446 | 1.67 | 19.2 | −1.2554 |
| S16 | Aspheric | −221.1089 | D17 | | | 99.0000 |
| S17 | Spherical | Infinite | 0.2100 | 1.52 | 64.2 | |
| S18 | Spherical | Infinite | D19 | | | |
| S19 | Spherical | Infinite | | | | |

In the example, positions of the second lens group, the third lens group and the optical filter may be changed to implement continuous zoom of the zoom lens group. In other words, a spacing distance D4 of the first lens group and the second lens group on an optical axis (i.e., a spacing distance from the image-side surface of the second lens E2 to the object-side surface of the third lens E3 on the optical axis), a spacing distance D8 of the second lens group and the third lens group on the optical axis (i.e., a spacing distance from the image-side surface of the fourth lens E4 to the image-side surface of the fifth lens E5 on the optical axis), a spacing distance D17 of the third lens group and the optical filter on the optical axis (i.e., a spacing distance from the image-side surface of the eighth lens E8 to the object-side surface of the optical filter E9 on the optical axis) and a spacing distance D19 of the optical filter and the imaging surface on the optical axis (i.e., a spacing distance from the image-side surface of the optical filter E9 to the imaging surface S19 on the optical axis) are changed to switch the zoom lens group from the wide-angle state to the telephoto state or from the telephoto state to the wide-angle state. A total effective focal length F, maximum field of view (FOV) and F-number (Fno) of the zoom lens group are changed as the zoom lens group is switched from the wide-angle state to the telephoto state or from the telephoto state to the wide-angle state.

Table 2 shows a parameter table changed according to different states of the zoom lens group according to embodiment 1. The units of F, D4, D8, D17 and D19 are all millimeter (mm), and the unit of FOV is degree (°).

TABLE 2

| | F | FOV | Fno | D4 | D8 | D17 | D19 |
|---|---|---|---|---|---|---|---|
| Wide-angle state | 10.07 | 33.6 | 2.61 | 1.18 | 7.61 | 1.36 | 0.12 |
| Intermediate state | 14.38 | 22.9 | 3.00 | 3.25 | 4.5 | 2.17 | 0.35 |
| Telephoto state | 26.02 | 12.9 | 4.34 | 3.66 | 0.48 | 5.68 | 0.45 |

In the example, TTL is a total length of the zoom lens group (i.e., a distance from the object-side surface S1 of the first lens E1 to the imaging surface S19 of the zoom lens group on the optical axis), and TTL is 24.41 mm. ImgH is a half of a diagonal length of an effective pixel region on the imaging surface S19 of the zoom lens group, and ImgH is 2.90 mm.

In embodiment 1, both the object-side surface and an image-side surface of each of the first lens E1 to the eighth lens E8 are aspheric surfaces, and a surface type x of each aspheric lens may be defined through, but not limited to, the following aspheric surface formula:

$$x = \frac{ch^2}{1 + \sqrt{1 - (k+1)c^2 h^2}} + \sum A_i h^i, \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a conic coefficient; and Ai is a correction coefficient of the i-th order of the aspheric surface. Table 3 shows high-order coefficients $A_4$, $A_6$, $A_8$, $A_{10}$, $A_{12}$, $A_{14}$, $A_{16}$, $A_{18}$ and $A_{20}$ that can be used for the aspheric mirror surfaces S1-S16 in embodiment 1.

TABLE 3

| Surface number | A4 | A6 | A8 | A10 | A12 |
|---|---|---|---|---|---|
| S1 | 2.2290E−03 | −2.6531E−03 | 1.9709E−03 | −8.8438E−04 | 2.6088E−04 |
| S2 | 1.3581E−02 | −1.9472E−02 | 1.5251E−02 | −7.2583E−03 | 2.2621E−03 |
| S3 | 1.3581E−02 | −1.9472E−02 | 1.5251E−02 | −7.2583E−03 | 2.2621E−03 |
| S4 | −1.4491E−04 | 8.5692E−04 | −8.0331E−04 | 4.8065E−04 | −1.8958E−04 |
| S5 | −4.4783E−03 | 3.2929E−04 | −1.6556E−05 | 5.9173E−07 | 0.0000E+00 |
| S6 | −4.3744E−03 | −3.2368E−04 | 3.7160E−05 | 5.1393E−07 | −2.0512E−07 |
| S7 | −2.9419E−03 | 1.6976E−03 | −1.8058E−03 | 2.0905E−04 | 9.4754E−04 |
| S8 | −6.2521E−03 | 5.3170E−03 | −7.2009E−03 | 6.2934E−03 | −3.5159E−03 |
| S9 | −1.0665E−03 | −7.0051E−05 | −8.3092E−06 | 6.6590E−07 | −9.9135E−08 |
| S10 | 3.4291E−03 | −6.6902E−04 | 1.3050E−04 | −1.3952E−05 | 5.6938E−07 |
| S11 | −3.9469E−03 | 6.0850E−03 | −1.4970E−02 | 2.2460E−02 | −2.2245E−02 |
| S12 | −5.3293E−03 | 1.3651E−02 | −3.9881E−02 | 7.3767E−02 | −8.9310E−02 |
| S13 | −5.5341E−03 | 3.5324E−03 | 1.5259E−02 | −9.0114E−02 | 1.8988E−01 |
| S14 | −9.3421E−02 | 3.9629E−01 | −7.6526E−01 | 7.8270E−01 | −4.4320E−01 |
| S15 | −8.5357E−02 | 3.1409E−01 | −5.4448E−01 | 4.4799E−01 | −1.0813E−01 |
| S16 | −2.5438E−02 | 6.1623E−02 | −1.1390E−01 | 1.2840E−01 | −9.6499E−02 |

| Surface number | A14 | A16 | A18 | A20 |
|---|---|---|---|---|
| S1 | −5.3094E−05 | 7.6422E−06 | −7.8142E−07 | 5.5678E−08 |
| S2 | −4.8073E−04 | 7.0636E−05 | −7.0549E−06 | 4.4249E−07 |
| S3 | −4.8073E−04 | 7.0636E−05 | −7.0549E−06 | 4.4249E−07 |
| S4 | 5.0329E−05 | −9.0281E−06 | 1.0653E−06 | −7.4343E−08 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |
| S7 | −9.4169E−04 | 4.7741E−04 | −1.5381E−04 | 3.3507E−05 |
| S8 | 1.2718E−03 | −2.8812E−04 | 3.3895E−05 | 7.6185E−07 |
| S9 | 0.0000E+00 | 0.0000E+00 | 0.0000E+00 | 0.0000E+00 |
| S10 | 0.0000E+00 | 0.0000E+00 | 0.0000E+00 | 0.0000E+00 |
| S11 | 1.5214E−02 | −7.3713E−03 | 2.5663E−03 | −6.4407E−04 |
| S12 | 7.3923E−02 | −4.3039E−02 | 1.7913E−02 | −5.3542E−03 |
| S13 | −2.3116E−01 | 1.8392E−01 | −1.0071E−01 | 3.8781E−02 |
| S14 | 1.1425E−01 | 1.5813E−02 | −2.3403E−02 | 8.7226E−03 |
| S15 | −1.2322E−01 | 1.3990E−01 | −7.2035E−02 | 2.2981E−02 |
| S16 | 5.2123E−02 | −2.1206E−02 | 6.6410E−03 | −1.5952E−03 |

Figure 4A:
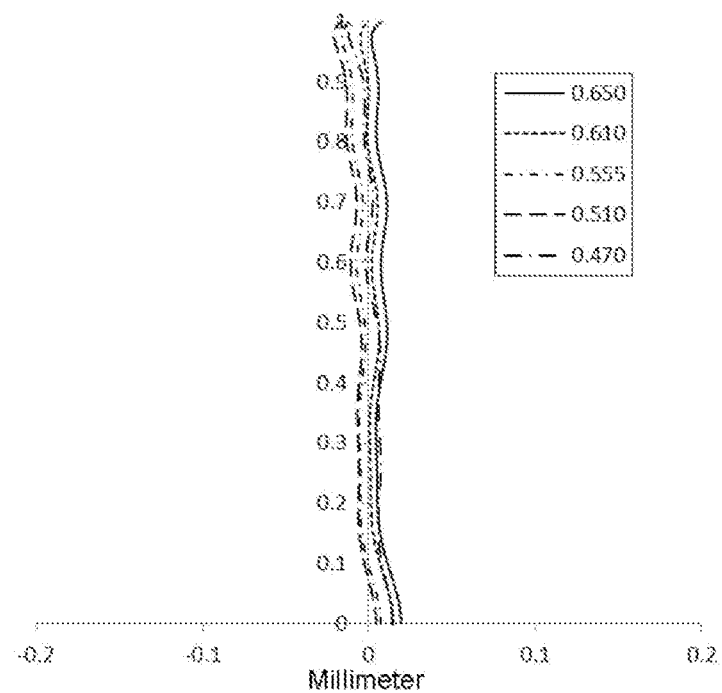
FIGS. 4A to 4D show a longitudinal aberration curve, an astigmatism curve, a distortion curve and a lateral color curve of a zoom lens group in a wide-angle state according to embodiment 1 respectively.
Figure 4B:
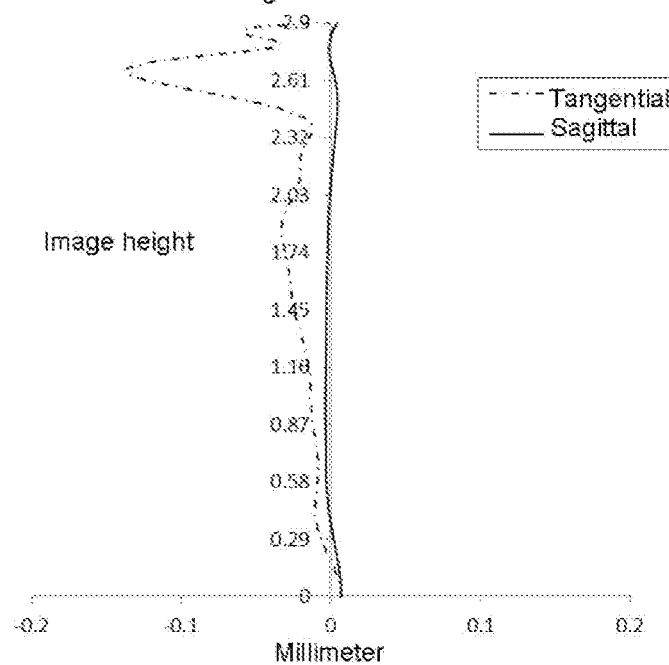
Figure 4C:
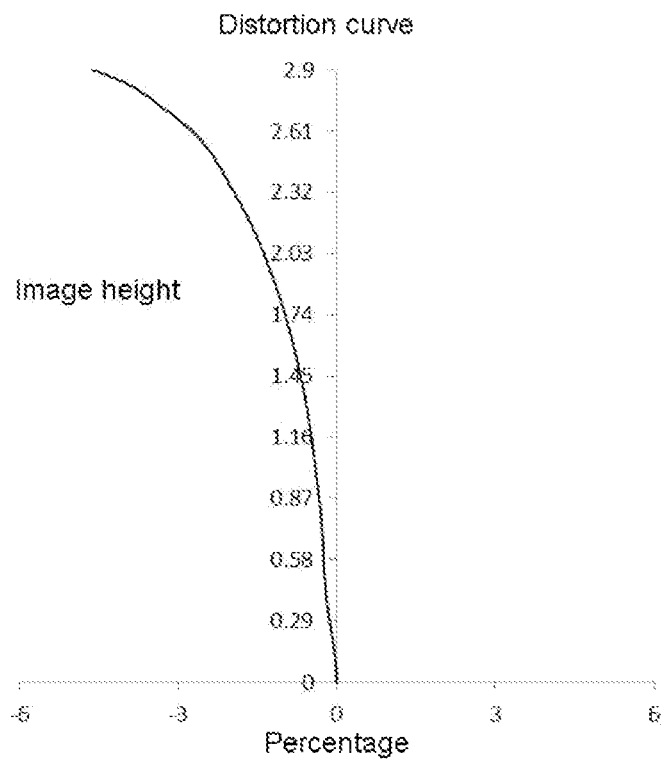
Figure 4D:
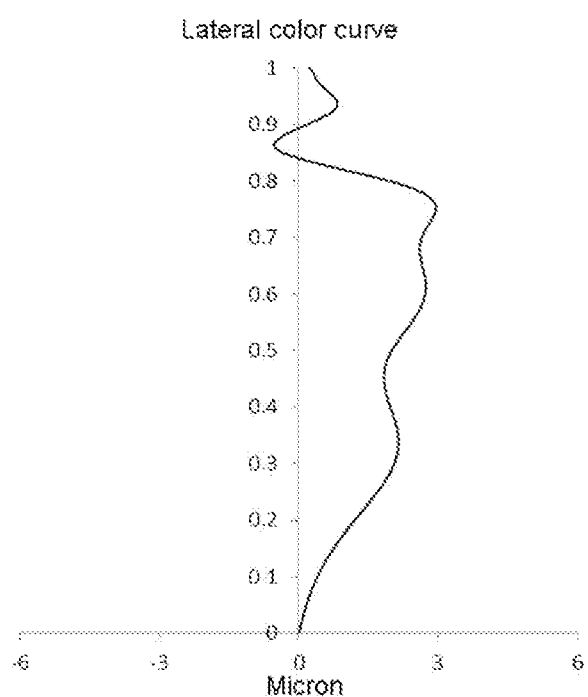
Figure 5A:
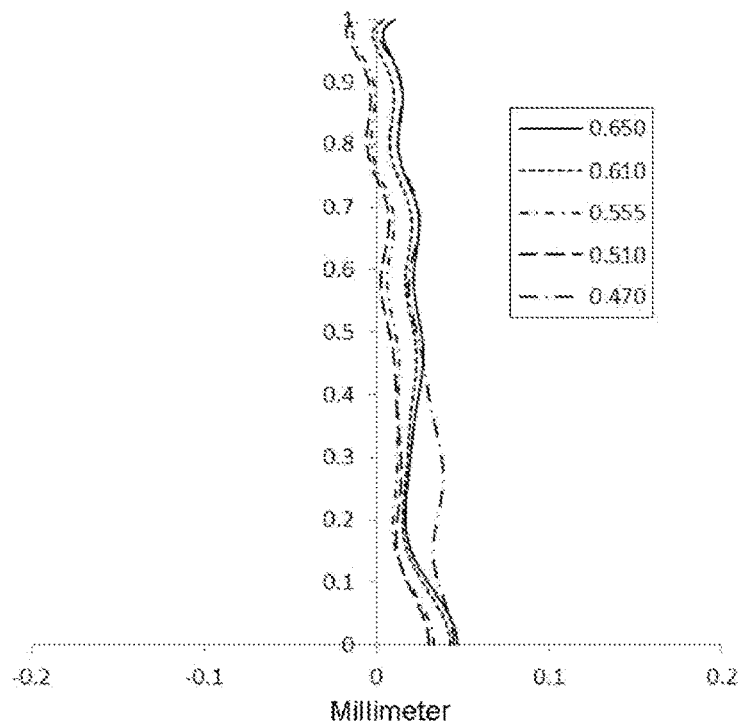
FIGS. 5A to 5D show a longitudinal aberration curve, an astigmatism curve, a distortion curve and a lateral color curve of a zoom lens group in an intermediate state in a process of switching from a wide-angle state to a telephoto state according to embodiment 1 respectively.
Figure 5B:
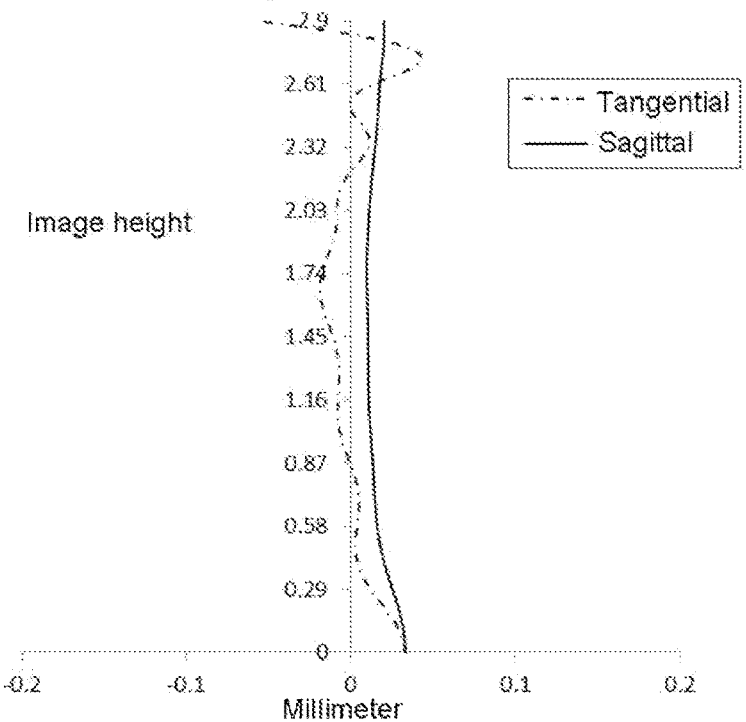
Figure 5C:
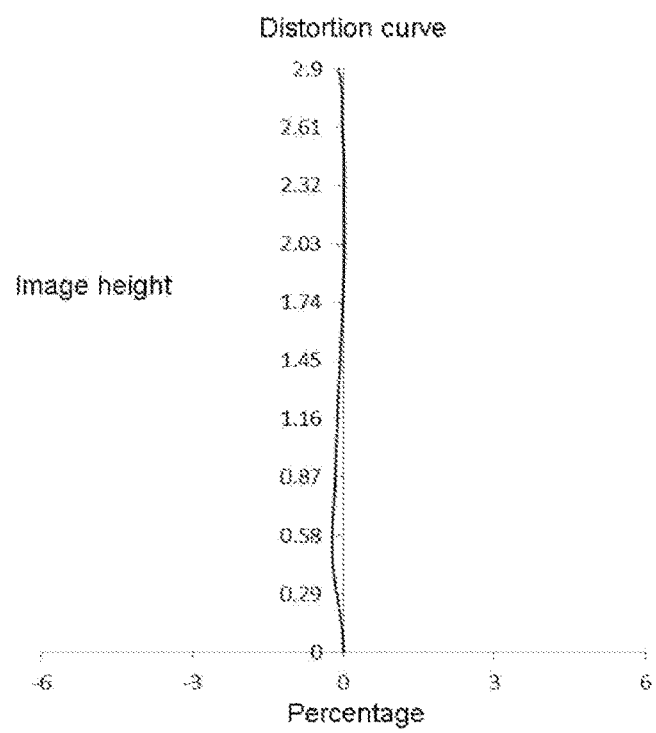
Figure 5D:
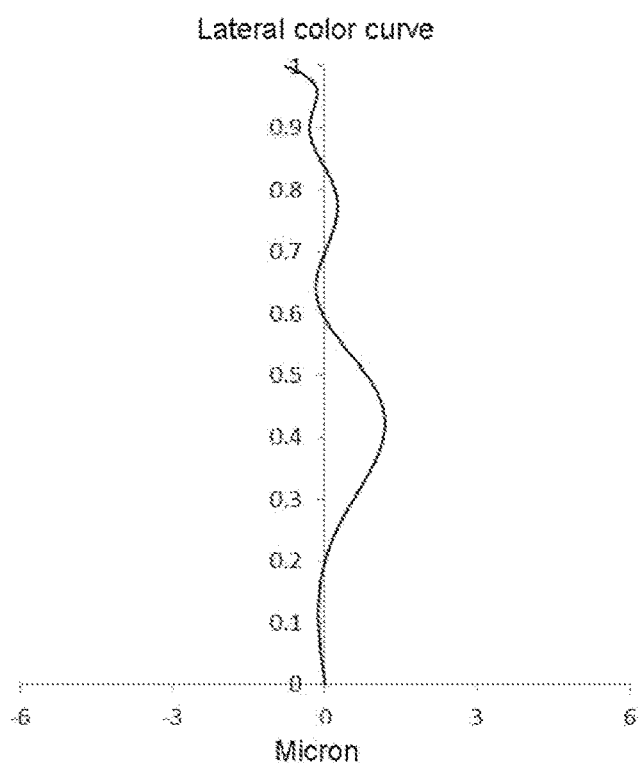
Figure 6A:
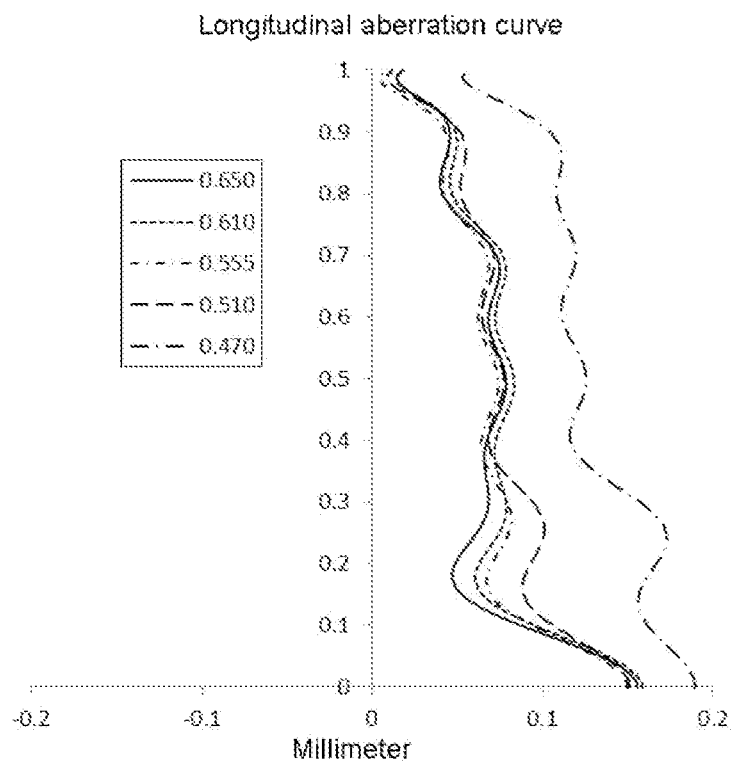
FIGS. 6A to 6D show a longitudinal aberration curve, an astigmatism curve, a distortion curve and a lateral color curve of a zoom lens group in a telephoto state according to embodiment 1 respectively.
Figure 6B:
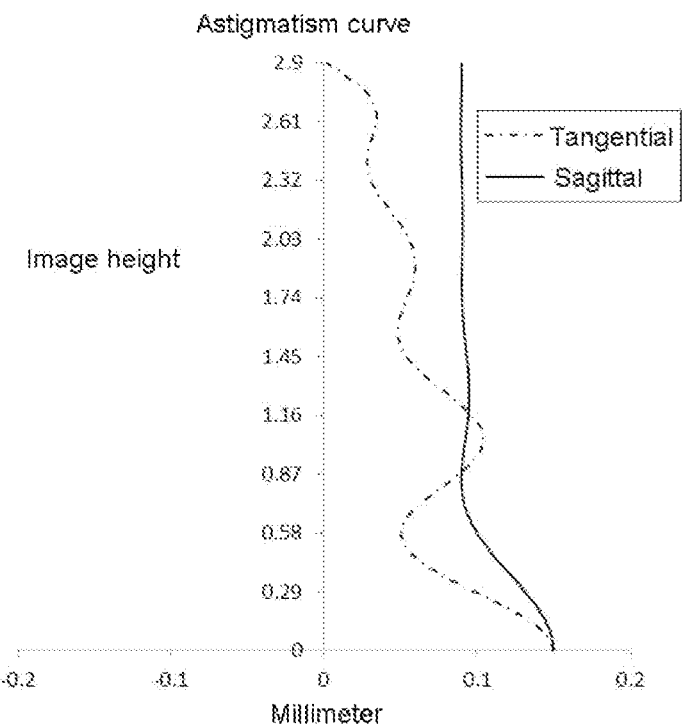
Figure 6C:
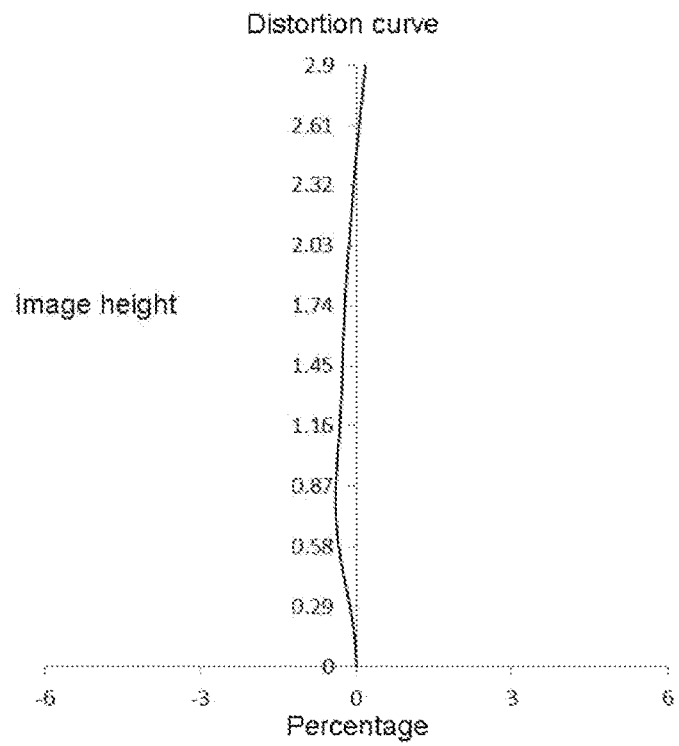
Figure 6D:
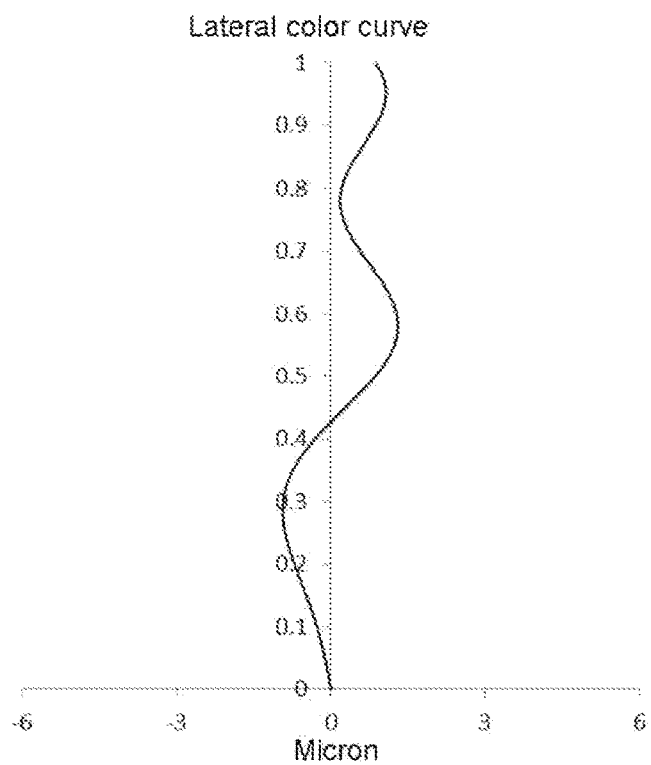

FIGS. 4A, 5A and 6A show longitudinal aberration curves of a zoom lens group in a wide-angle state, an intermediate state and a telephoto state according to embodiment 1 respectively to represent deviations of a convergence focal point after light of different wavelengths passes through the lens. FIGS. 4B, 5B and 6B show astigmatism curves of a zoom lens group in a wide-angle state, an intermediate state and a telephoto state according to embodiment 1 respectively to represent tangential image surface curvatures and sagittal image surface curvatures. FIGS. 4C, 5C and 6C show distortion curves of a zoom lens group in a wide-angle state, an intermediate state and a telephoto state according to embodiment 1 respectively to represent distortion values corresponding to different image heights. FIGS. 4D, 5D and 6D show lateral color curves of a zoom lens group in a wide-angle state, an intermediate state and a telephoto state according to embodiment 1 respectively to represent deviations of different image heights on the imaging surface after the light passes through the lens. According to FIGS. 4A to 6D, it can be seen that the zoom lens group provided in embodiment 1 may achieve high imaging quality in each state.

Embodiment 2

Figure 7:
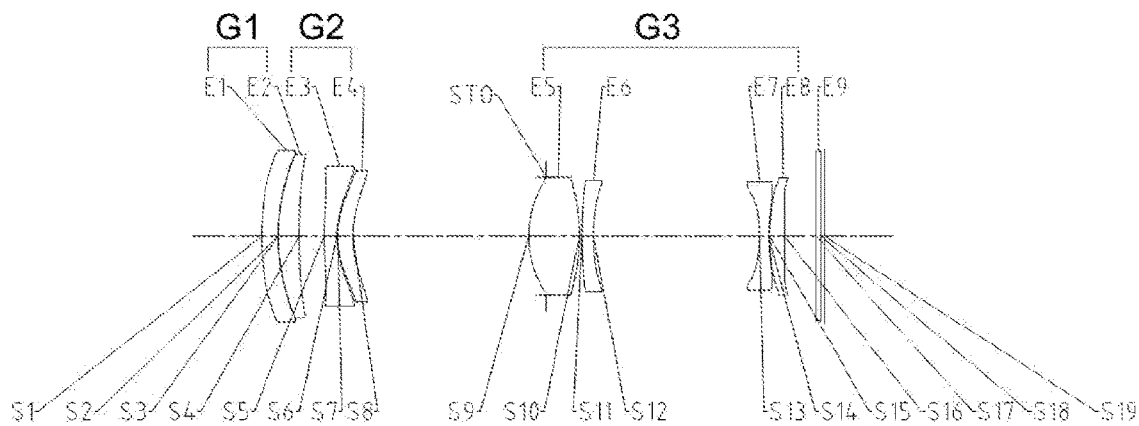
FIG. 7 shows a structure diagram of a zoom lens group in a wide-angle state according to embodiment 2 of the disclosure.
Figure 8:
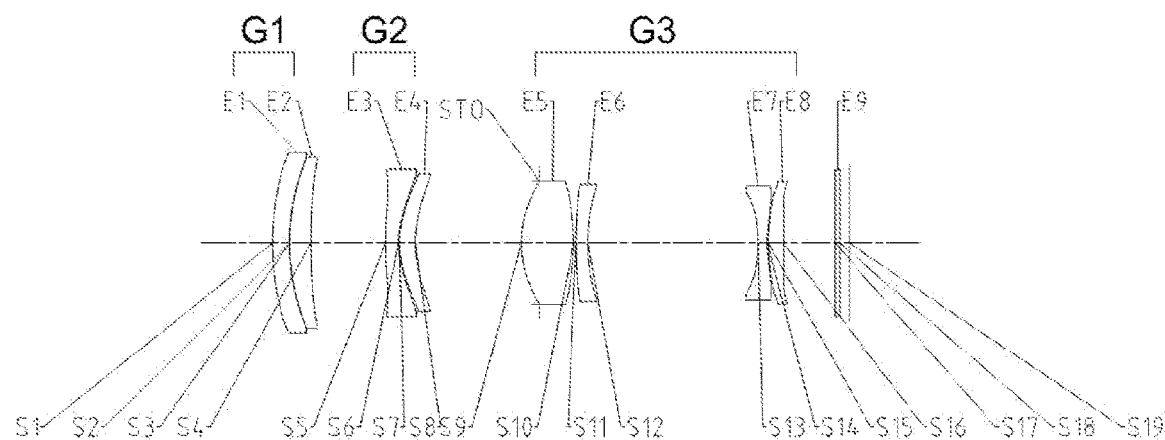
FIG. 8 shows a structure diagram of a zoom lens group in an intermediate state in a process of switching from a wide-angle state to a telephoto state according to embodiment 2 of the disclosure.
Figure 9:
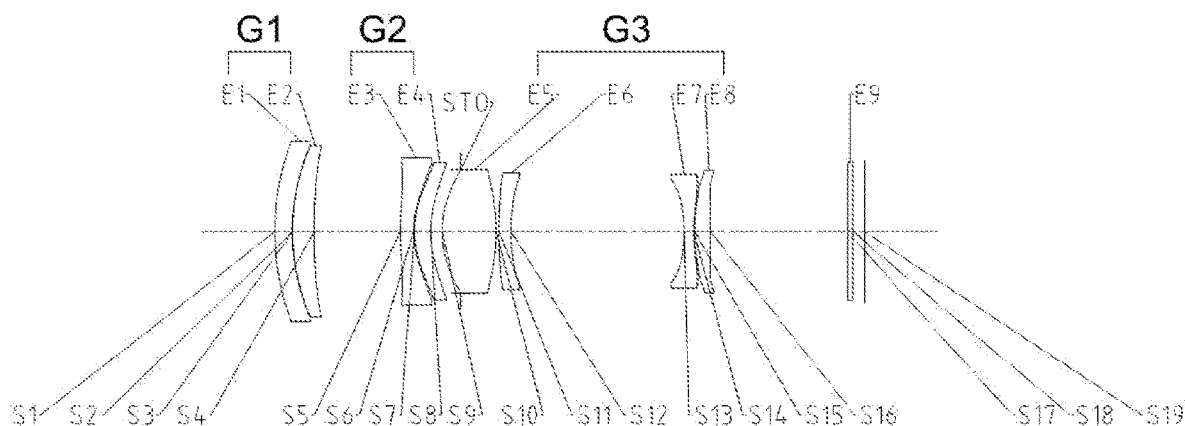
FIG. 9 shows a structure diagram of a zoom lens group in a telephoto state according to embodiment 2 of the disclosure.

A zoom lens group according to embodiment 2 of the disclosure will be described below with reference to FIGS. 7 to 12D. In the embodiment and the following embodiments, part of descriptions similar to those about embodiment 1 are omitted for simplicity. FIG. 7 shows a structure diagram of a zoom lens group in a wide-angle state according to embodiment 2 of the disclosure. FIG. 8 shows a structure diagram of a zoom lens group in an intermediate state in a process of switching from a wide-angle state to a telephoto state according to embodiment 2 of the disclosure. FIG. 9 shows a structure diagram of a zoom lens group in a telephoto state according to embodiment 2 of the disclosure.

As shown in FIGS. 7 to 9, the zoom lens group sequentially includes, from an object side to an image side, a first lens group G1 (a first lens E1 and a second lens E2), a second lens group G2 (a third lens E3 and a fourth lens E4), a diaphragm STO, a third lens group G3 (a fifth lens E5, a sixth lens E6, a seventh lens E7, and an eighth lens E8), an optical filter E9, and an imaging surface S19.

An object-side surface S1 of the first lens E1 is a convex surface, while an image-side surface S2 is a concave surface. An object-side surface S3 of the second lens E2 is a convex surface, while an image-side surface S4 is a concave surface. An object-side surface S5 of the third lens E3 is a convex surface, while an image-side surface S6 is a concave surface. An object-side surface S7 of the fourth lens E4 is a convex surface, while an image-side surface S8 is a concave surface. An object-side surface S9 of the fifth lens E5 is a convex surface, while an image-side surface S10 is a convex surface. The diaphragm STO may be arranged at the object-side surface S9 of the fifth lens E5. An object-side surface S1l of the sixth lens E6 is a convex surface, while an image-side surface S12 is a concave surface. An object-side surface S13 of the seventh lens E7 is a concave surface, while an image-side surface S14 is a concave surface. An object-side surface S15 of the eighth lens E8 is a convex surface, while an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

In the example, TTL is a total length of the zoom lens group, and TTL is 24.45 mm. ImgH is a half of a diagonal length of an effective pixel region on the imaging surface S19 of the zoom lens group, and ImgH is 2.90 mm.

Table 4 shows a basic parameter table of the zoom lens group of embodiment 2, and units of the curvature radius, the thickness/distance and the focal length are all millimeter (mm).

TABLE 4

| Surface number | Surface type | Curvature radius | Thickness/ distance | Material Refractive index | Material Abbe number | Conic coefficient |
|---|---|---|---|---|---|---|
| OBJ | Spherical | Infinite | Infinite | | | |
| S1 | Aspheric | 11.5433 | 0.7441 | 1.66 | 20.4 | 0.7126 |
| S2 | Aspheric | 9.0852 | 0.0000 | | | −0.9805 |
| S3 | Aspheric | 9.0852 | 0.9052 | 1.54 | 55.9 | −0.9805 |
| S4 | Aspheric | 31.5161 | D4 | | | 26.3575 |
| S5 | Aspheric | 12.3396 | 0.5500 | 1.69 | 53.0 | −30.1371 |
| S6 | Aspheric | 3.7679 | 0.0350 | | | −0.3147 |
| S7 | Aspheric | 3.7448 | 0.6706 | 1.66 | 20.4 | −0.7420 |
| S8 | Aspheric | 4.3840 | D8 | | | −1.6056 |
| STO | Spherical | Infinite | −0.7606 | | | |
| S9 | Aspheric | 4.3078 | 2.2300 | 1.50 | 81.4 | 0.0998 |
| S10 | Aspheric | −7.6513 | 0.1101 | | | 1.4063 |
| S11 | Aspheric | 16.7603 | 0.5000 | 1.66 | 20.4 | 26.5836 |
| S12 | Aspheric | 7.4363 | 7.1899 | | | 0.5832 |
| S13 | Aspheric | −7.2323 | 0.4000 | 1.54 | 55.9 | 8.7307 |
| S14 | Aspheric | 5.4216 | 0.0400 | | | −4.7750 |
| S15 | Aspheric | 6.0517 | 0.6500 | 1.66 | 20.4 | −2.0679 |
| S16 | Aspheric | 46.5771 | D17 | | | 70.4773 |
| S17 | Spherical | Infinite | 0.2100 | 1.52 | 64.2 | |
| S18 | Spherical | Infinite | D19 | | | |
| S19 | Spherical | Infinite | | | | |

In the example, positions of the second lens group, the third lens group and the optical filter may be changed to implement continuous zoom of the zoom lens group. In other words, a spacing distance D4 of the first lens group and the second lens group on an optical axis (i.e., a spacing distance from the image-side surface of the second lens E2 to the object-side surface of the third lens E3 on the optical axis), a spacing distance D8 of the second lens group and the third lens group on the optical axis (i.e., a spacing distance from the image-side surface of the fourth lens E4 to the image-side surface of the fifth lens E5 on the optical axis), a spacing distance D17 of the third lens group and the optical filter on the optical axis (i.e., a spacing distance from the image-side surface of the eighth lens E8 to the object-side surface of the optical filter E9 on the optical axis) and a spacing distance D19 of the optical filter and the imaging surface on the optical axis (i.e., a spacing distance from the image-side surface of the optical filter E9 to the imaging surface S19 on the optical axis) are changed to switch the zoom lens group from the wide-angle state to the telephoto state or from the telephoto state to the wide-angle state. A total effective focal length F, maximum field of view (FOV) and F-number (Fno) of the zoom lens group are changed as the zoom lens group is switched from the wide-angle state to the telephoto state or from the telephoto state to the wide-angle state.

Table 5 shows a parameter table changed according to different states of the zoom lens group according to embodiment 2. The units of F, D4, D8, D17 and D19 are all millimeter (mm), and the unit of FOV is degree (°).

TABLE 5

| | F | FOV | Fno | D4 | D8 | D17 | D19 |
|---|---|---|---|---|---|---|---|
| Wide-angle state | 10.17 | 33.0 | 2.68 | 1.08 | 7.61 | 1.36 | 0.17 |
| Intermediate state | 14.48 | 22.7 | 3.07 | 3.16 | 4.49 | 2.17 | 0.40 |
| Telephoto state | 26.00 | 12.8 | 4.41 | 3.56 | 0.48 | 5.68 | 0.49 |

Table 6 shows high-order coefficients that can be used for each aspheric mirror surface in embodiment 2. A surface type of each aspheric surface may be defined by the formula (1) given in embodiment 1.

TABLE 6

| Surface number | A4 | A6 | A8 | A10 | A12 |
|---|---|---|---|---|---|
| S1 | 3.9701E−04 | −2.0215E−04 | 1.6742E−04 | −6.0264E−05 | 8.0548E−06 |
| S2 | 5.4493E−03 | −8.0596E−03 | 6.2419E−03 | −2.6769E−03 | 6.1922E−04 |
| S3 | 5.4493E−03 | −8.0596E−03 | 6.2419E−03 | −2.6769E−03 | 6.1922E−04 |
| S4 | −9.4356E−04 | 2.3155E−03 | −2.1296E−03 | 1.2258E−03 | −4.6933E−04 |
| S5 | −4.6653E−03 | 2.9169E−04 | −1.7126E−05 | 8.1782E−07 | 0.0000E+00 |
| S6 | −5.8408E−03 | −4.1820E−04 | 3.6138E−05 | 9.9788E−07 | −1.3092E−07 |
| S7 | −3.2915E−03 | −5.4397E−05 | 7.3813E−04 | −2.3901E−03 | 2.8244E−03 |
| S8 | −6.2012E−03 | 2.5932E−03 | −2.2481E−03 | 6.7835E−04 | 8.3798E−04 |
| S9 | −8.2249E−04 | −7.1444E−05 | −1.0568E−05 | 5.9034E−07 | −5.6695E−08 |
| S10 | 3.5712E−03 | −6.5298E−04 | 1.3131E−04 | −1.3852E−05 | 5.9286E−07 |

TABLE 6-continued

| | | | | | |
|---|---|---|---|---|---|
| S11 | −5.7003E−03 | 8.5677E−03 | −2.2993E−02 | 3.8699E−02 | −4.2039E−02 |
| S12 | −7.2611E−03 | 1.6971E−02 | −5.0720E−02 | 9.6408E−02 | −1.1844E−01 |
| S13 | 1.3052E−02 | −1.0600E−01 | 3.3802E−01 | −6.6786E−01 | 8.6904E−01 |
| S14 | −1.2629E−01 | 4.4259E−01 | −7.2110E−01 | 5.3117E−01 | −2.1500E−02 |
| S15 | −1.3798E−01 | 5.0212E−01 | −9.3240E−01 | 9.7593E−01 | −6.0062E−01 |
| S16 | −3.5519E−02 | 1.1694E−01 | −2.5812E−01 | 3.6040E−01 | −3.4082E−01 |

| Surface number | A14 | A16 | A18 | A20 |
|---|---|---|---|---|
| S1 | 1.8406E−06 | −1.1468E−06 | 2.8131E−07 | −4.2492E−08 |
| S2 | −3.4856E−05 | −2.5044E−05 | 9.2495E−06 | −1.7024E−06 |
| S3 | −3.4856E−05 | −2.5044E−05 | 9.2495E−06 | −1.7024E−06 |
| S4 | 1.2291E−04 | −2.1978E−05 | 2.5764E−06 | −1.7108E−07 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |
| S7 | −1.9211E−03 | 8.5138E−04 | −2.5861E−04 | 5.4946E−05 |
| S8 | −1.1237E−03 | 6.6663E−04 | −2.4418E−04 | 5.9841E−05 |
| S9 | 0.0000E+00 | 0.0000E+00 | 0.0000E+00 | 0.0000E+00 |
| S10 | 0.0000E+00 | 0.0000E+00 | 0.0000E+00 | 0.0000E+00 |
| S11 | 3.1048E−02 | −1.6098E−02 | 5.9641E−03 | −1.5873E−03 |
| S12 | 9.8823E−02 | −5.7811E−02 | 2.4136E−02 | −7.2307E−03 |
| S13 | −7.7737E−01 | 4.9105E−01 | −2.2221E−01 | 7.2274E−02 |
| S14 | −2.9957E−01 | 2.8525E−01 | −1.4506E−01 | 4.7389E−02 |
| S15 | 1.9750E−01 | −7.7107E−03 | −2.3724E−02 | 1.1757E−02 |
| S16 | 2.2796E−01 | −1.1026E−01 | 3.8899E−02 | −9.9883E−03 |

Figure 10A:
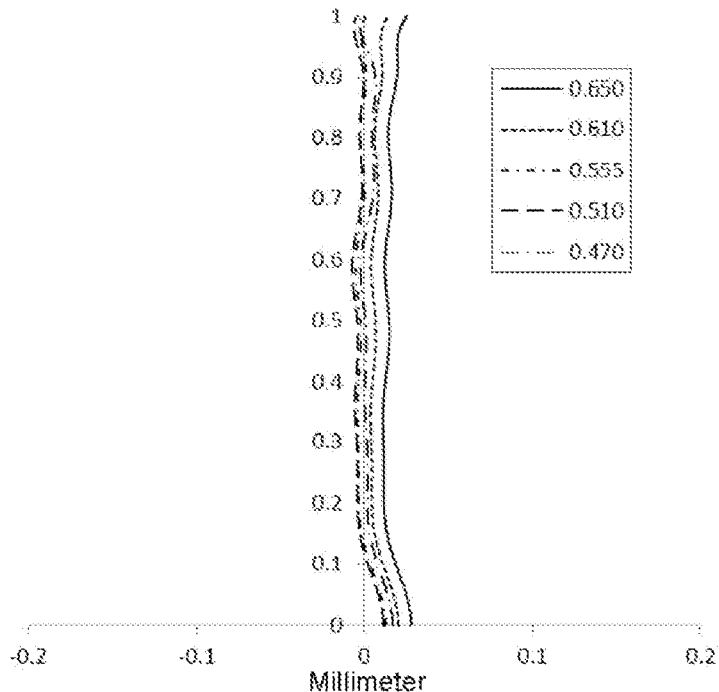
FIGS. 10A to 10D show a longitudinal aberration curve, an astigmatism curve, a distortion curve and a lateral color curve of a zoom lens group in a wide-angle state according to embodiment 2 respectively.
Figure 10B:
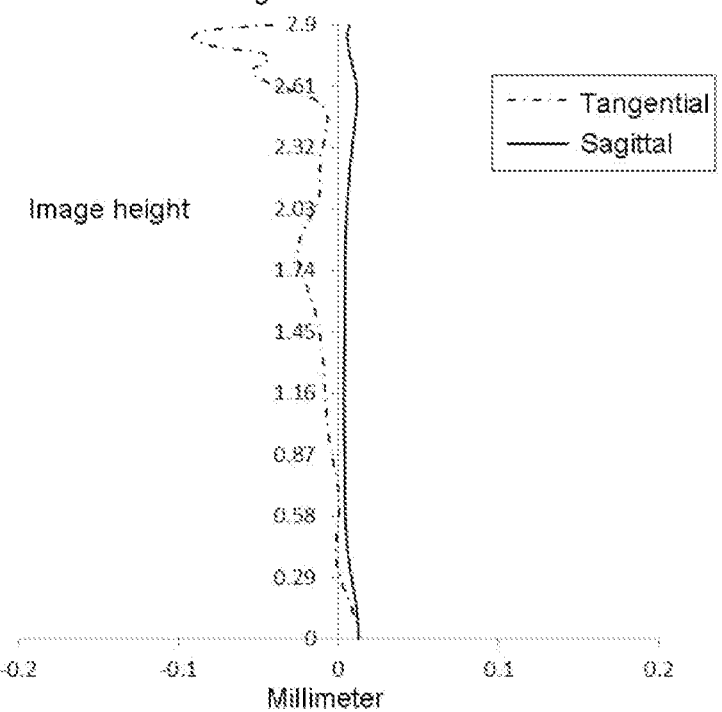
Figure 10C:
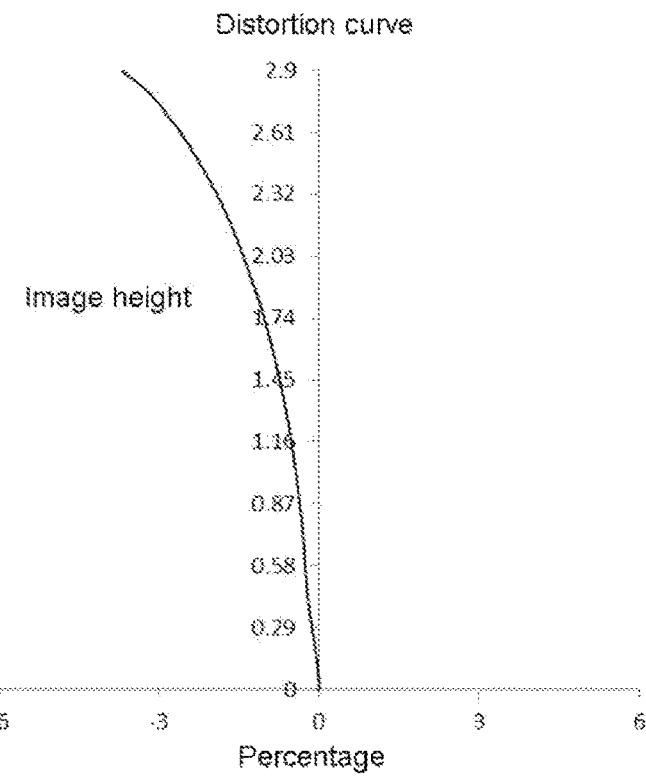
Figure 10D:
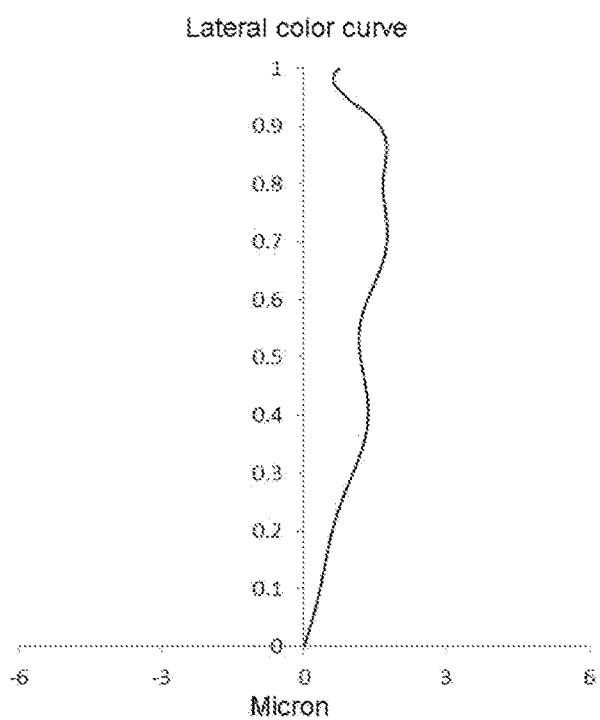
Figure 11A:
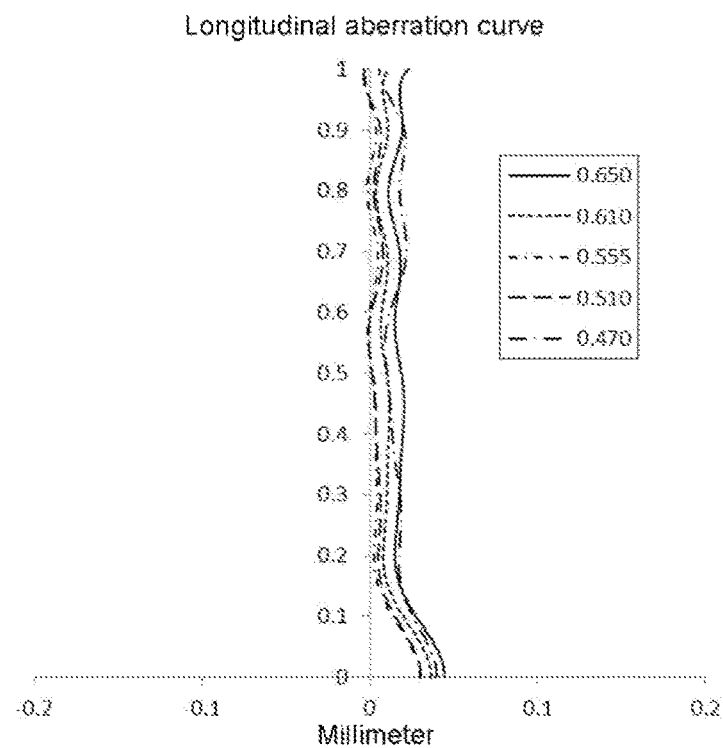
FIGS. 11A to 11D show a longitudinal aberration curve, an astigmatism curve, a distortion curve and a lateral color curve of a zoom lens group in an intermediate state in a process of switching from a wide-angle state to a telephoto state according to embodiment 2 respectively.
Figure 11B:
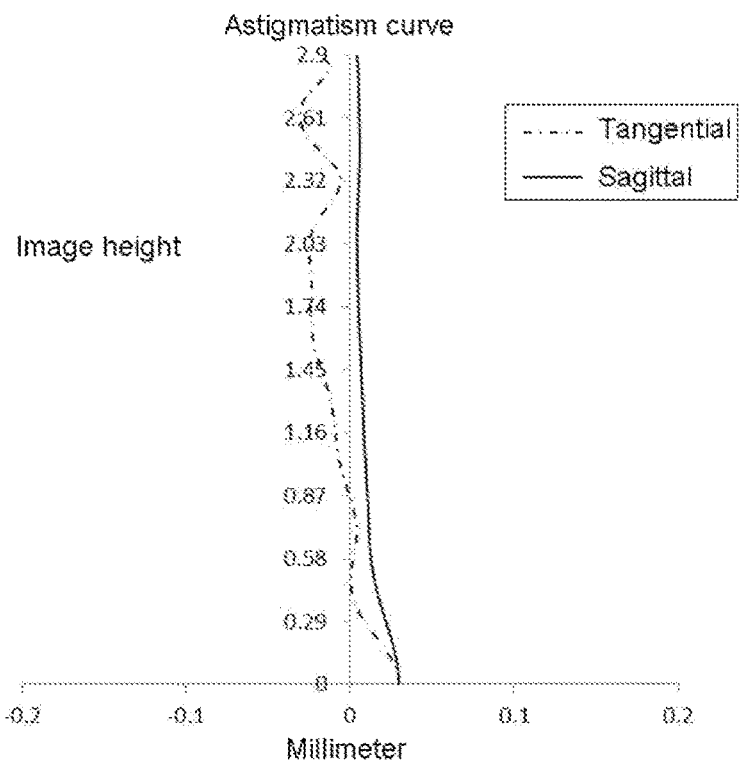
Figure 11C:
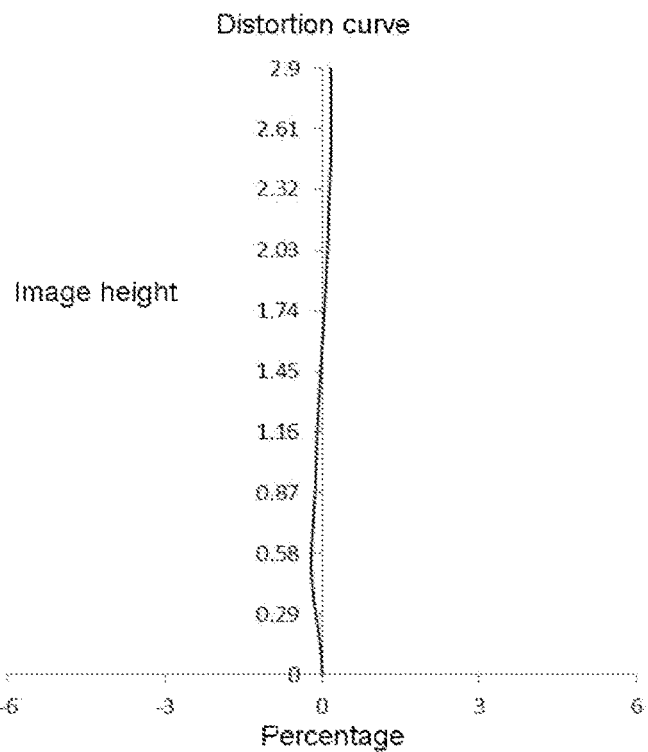
Figure 11D:
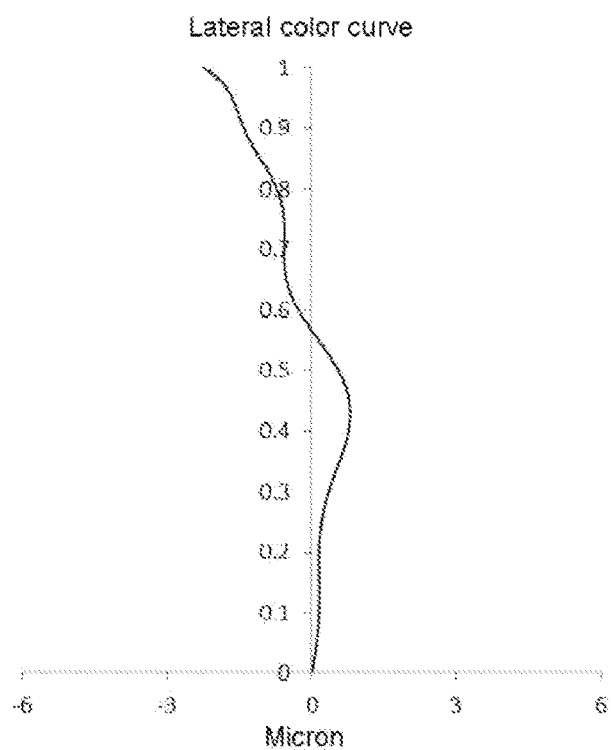
Figure 12A:
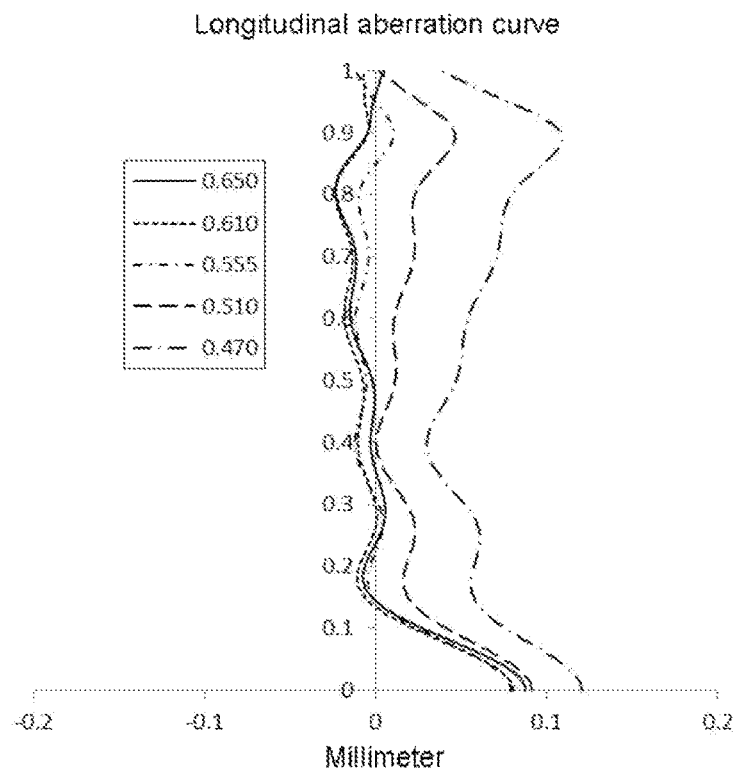
FIGS. 12A to 12D show a longitudinal aberration curve, an astigmatism curve, a distortion curve and a lateral color curve of a zoom lens group in a telephoto state according to embodiment 2 respectively.
Figure 12B:
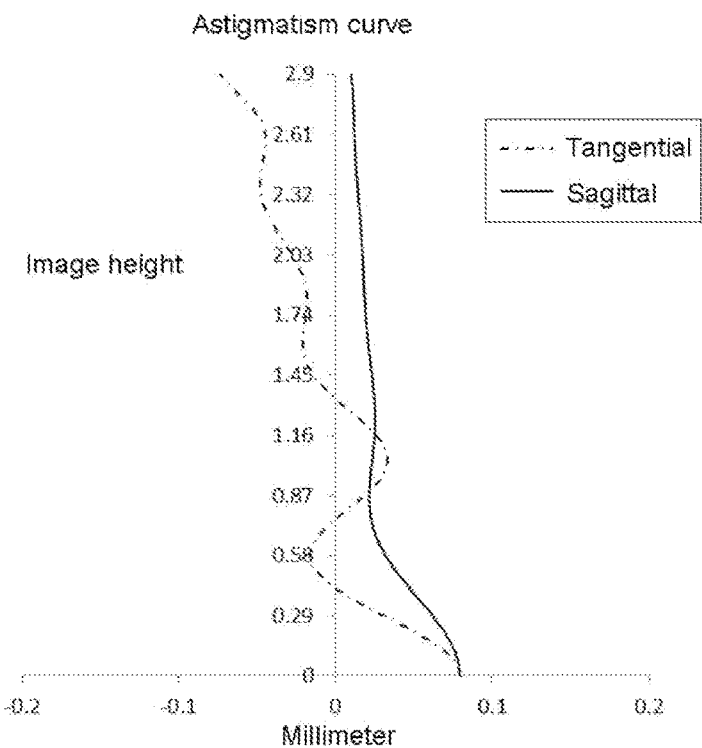
Figure 12C:
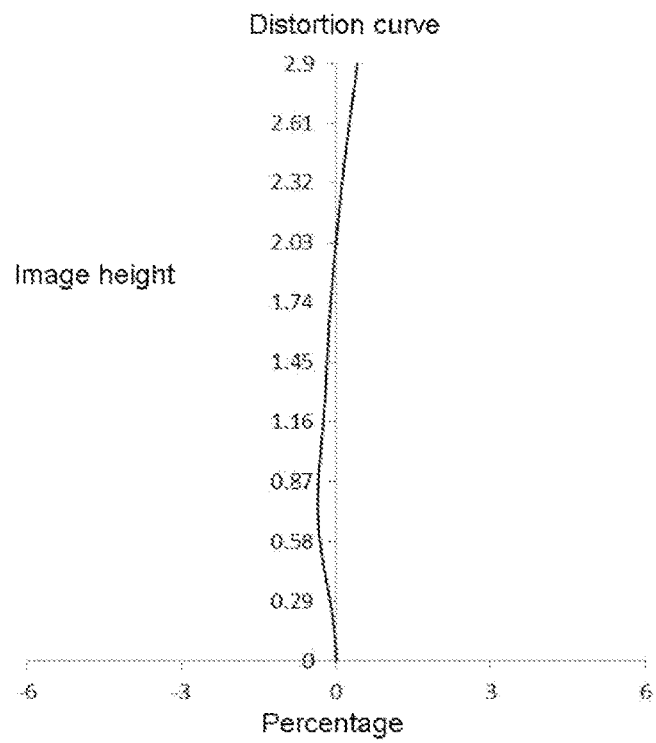
Figure 12D:
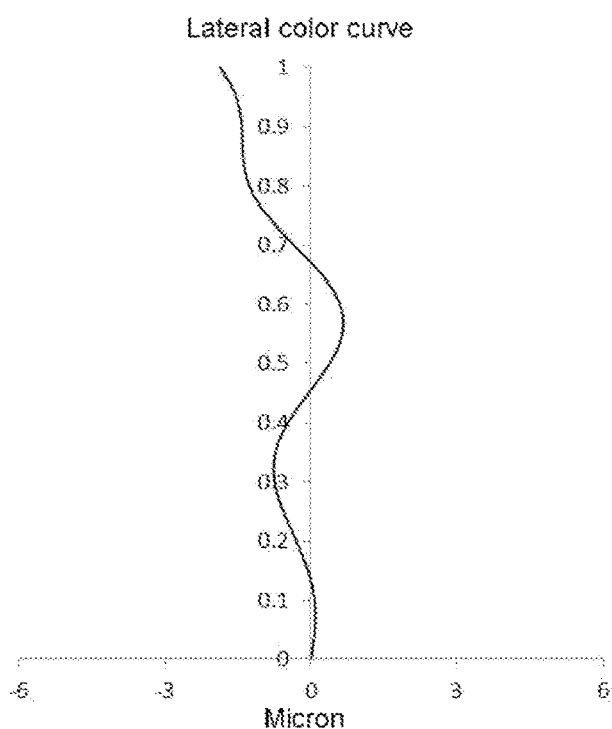

FIGS. 10A, 11A and 12A show longitudinal aberration curves of a zoom lens group in a wide-angle state, an intermediate state and a telephoto state according to embodiment 2 respectively to represent deviations of a convergence focal point after light of different wavelengths passes through the lens. FIGS. 10B, 11B and 12B show astigmatism curves of a zoom lens group in a wide-angle state, an intermediate state and a telephoto state according to embodiment 2 respectively to represent tangential image surface curvatures and sagittal image surface curvatures. FIGS. 10C, 11C and 12C show distortion curves of a zoom lens group in a wide-angle state, an intermediate state and a telephoto state according to embodiment 2 respectively to represent distortion values corresponding to different image heights. FIGS. 10D, 11D and 12D show lateral color curves of a zoom lens group in a wide-angle state, an intermediate state and a telephoto state according to embodiment 2 respectively to represent deviations of different image heights on the imaging surface after the light passes through the lens. According to FIGS. 10A to 12D, it can be seen that the zoom lens group provided in embodiment 2 may achieve high imaging quality in each state.

Embodiment 3

Figure 13:
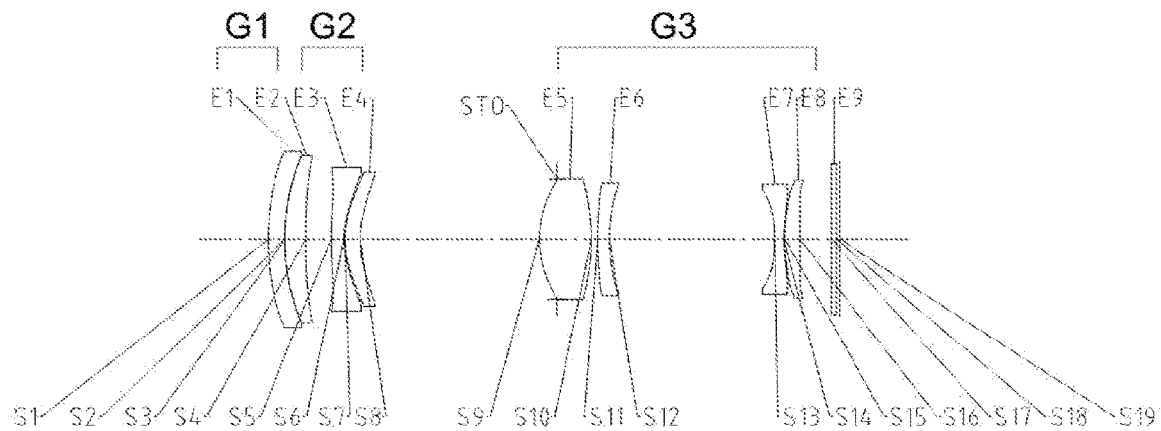
FIG. 13 shows a structure diagram of a zoom lens group in a wide-angle state according to embodiment 3 of the disclosure.
Figure 14:
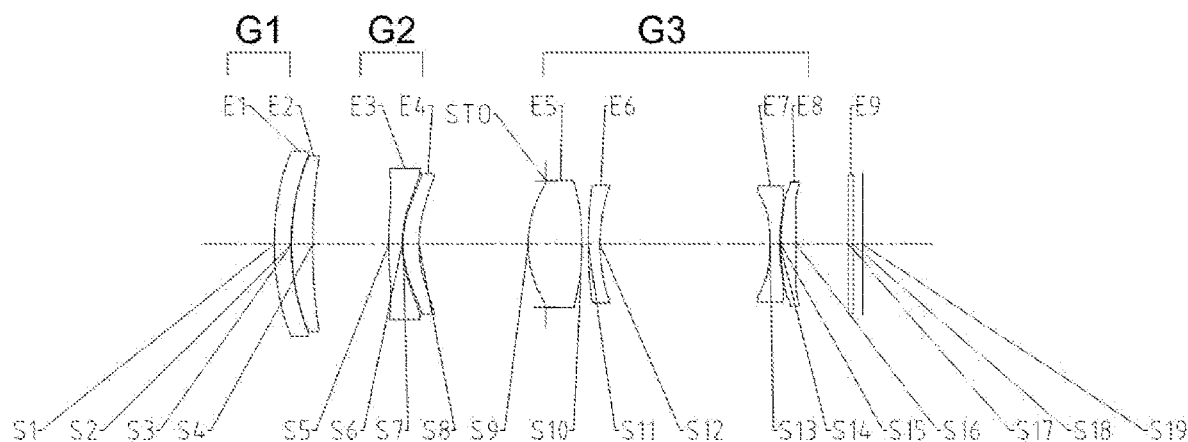
FIG. 14 shows a structure diagram of a zoom lens group in an intermediate state in a process of switching from a wide-angle state to a telephoto state according to embodiment 3 of the disclosure.
Figure 15:
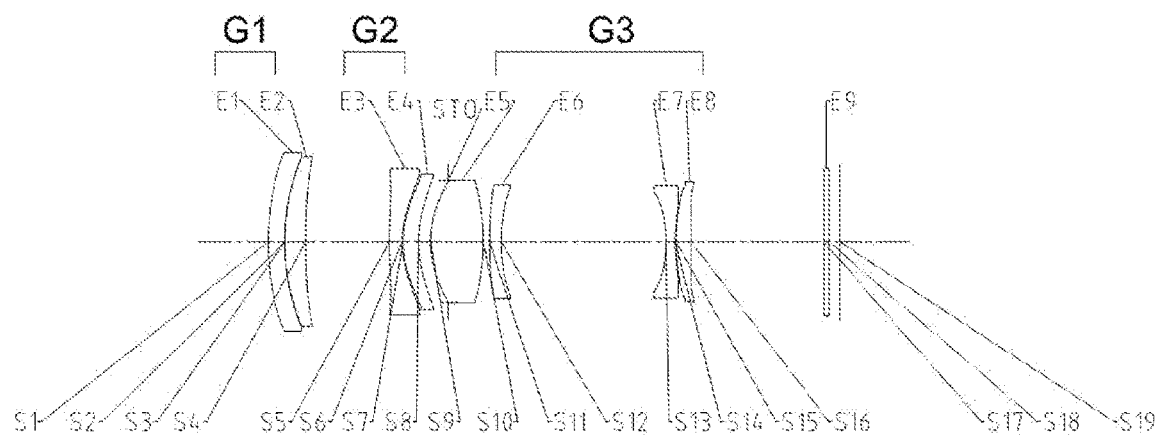
FIG. 15 shows a structure diagram of a zoom lens group in a telephoto state according to embodiment 3 of the disclosure.

A zoom lens group according to embodiment 3 of the disclosure will be described below with reference to FIGS. 13 to 18D. FIG. 13 shows a structure diagram of a zoom lens group in a wide-angle state according to embodiment 3 of the disclosure. FIG. 14 shows a structure diagram of a zoom lens group in an intermediate state in a process of switching from a wide-angle state to a telephoto state according to embodiment 3 of the disclosure. FIG. 15 shows a structure diagram of a zoom lens group in a telephoto state according to embodiment 3 of the disclosure.

As shown in FIGS. 13 to 15, the zoom lens group sequentially includes, from an object side to an image side, a first lens group G1 (a first lens E1 and a second lens E2), a second lens group G2 (a third lens E3 and a fourth lens E4), a diaphragm STO, a third lens group G3 (a fifth lens E5, a sixth lens E6, a seventh lens E7, and an eighth lens E8), an optical filter E9, and an imaging surface S19.

An object-side surface S1 of the first lens E1 is a convex surface, while an image-side surface S2 is a concave surface. An object-side surface S3 of the second lens E2 is a convex surface, while an image-side surface S4 is a concave surface. An object-side surface S5 of the third lens E3 is a convex surface, while an image-side surface S6 is a concave surface. An object-side surface S7 of the fourth lens E4 is a convex surface, while an image-side surface S8 is a concave surface. An object-side surface S9 of the fifth lens E5 is a convex surface, while an image-side surface S10 is a convex surface. The diaphragm STO may be arranged at the object-side surface S9 of the fifth lens E5. An object-side surface S11 of the sixth lens E6 is a convex surface, while an image-side surface S12 is a concave surface. An object-side surface S13 of the seventh lens E7 is a concave surface, while an image-side surface S14 is a concave surface. An object-side surface S15 of the eighth lens E8 is a convex surface, while an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

In the example, TTL is a total length of the zoom lens group, and TTL is 24.50 mm. ImgH is a half of a diagonal length of an effective pixel region on the imaging surface S19 of the zoom lens group, and ImgH is 2.90 mm.

Table 7 shows a basic parameter table of the zoom lens group of embodiment 3, and units of the curvature radius, the thickness/distance and the focal length are all millimeter (mm).

TABLE 7

| Surface number | Surface type | Curvature radius | Thickness/ distance | Material Refractive index | Abbe number | Conic coefficient |
|---|---|---|---|---|---|---|
| OBJ | Spherical | Infinite | Infinite | | | |
| S1 | Aspheric | 11.8243 | 0.7305 | 1.66 | 20.4 | 0.7436 |
| S2 | Aspheric | 9.9282 | 0.0000 | | | −0.4852 |
| S3 | Aspheric | 9.9282 | 0.8943 | 1.54 | 55.9 | −0.4852 |
| S4 | Aspheric | 32.8556 | D4 | | | 24.3782 |
| S5 | Aspheric | 12.7284 | 0.5500 | 1.69 | 53.0 | −34.5018 |
| S6 | Aspheric | 3.9190 | 0.0352 | | | −0.2253 |
| S7 | Aspheric | 3.8840 | 0.6595 | 1.66 | 20.4 | −0.6726 |
| S8 | Aspheric | 4.4081 | D8 | | | −1.5883 |
| STO | Spherical | Infinite | −0.7473 | | | |
| S9 | Aspheric | 4.2978 | 2.2600 | 1.50 | 81.4 | 0.0815 |
| S10 | Aspheric | −8.0811 | 0.2603 | | | 1.9414 |
| S11 | Aspheric | 15.3033 | 0.5026 | 1.67 | 19.2 | 25.1905 |
| S12 | Aspheric | 7.2669 | 7.0615 | | | 1.4649 |
| S13 | Aspheric | −7.0874 | 0.4000 | 1.54 | 55.9 | 8.7727 |
| S14 | Aspheric | 6.2357 | 0.0414 | | | −2.9418 |
| S15 | Aspheric | 6.7678 | 0.6443 | 1.67 | 19.2 | −0.6864 |
| S16 | Aspheric | 48.7322 | D17 | | | 21.5868 |
| S17 | Spherical | Infinite | 0.2100 | 1.52 | 64.2 | |
| S18 | Spherical | Infinite | D19 | | | |
| S19 | Spherical | Infinite | | | | |

In the example, positions of the second lens group, the third lens group and the optical filter may be changed to implement continuous zoom of the zoom lens group. In other words, a spacing distance D4 of the first lens group and the second lens group on an optical axis (i.e., a spacing distance from the image-side surface of the second lens E2 to the object-side surface of the third lens E3 on the optical axis), a spacing distance D8 of the second lens group and the third lens group on the optical axis (i.e., a spacing distance from the image-side surface of the fourth lens E4 to the image-side surface of the fifth lens E5 on the optical axis), a spacing distance D17 of the third lens group and the optical filter on the optical axis (i.e., a spacing distance from the image-side surface of the eighth lens E8 to the object-side surface of the optical filter E9 on the optical axis) and a spacing distance D19 of the optical filter and the imaging surface on the optical axis (i.e., a spacing distance from the image-side surface of the optical filter E9 to the imaging surface S19 on the optical axis) are changed to switch the zoom lens group from the wide-angle state to the telephoto state or from the telephoto state to the wide-angle state. A total effective focal length F, maximum field of view (FOV) and F-number (Fno) of the zoom lens group are changed as the zoom lens group is switched from the wide-angle state to the telephoto state or from the telephoto state to the wide-angle state.

Table 8 shows a parameter table changed according to different states of the zoom lens group according to embodiment 3. The units of F, D4, D8, D17 and D19 are all millimeter (mm), and the unit of FOV is degree (°).

TABLE 8

| | F | FOV | Fno | D4 | D8 | D17 | D19 |
|---|---|---|---|---|---|---|---|
| Wide-angle state | 10.17 | 33.1 | 2.67 | 1.09 | 7.66 | 1.35 | 0.16 |
| Intermediate state | 14.48 | 22.7 | 3.05 | 3.16 | 4.54 | 2.17 | 0.39 |
| Telephoto state | 26.00 | 12.8 | 4.38 | 3.57 | 0.52 | 5.67 | 0.49 |

Table 9 shows high-order coefficients that can be used for each aspheric mirror surface in embodiment 3. A surface type of each aspheric surface may be defined by the formula (1) given in embodiment 1.

| Surface number | A4 | A6 | A8 | A10 | A12 |
|---|---|---|---|---|---|
| S1 | 1.8144E−04 | 4.8222E−04 | −6.8153E−04 | 5.4402E−04 | −2.6914E−04 |
| S2 | 4.2503E−03 | −1.7992E−03 | −3.0025E−03 | 4.7542E−03 | −3.1599E−03 |
| S3 | 4.2503E−03 | −1.7992E−03 | −3.0025E−03 | 4.7542E−03 | −3.1599E−03 |
| S4 | −1.1126E−03 | 2.1139E−03 | −1.5312E−03 | 6.1266E−04 | −1.0650E−04 |
| S5 | −4.6513E−03 | 3.0193E−04 | −1.6840E−05 | 7.4931E−07 | 0.0000E+00 |
| S6 | −5.6322E−03 | −3.6317E−04 | 3.6024E−05 | 4.6503E−07 | −1.2523E−07 |
| S7 | −3.8029E−03 | 2.5406E−03 | −3.8423E−03 | 2.8070E−03 | −1.1649E−03 |
| S8 | −7.0596E−03 | 5.9538E−03 | −8.9053E−03 | 8.9077E−03 | −5.9550E−03 |
| S9 | −1.0125E−03 | −5.3325E−05 | −1.1173E−05 | 4.1901E−07 | −2.9120E−08 |
| S10 | 3.3153E−03 | −6.6260E−04 | 1.3175E−04 | −1.3755E−05 | 5.9904E−07 |
| S11 | −3.8788E−03 | 5.5880E−03 | −1.4576E−02 | 2.2869E−02 | −2.3316E−02 |
| S12 | −4.8524E−03 | 1.1478E−02 | −3.4625E−02 | 6.5717E−02 | −8.0683E−02 |
| S13 | 1.8182E−02 | −9.5873E−02 | 2.6938E−01 | −5.1276E−01 | 6.6479E−01 |
| S14 | −4.6770E−02 | 1.3802E−01 | −8.6913E−02 | −2.7507E−01 | 6.3988E−01 |
| S15 | −7.2187E−02 | 2.1411E−01 | −2.7915E−01 | 7.6719E−02 | 2.1310E−01 |
| S16 | −3.1470E−02 | 8.3121E−02 | −1.6637E−01 | 2.2067E−01 | −2.0354E−01 |

-continued

| Surface number | A14 | A16 | A18 | A20 |
|---|---|---|---|---|
| S1 | 8.8399E−05 | −2.0096E−05 | 3.2338E−06 | −3.7110E−07 |
| S2 | 1.2608E−03 | −3.3435E−04 | 6.1492E−05 | −7.9703E−06 |
| S3 | 1.2608E−03 | −3.3435E−04 | 6.1492E−05 | −7.9703E−06 |
| S4 | −1.6776E−05 | 1.4753E−05 | −4.1695E−06 | 7.0026E−07 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |
| S7 | 2.2256E−04 | 2.8562E−05 | −3.0693E−05 | 9.3627E−06 |
| S8 | 2.7716E−03 | −9.2220E−04 | 2.2245E−04 | −3.9012E−05 |
| S9 | 0.0000E+00 | 0.0000E+00 | 0.0000E+00 | 0.0000E+00 |
| S10 | 0.0000E+00 | 0.0000E+00 | 0.0000E+00 | 0.0000E+00 |
| S11 | 1.6238E−02 | −7.9430E−03 | 2.7707E−03 | −6.9173E−04 |
| S12 | 6.7247E−02 | −3.9234E−02 | 1.6302E−02 | −4.8489E−03 |
| S13 | −6.0102E−01 | 3.8668E−01 | −1.7923E−01 | 6.0018E−02 |
| S14 | −6.5725E−01 | 4.1078E−01 | −1.7100E−01 | 4.9067E−02 |
| S15 | −3.0876E−01 | 2.1438E−01 | −9.3234E−02 | 2.7281E−02 |
| S16 | 1.3534E−01 | −6.5876E−02 | 2.3543E−02 | −6.1390E−03 |

Figure 16A:
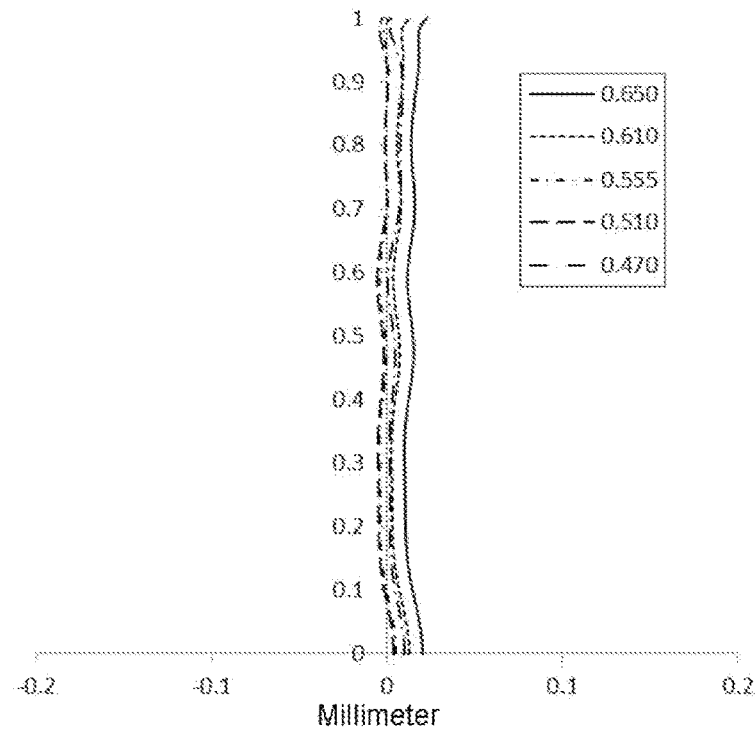
FIGS. 16A to 16D show a longitudinal aberration curve, an astigmatism curve, a distortion curve and a lateral color curve of a zoom lens group in a wide-angle state according to embodiment 3 respectively.
Figure 16B:
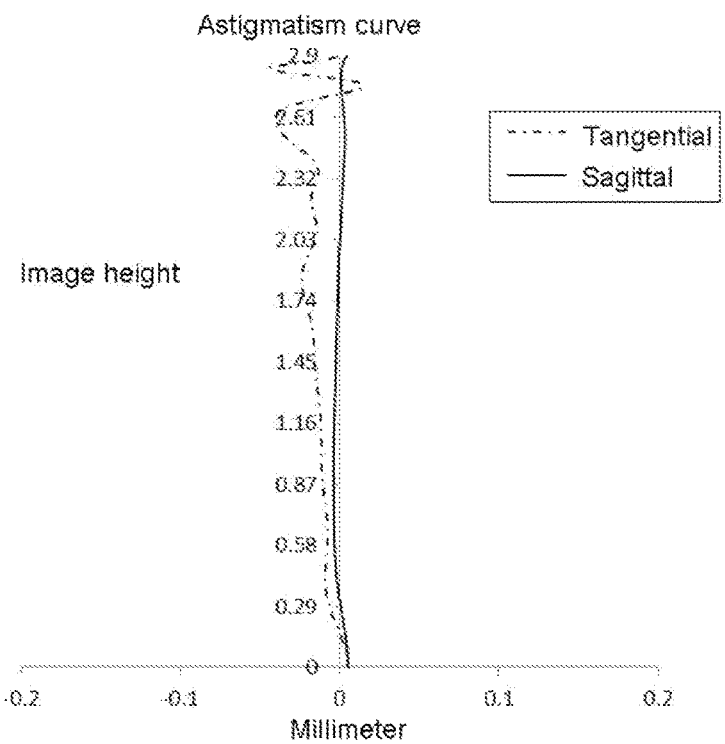
Figure 16C:
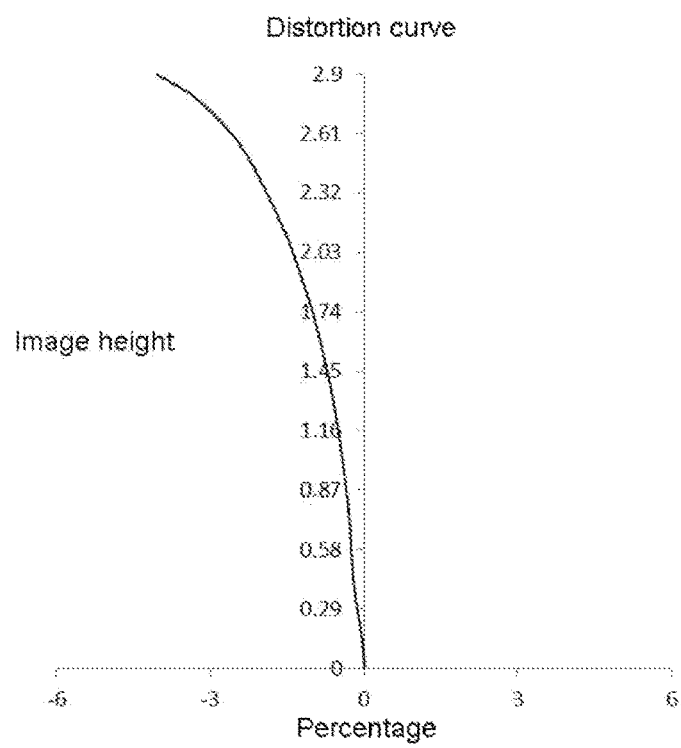
Figure 16D:
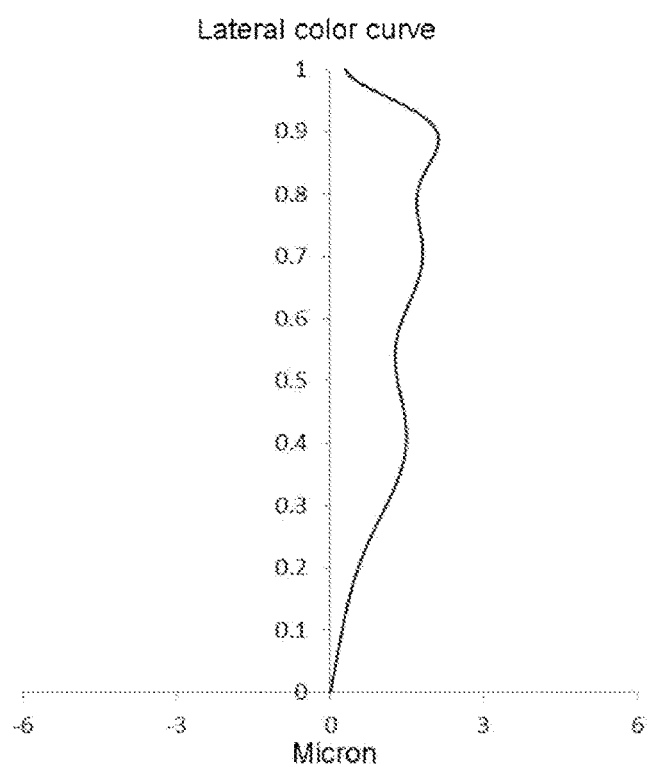
Figure 17A:
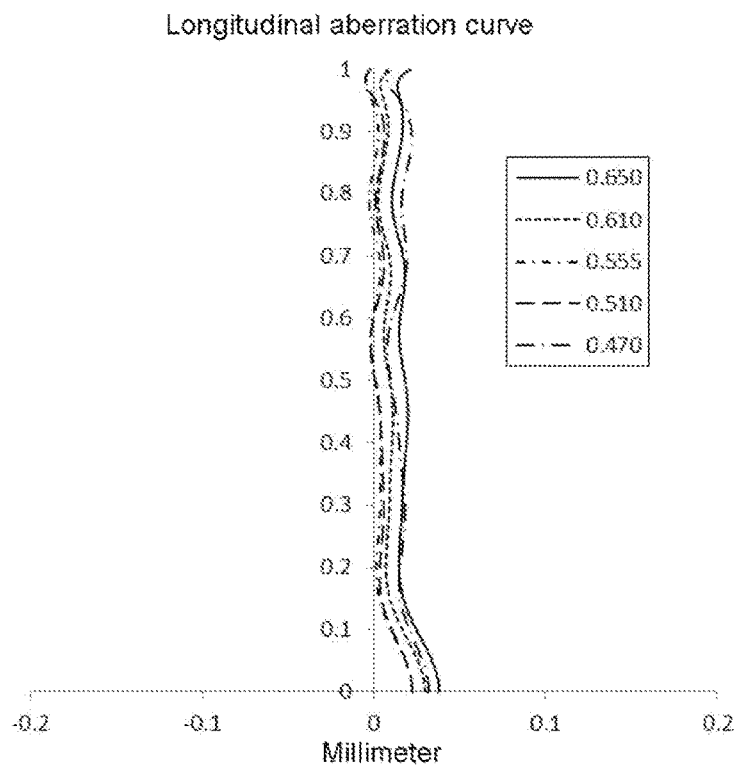
FIGS. 17A to 17D show a longitudinal aberration curve, an astigmatism curve, a distortion curve and a lateral color curve of a zoom lens group in an intermediate state in a process of switching from a wide-angle state to a telephoto state according to embodiment 3 respectively.
Figure 17B:
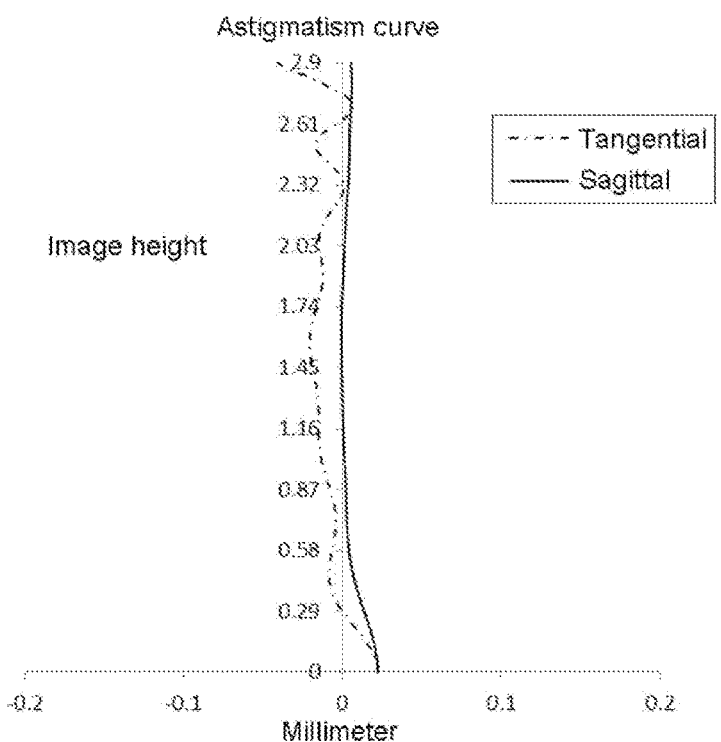
Figure 17C:
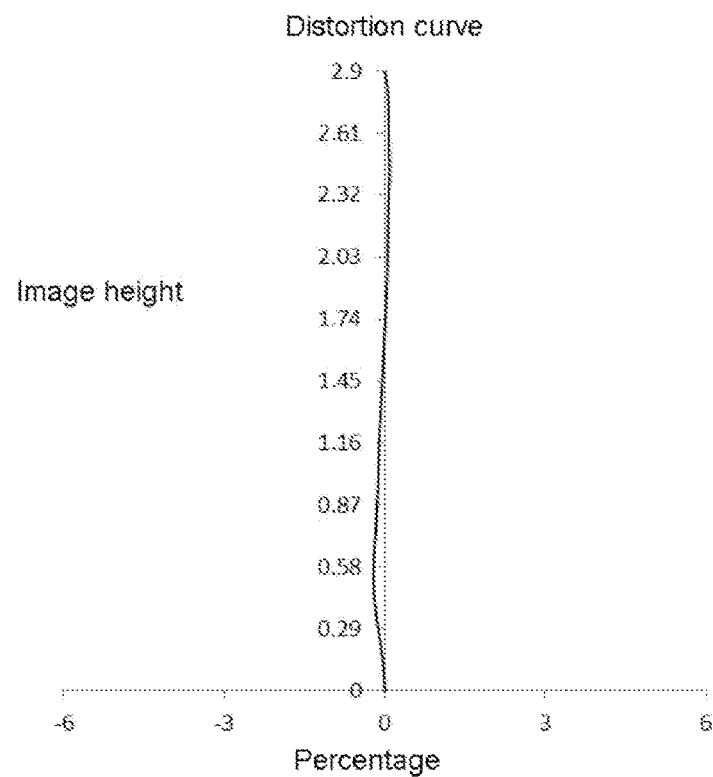
Figure 17D:
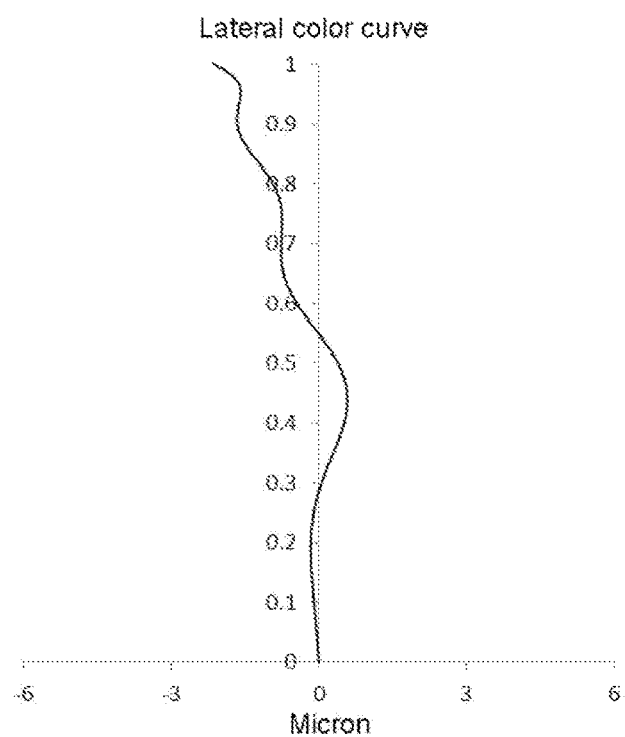
Figure 18A:
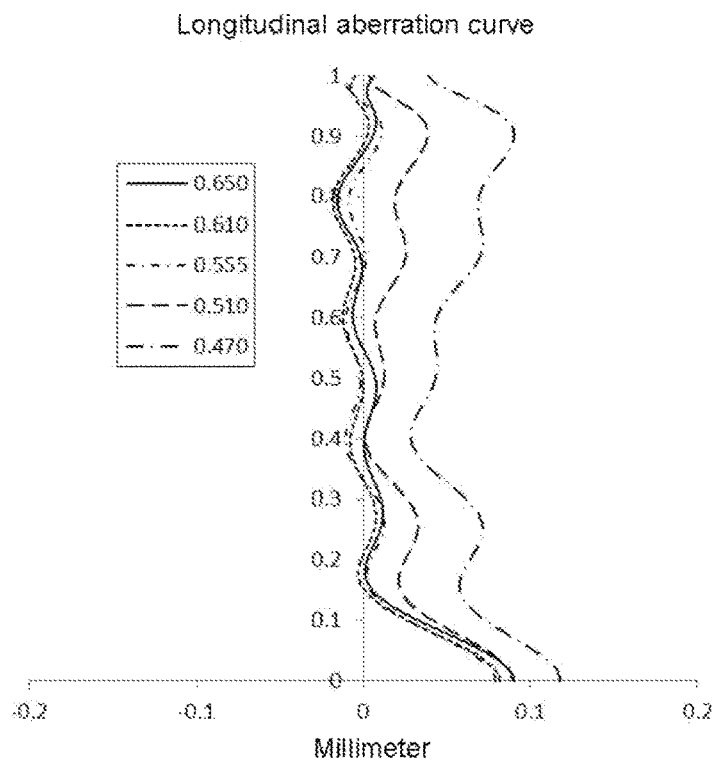
FIGS. 18A to 18D show a longitudinal aberration curve, an astigmatism curve, a distortion curve and a lateral color curve of a zoom lens group in a telephoto state according to embodiment 3 respectively.
Figure 18B:
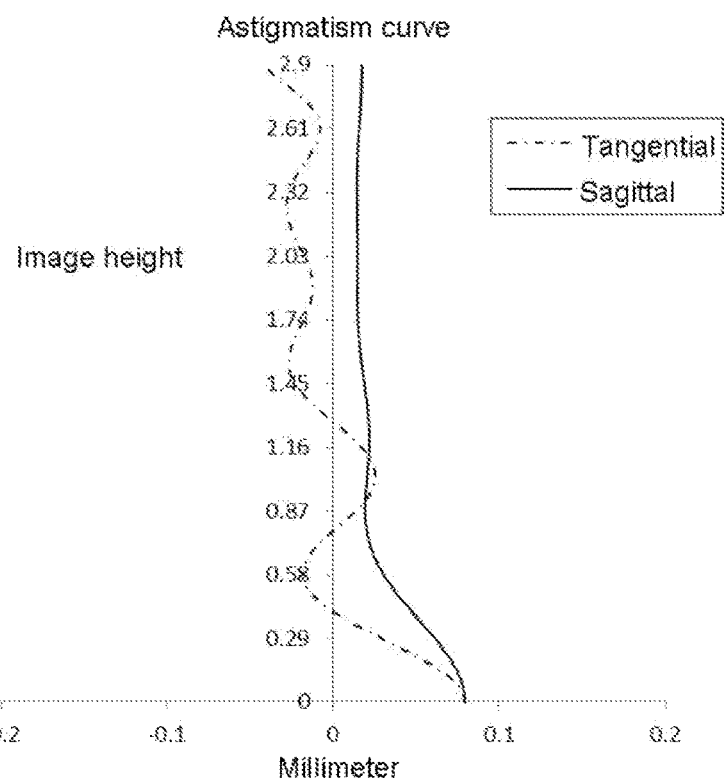
Figure 18C:
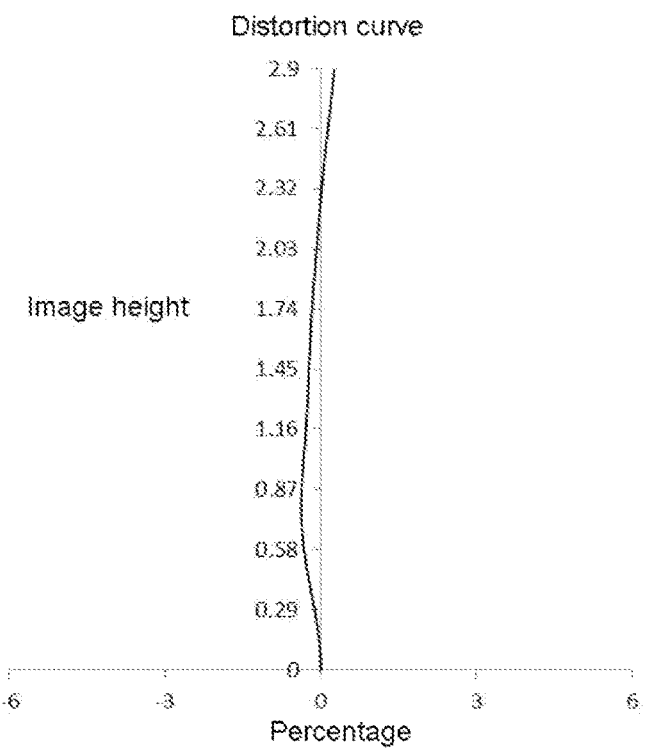
Figure 18D:
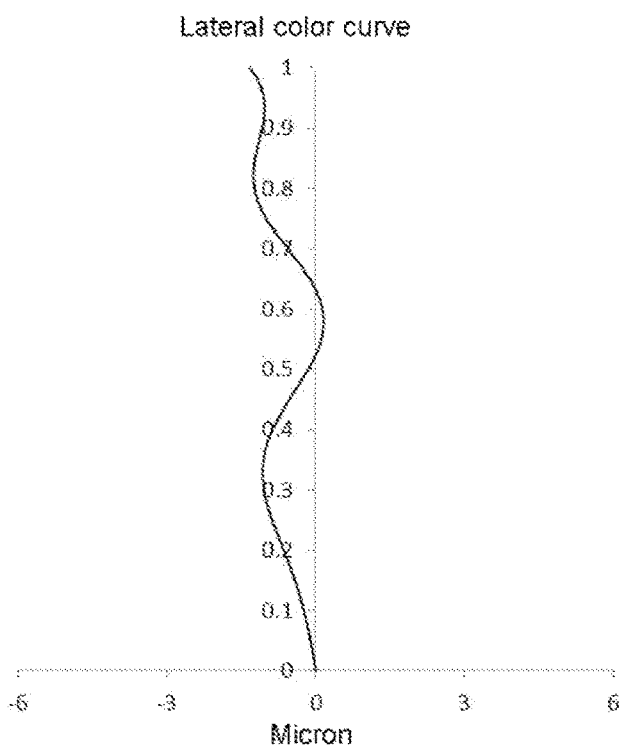

FIGS. 16A, 17A and 18A show longitudinal aberration curves of a zoom lens group in a wide-angle state, an intermediate state and a telephoto state according to embodiment 3 respectively to represent deviations of a convergence focal point after light of different wavelengths passes through the lens. FIGS. 16B, 17B and 18B show astigmatism curves of a zoom lens group in a wide-angle state, an intermediate state and a telephoto state according to embodiment 3 respectively to represent tangential image surface curvatures and sagittal image surface curvatures. FIGS. 16C, 17C and 18C show distortion curves of a zoom lens group in a wide-angle state, an intermediate state and a telephoto state according to embodiment 3 respectively to represent distortion values corresponding to different image heights. FIGS. 16D, 17D and 18D show lateral color curves of a zoom lens group in a wide-angle state, an intermediate state and a telephoto state according to embodiment 3 respectively to represent deviations of different image heights on the imaging surface after the light passes through the lens. According to FIGS. 16A to 18D, it can be seen that the zoom lens group provided in embodiment 3 may achieve high imaging quality in each state.

Embodiment 4

Figure 19:
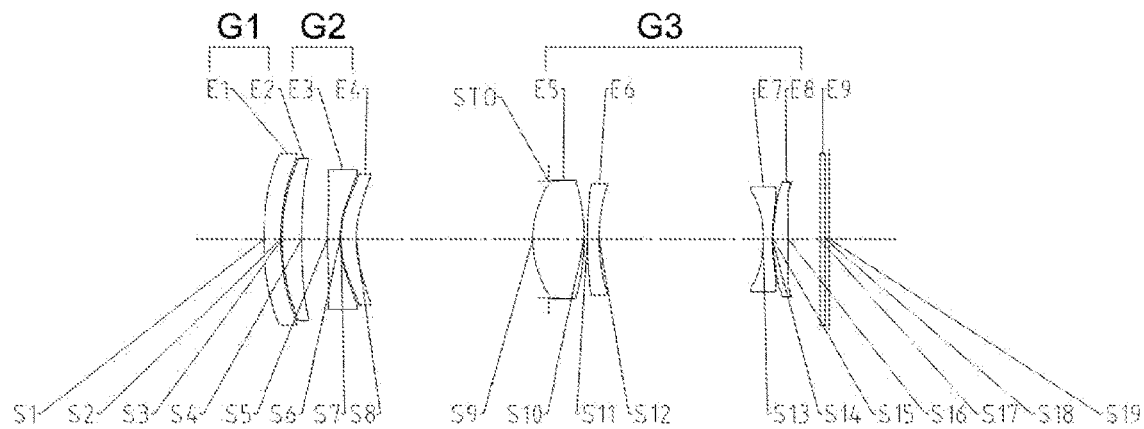
FIG. 19 shows a structure diagram of a zoom lens group in a wide-angle state according to embodiment 4 of the disclosure.
Figure 20:
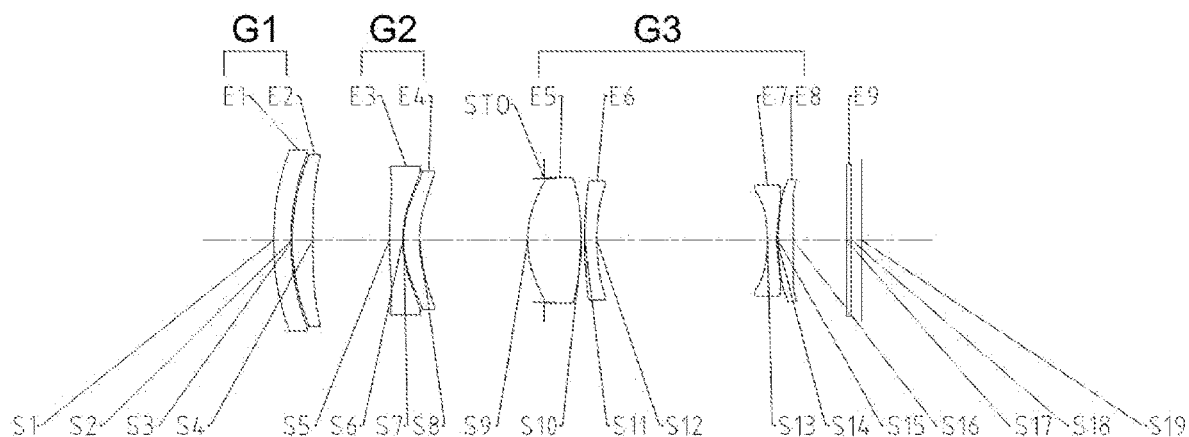
FIG. 20 shows a structure diagram of a zoom lens group in an intermediate state in a process of switching from a wide-angle state to a telephoto state according to embodiment 4 of the disclosure.
Figure 21:
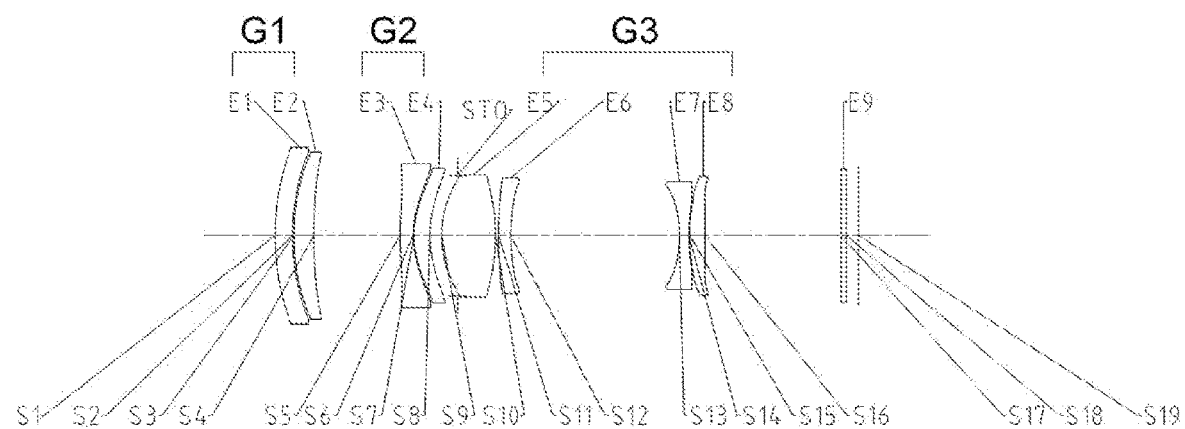
FIG. 21 shows a structure diagram of a zoom lens group in a telephoto state according to embodiment 4 of the disclosure.

A zoom lens group according to embodiment 4 of the disclosure will be described below with reference to FIGS. 19 to 24D. FIG. 19 shows a structure diagram of a zoom lens group in a wide-angle state according to embodiment 4 of the disclosure. FIG. 20 shows a structure diagram of a zoom lens group in an intermediate state in a process of switching from a wide-angle state to a telephoto state according to embodiment 4 of the disclosure. FIG. 21 shows a structure diagram of a zoom lens group in a telephoto state according to embodiment 4 of the disclosure.

As shown in FIGS. 19 to 21, the zoom lens group sequentially includes, from an object side to an image side, a first lens group G1 (a first lens E1 and a second lens E2), a second lens group G2 (a third lens E3 and a fourth lens E4), a diaphragm STO, a third lens group G3 (a fifth lens E5, a sixth lens E6, a seventh lens E7, and an eighth lens E8), an optical filter E9, and an imaging surface S19.

An object-side surface S1 of the first lens E1 is a convex surface, while an image-side surface S2 is a concave surface. An object-side surface S3 of the second lens E2 is a convex surface, while an image-side surface S4 is a concave surface. An object-side surface S5 of the third lens E3 is a convex surface, while an image-side surface S6 is a concave surface. An object-side surface S7 of the fourth lens E4 is a convex surface, while an image-side surface S8 is a concave surface. An object-side surface S9 of the fifth lens E5 is a convex surface, while an image-side surface S10 is a convex surface. The diaphragm STO may be arranged at the object-side surface S9 of the fifth lens E5. An object-side surface S11 of the sixth lens E6 is a convex surface, while an image-side surface S12 is a concave surface. An object-side surface S13 of the seventh lens E7 is a concave surface, while an image-side surface S14 is a concave surface. An object-side surface S15 of the eighth lens E8 is a convex surface, while an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

In the example, TTL is a total length of the zoom lens group, and TTL is 24.50 mm. ImgH is a half of a diagonal length of an effective pixel region on the imaging surface S19 of the zoom lens group, and ImgH is 2.90 mm.

Table 10 shows a basic parameter table of the zoom lens group of embodiment 4, and units of the curvature radius, the thickness/distance and the focal length are all millimeter (mm).

TABLE 10

| Surface number | Surface type | Curvature radius | Thickness/ distance | Material Refractive index | Material Abbe number | Conic coefficient |
|---|---|---|---|---|---|---|
| OBJ | Spherical | Infinite | Infinite | | | |
| S1 | Aspheric | 12.2949 | 0.7447 | 1.66 | 20.4 | 0.9100 |
| S2 | Aspheric | 10.6171 | 0.0500 | | | −0.0466 |

TABLE 10-continued

| Surface number | Surface type | Curvature radius | Thickness/ distance | Material Refractive index | Abbe number | Conic coefficient |
|---|---|---|---|---|---|---|
| S3 | Aspheric | 9.9441 | 0.8485 | 1.54 | 55.9 | 0.0380 |
| S4 | Aspheric | 27.8042 | D4 | | | 2.6604 |
| S5 | Aspheric | 12.5057 | 0.5500 | 1.69 | 53.0 | −33.6421 |
| S6 | Aspheric | 3.9878 | 0.0350 | | | −0.1647 |
| S7 | Aspheric | 3.9969 | 0.6619 | 1.66 | 20.4 | −0.6133 |
| S8 | Aspheric | 4.4800 | D8 | | | −1.5749 |
| STO | Spherical | Infinite | −0.6817 | | | |
| S9 | Aspheric | 4.3178 | 2.2600 | 1.50 | 81.4 | 0.0899 |
| S10 | Aspheric | −7.9322 | 0.1351 | | | 1.9023 |
| S11 | Aspheric | 16.8757 | 0.5032 | 1.67 | 19.2 | 25.9893 |
| S12 | Aspheric | 7.7759 | 7.0922 | | | 0.9955 |
| S13 | Aspheric | −6.8626 | 0.4000 | 1.54 | 55.9 | 8.3218 |
| S14 | Aspheric | 6.1592 | 0.0420 | | | −3.8639 |
| S15 | Aspheric | 6.9498 | 0.6387 | 1.67 | 19.2 | −0.3256 |
| S16 | Aspheric | 57.4287 | D17 | | | 47.9165 |
| S17 | Spherical | Infinite | 0.2100 | 1.52 | 64.2 | |
| S18 | Spherical | Infinite | D19 | | | |
| S19 | Spherical | Infinite | | | | |

In the example, positions of the second lens group, the third lens group and the optical filter may be changed to implement continuous zoom of the zoom lens group. In other words, a spacing distance D4 of the first lens group and the second lens group on an optical axis (i.e., a spacing distance from the image-side surface of the second lens E2 to the object-side surface of the third lens E3 on the optical axis), a spacing distance D8 of the second lens group and the third lens group on the optical axis (i.e., a spacing distance from the image-side surface of the fourth lens E4 to the image-side surface of the fifth lens E5 on the optical axis), a spacing distance D17 of the third lens group and the optical filter on the optical axis (i.e., a spacing distance from the image-side surface of the eighth lens E8 to the object-side surface of the optical filter E9 on the optical axis) and a spacing distance D19 of the optical filter and the imaging surface on the optical axis (i.e., a spacing distance from the image-side surface of the optical filter E9 to the imaging surface S19 on the optical axis) are changed to switch the zoom lens group from the wide-angle state to the telephoto state or from the telephoto state to the wide-angle state. A total effective focal length F, maximum field of view (FOV) and F-number (Fno) of the zoom lens group are changed as the zoom lens group is switched from the wide-angle state to the telephoto state or from the telephoto state to the wide-angle state.

Table 11 shows a parameter table changed according to different states of the zoom lens group according to embodiment 4. The units of F, D4, D8, D17 and D19 are all millimeter (mm), and the unit of FOV is degree (°).

TABLE 11

| | F | FOV | Fno | D4 | D8 | D17 | D19 |
|---|---|---|---|---|---|---|---|
| Wide-angle state | 10.17 | 33.2 | 2.67 | 1.11 | 7.64 | 1.39 | 0.19 |
| Intermediate state | 14.48 | 22.6 | 3.06 | 3.19 | 4.50 | 2.21 | 0.43 |
| Telephoto state | 26.00 | 12.8 | 4.39 | 3.61 | 0.49 | 5.71 | 0.52 |

Table 12 shows high-order coefficients that can be used for each aspheric mirror surface in embodiment 4. A surface type of each aspheric surface may be defined by the formula (1) given in embodiment 1.

TABLE 12

| Surface number | A4 | A6 | A8 | A10 | A12 |
|---|---|---|---|---|---|
| S1 | 5.7827E−04 | −6.2476E−04 | 5.7895E−04 | −2.9901E−04 | 1.0765E−04 |
| S2 | 7.2538E−03 | −1.0993E−02 | 9.9754E−03 | −5.8456E−03 | 2.4213E−03 |
| S3 | 8.1869E−03 | −1.2106E−02 | 1.1323E−02 | −6.9977E−03 | 3.0643E−03 |
| S4 | −1.9466E−04 | 1.4731E−03 | −1.2610E−03 | 5.9386E−04 | −1.5287E−04 |
| S5 | −4.6275E−03 | 3.0449E−04 | −1.8568E−05 | 8.6069E−07 | 0.0000E+00 |
| S6 | −5.3360E−03 | −3.5780E−04 | 3.3739E−05 | −2.3160E−08 | −7.5847E−08 |
| S7 | −3.4649E−03 | 2.2004E−03 | −2.9824E−03 | 1.5562E−03 | −1.0768E−05 |
| S8 | −7.1503E−03 | 5.7926E−03 | −8.2853E−03 | 7.8165E−03 | −4.8065E−03 |
| S9 | −1.0267E−03 | −4.3480E−05 | −1.0800E−05 | 3.3996E−07 | −2.7318E−08 |
| S10 | 3.3026E−03 | −6.5185E−04 | 1.3274E−04 | −1.3726E−05 | 5.8974E−07 |
| S11 | −4.1193E−03 | 5.5384E−03 | −1.4622E−02 | 2.4354E−02 | −2.6463E−02 |
| S12 | −4.9237E−03 | 1.0451E−02 | −3.2420E−02 | 6.4329E−02 | −8.1834E−02 |
| S13 | 4.9955E−03 | −4.5858E−02 | 1.3551E−01 | −2.4581E−01 | 2.8490E−01 |
| S14 | −2.7824E−02 | 4.5211E−02 | 2.7891E−02 | −2.0437E−01 | 3.1101E−01 |
| S15 | −3.5226E−02 | 5.8124E−02 | −1.4064E−03 | −1.6427E−01 | 2.9207E−01 |
| S16 | −1.6465E−02 | 2.1663E−02 | −2.2648E−02 | 3.6070E−03 | 1.9665E−02 |

TABLE 12-continued

| Surface number | A14 | A16 | A18 | A20 |
|---|---|---|---|---|
| S1 | −2.8840E−05 | 5.8183E−06 | −8.7949E−07 | 9.8359E−08 |
| S2 | −7.3982E−04 | 1.6882E−04 | −2.8690E−05 | 3.5914E−06 |
| S3 | −9.8563E−04 | 2.3515E−04 | −4.1480E−05 | 5.3564E−06 |
| S4 | 8.9296E−06 | 8.0966E−06 | −3.2334E−06 | 6.4441E−07 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |
| S7 | −4.8828E−04 | 3.3131E−04 | −1.2167E−04 | 2.8783E−05 |
| S8 | 1.9903E−03 | −5.6144E−04 | 1.0629E−04 | −1.2647E−05 |
| S9 | 0.0000E+00 | 0.0000E+00 | 0.0000E+00 | 0.0000E+00 |
| S10 | 0.0000E+00 | 0.0000E+00 | 0.0000E+00 | 0.0000E+00 |
| S11 | 1.9580E−02 | −1.0146E−02 | 3.7441E−03 | −9.8904E−04 |
| S12 | 7.0037E−02 | −4.1687E−02 | 1.7595E−02 | −5.3024E−03 |
| S13 | −2.2192E−01 | 1.2010E−01 | −4.5955E−02 | 1.2494E−02 |
| S14 | −2.5686E−01 | 1.3363E−01 | −4.5801E−02 | 1.0321E−02 |
| S15 | −2.7041E−01 | 1.5930E−01 | −6.3828E−02 | 1.7837E−02 |
| S16 | −2.5471E−02 | 1.6613E−02 | −6.8168E−03 | 1.8736E−03 |

Figure 22A:
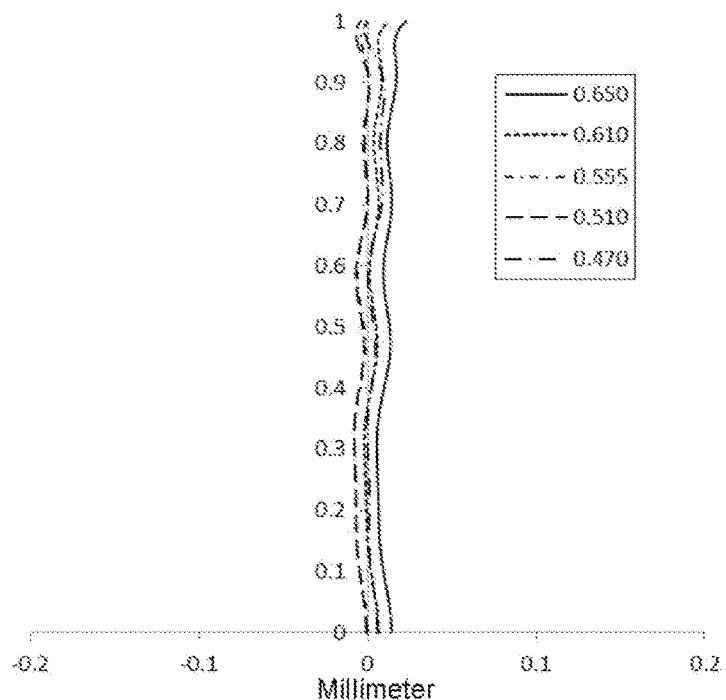
FIGS. 22A to 22D show a longitudinal aberration curve, an astigmatism curve, a distortion curve and a lateral color curve of a zoom lens group in a wide-angle state according to embodiment 4 respectively.
Figure 22B:
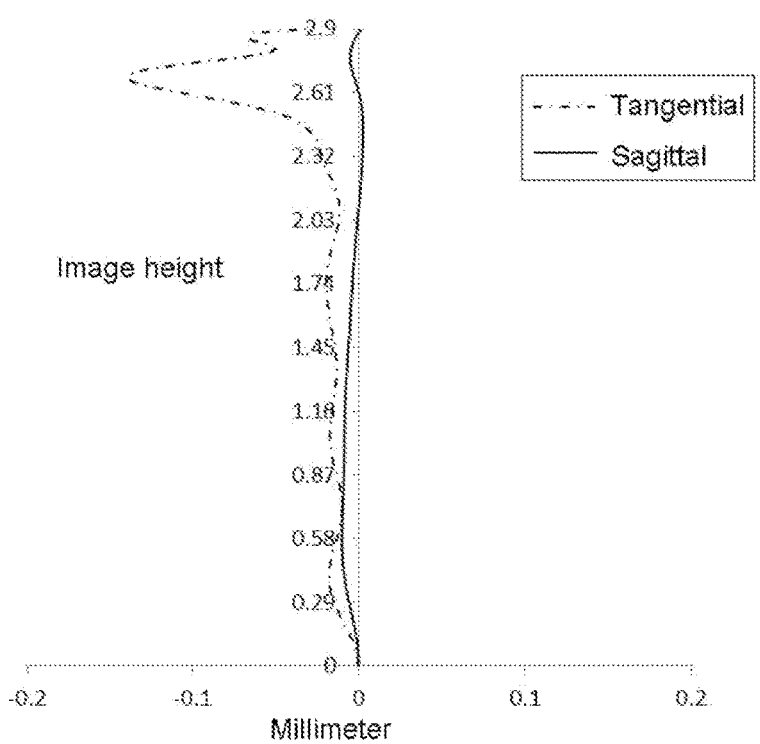
Figure 22C:
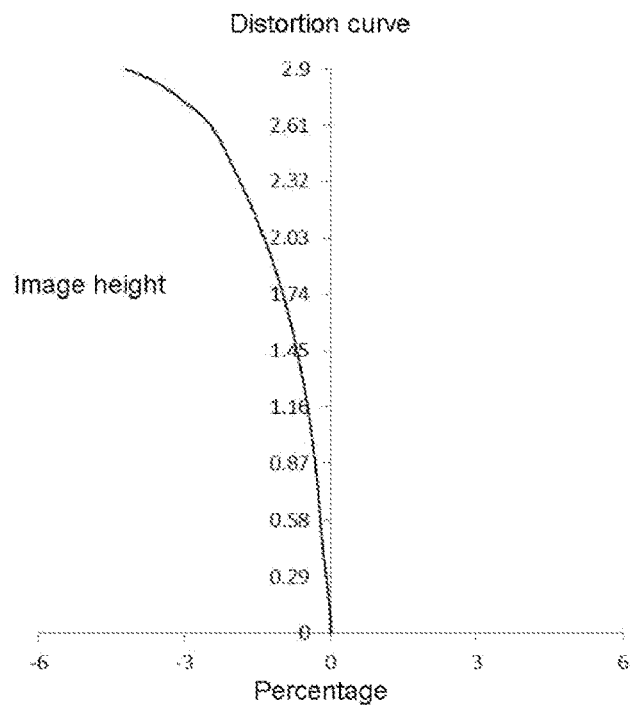
Figure 22D:
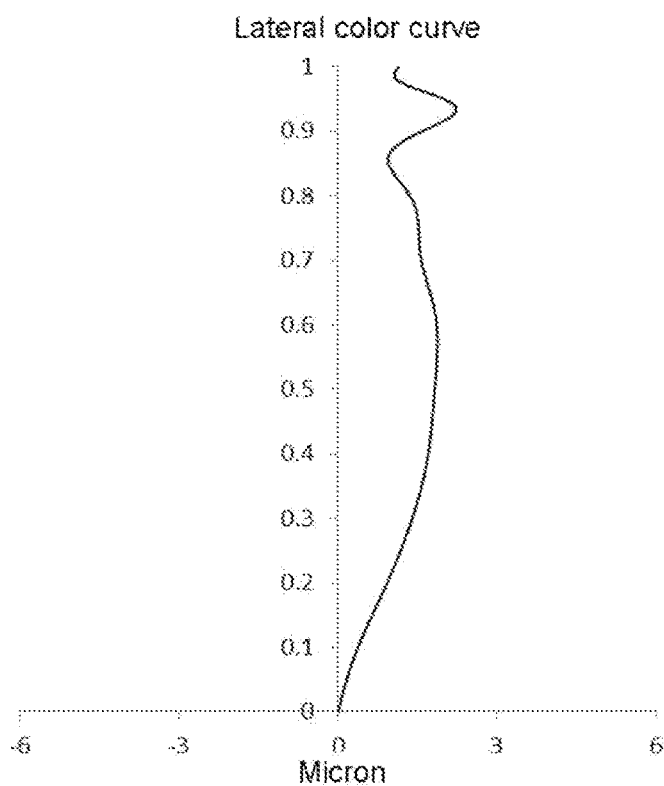
Figure 23A:
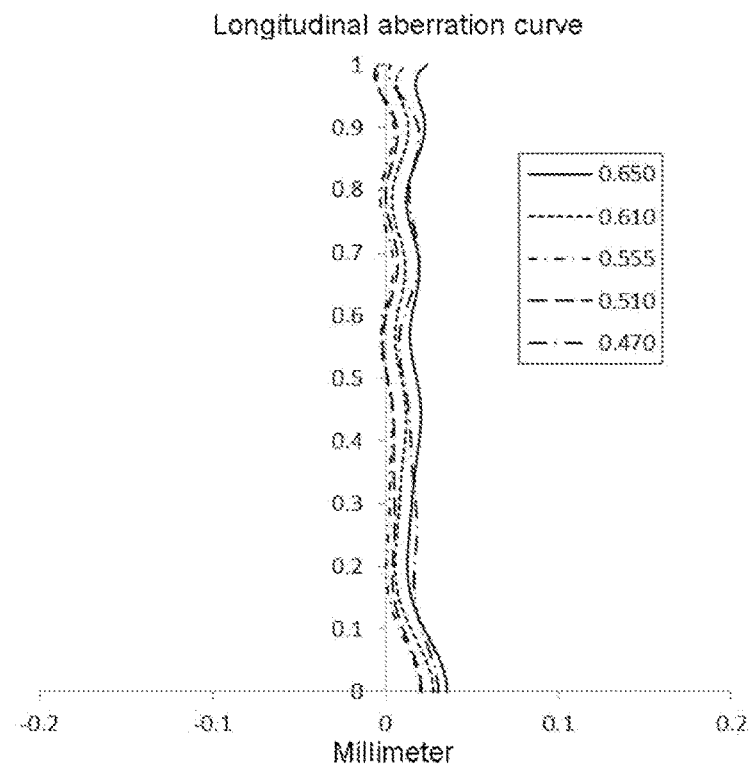
FIGS. 23A to 23D show a longitudinal aberration curve, an astigmatism curve, a distortion curve and a lateral color curve of a zoom lens group in an intermediate state in a process of switching from a wide-angle state to a telephoto state according to embodiment 4 respectively.
Figure 23B:
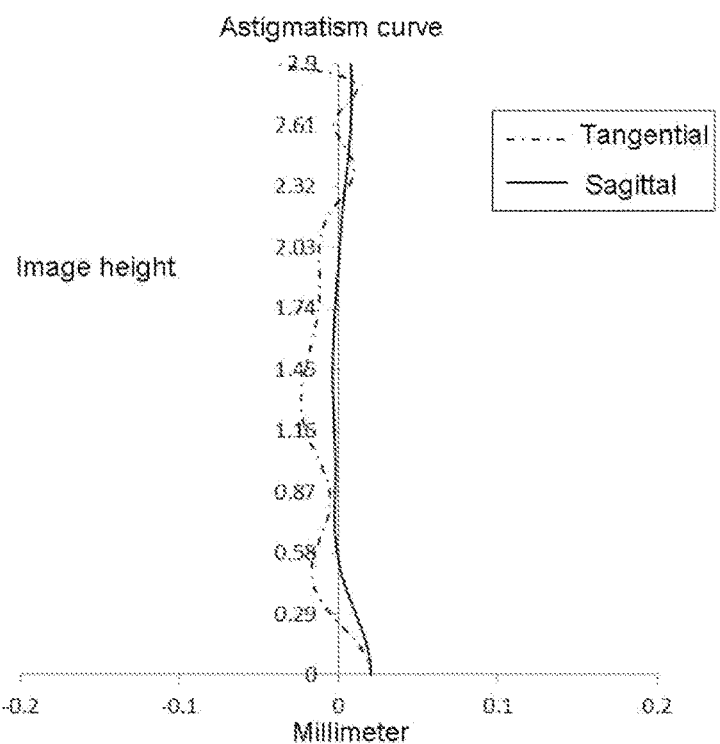
Figure 23C:
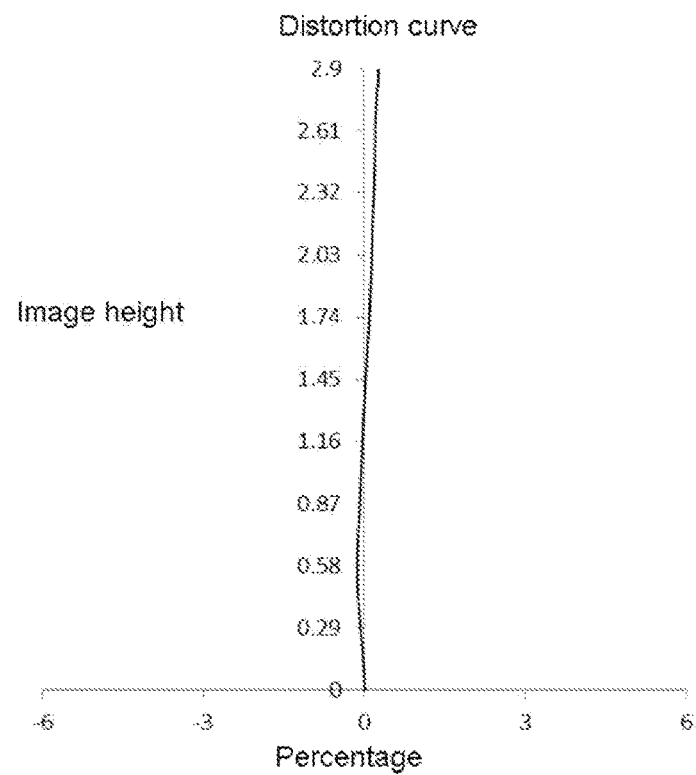
Figure 23D:
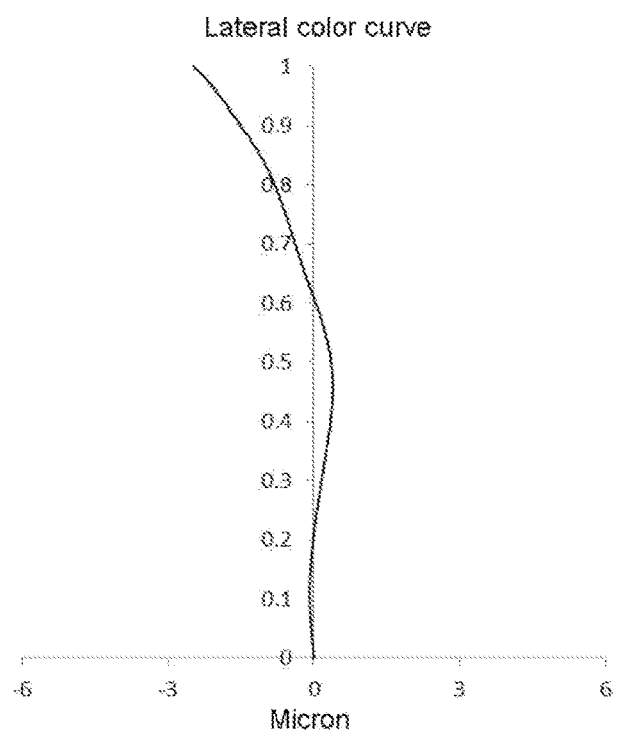
Figure 24A:
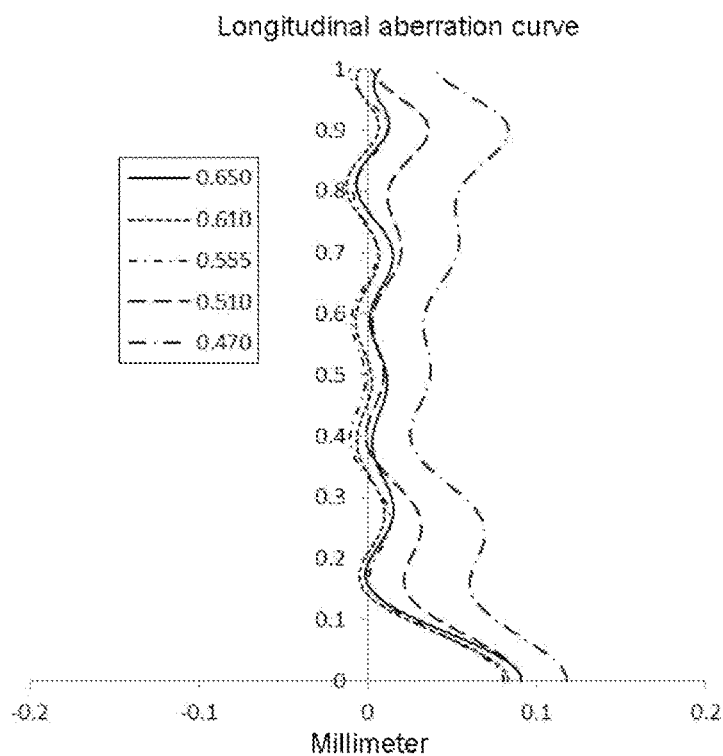
FIGS. 24A to 24D show a longitudinal aberration curve, an astigmatism curve, a distortion curve and a lateral color curve of a zoom lens group in a telephoto state according to embodiment 4 respectively.
Figure 24B:
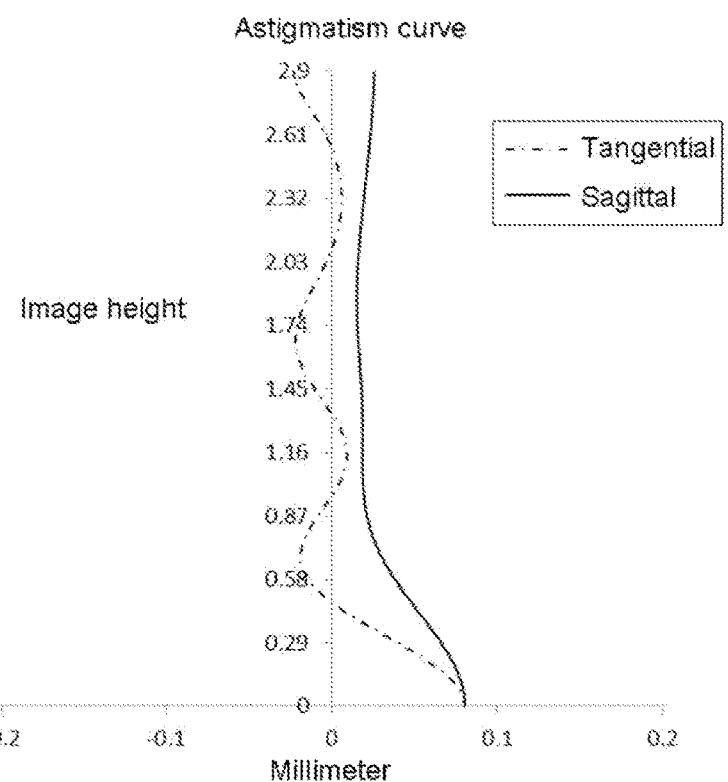
Figure 24C:
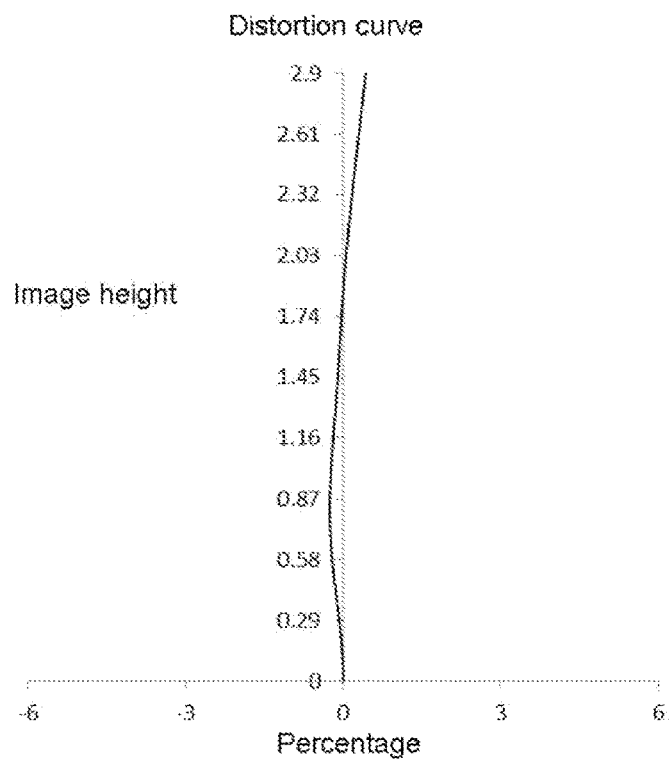
Figure 24D:
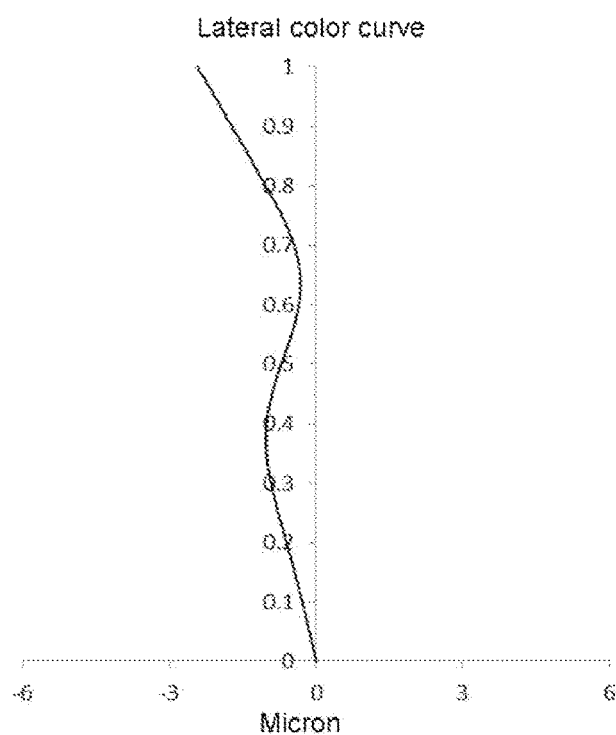

FIGS. 22A, 23A and 24A show longitudinal aberration curves of a zoom lens group in a wide-angle state, an intermediate state and a telephoto state according to embodiment 4 respectively to represent deviations of a convergence focal point after light of different wavelengths passes through the lens. FIGS. 22B, 23B and 24B show astigmatism curves of a zoom lens group in a wide-angle state, an intermediate state and a telephoto state according to embodiment 4 respectively to represent tangential image surface curvatures and sagittal image surface curvatures. FIGS. 22C, 23C and 24C show distortion curves of a zoom lens group in a wide-angle state, an intermediate state and a telephoto state according to embodiment 4 respectively to represent distortion values corresponding to different image heights. FIGS. 22D, 23D and 24D show lateral color curves of a zoom lens group in a wide-angle state, an intermediate state and a telephoto state according to embodiment 4 respectively to represent deviations of different image heights on the imaging surface after the light passes through the lens. According to FIGS. 22A to 24D, it can be seen that the zoom lens group provided in embodiment 4 may achieve high imaging quality in each state.

Embodiment 5

Figure 25:
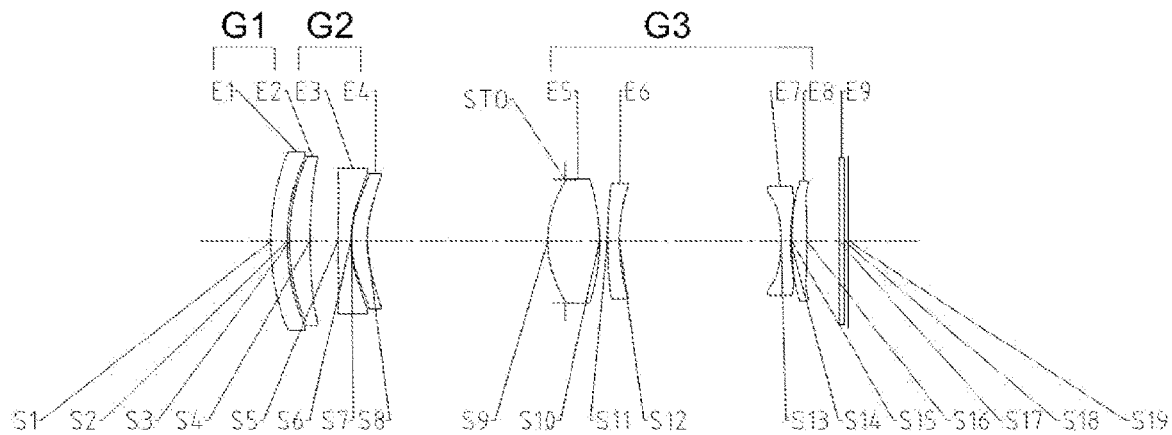
FIG. 25 shows a structure diagram of a zoom lens group in a wide-angle state according to embodiment 5 of the disclosure.
Figure 26:
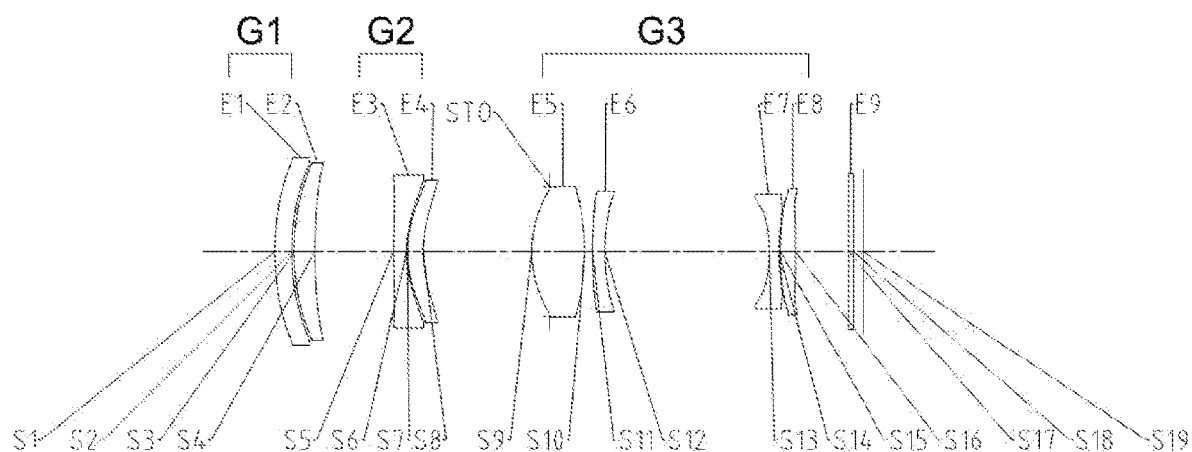
FIG. 26 shows a structure diagram of a zoom lens group in an intermediate state in a process of switching from a wide-angle state to a telephoto state according to embodiment 5 of the disclosure.
Figure 27:
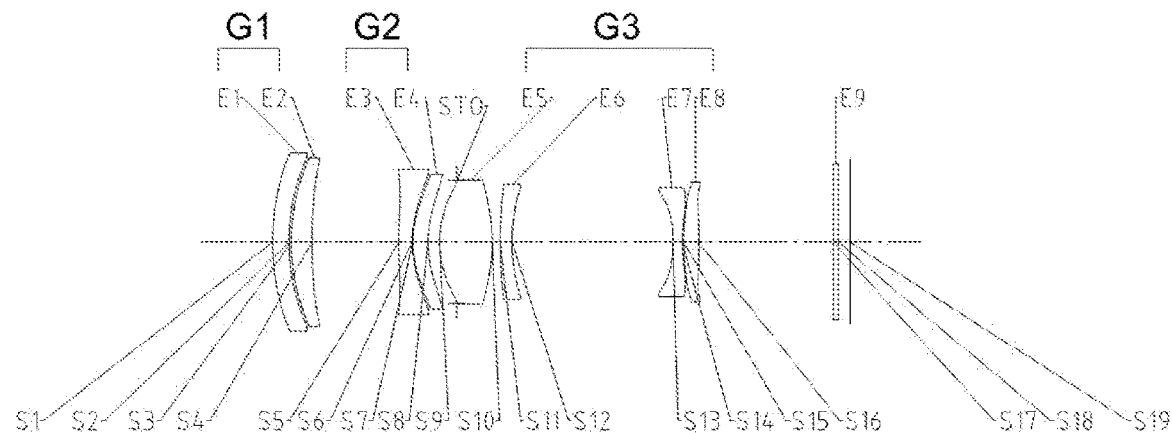
FIG. 27 shows a structure diagram of a zoom lens group in a telephoto state according to embodiment 5 of the disclosure.

A zoom lens group according to embodiment 5 of the disclosure will be described below with reference to FIGS. 25 to 30D. FIG. 25 shows a structure diagram of a zoom lens group in a wide-angle state according to embodiment 5 of the disclosure. FIG. 26 shows a structure diagram of a zoom lens group in an intermediate state in a process of switching from a wide-angle state to a telephoto state according to embodiment 5 of the disclosure. FIG. 27 shows a structure diagram of a zoom lens group in a telephoto state according to embodiment 5 of the disclosure.

As shown in FIGS. 25 to 27, the zoom lens group sequentially includes, from an object side to an image side, a first lens group G1 (a first lens E1 and a second lens E2), a second lens group G2 (a third lens E3 and a fourth lens E4), a diaphragm STO, a third lens group G3 (a fifth lens E5, a sixth lens E6, a seventh lens E7, and an eighth lens E8), an optical filter E9, and an imaging surface S19.

An object-side surface S1 of the first lens E1 is a convex surface, while an image-side surface S2 is a concave surface. An object-side surface S3 of the second lens E2 is a convex surface, while an image-side surface S4 is a concave surface. An object-side surface S5 of the third lens E3 is a convex surface, while an image-side surface S6 is a concave surface. An object-side surface S7 of the fourth lens E4 is a convex surface, while an image-side surface S8 is a concave surface. An object-side surface S9 of the fifth lens E5 is a convex surface, while an image-side surface S10 is a convex surface. The diaphragm STO may be arranged at the object-side surface S9 of the fifth lens E5. An object-side surface S11 of the sixth lens E6 is a convex surface, while an image-side surface S12 is a concave surface. An object-side surface S13 of the seventh lens E7 is a concave surface, while an image-side surface S14 is a concave surface. An object-side surface S15 of the eighth lens E8 is a convex surface, while an image-side surface S16 is a convex surface. The optical filter E9 has an object-side surface S17 and an image-side surface S18. Light from an object sequentially penetrates through each of the surfaces S1 to S18 and is finally imaged on the imaging surface S19.

In the example, TTL is a total length of the zoom lens group, and TTL is 24.47 mm. ImgH is a half of a diagonal length of an effective pixel region on the imaging surface S19 of the zoom lens group, and ImgH is 2.90 mm.

Table 13 shows a basic parameter table of the zoom lens group of embodiment 5, and units of the curvature radius, the thickness/distance and the focal length are all millimeter (mm).

TABLE 13

| Surface number | Surface type | Curvature radius | Thickness/ distance | Material Refractive index | Abbe number | Conic coefficient |
|---|---|---|---|---|---|---|
| OBJ | Spherical | Infinite | Infinite | | | |
| S1 | Aspheric | 10.8936 | 0.7180 | 1.66 | 20.4 | 0.6760 |
| S2 | Aspheric | 9.9186 | 0.0999 | | | 0.3746 |
| S3 | Aspheric | 9.9186 | 0.8682 | 1.54 | 55.9 | 0.3746 |

TABLE 13-continued

| Surface number | Surface type | Curvature radius | Thickness/ distance | Material Refractive index | Abbe number | Conic coefficient |
|---|---|---|---|---|---|---|
| S4 | Aspheric | 24.4776 | D4 | | | 20.6228 |
| S5 | Aspheric | 17.8571 | 0.5500 | 1.69 | 53.0 | −54.8010 |
| S6 | Aspheric | 4.5106 | 0.0350 | | | 0.1395 |
| S7 | Aspheric | 4.2916 | 0.6500 | 1.66 | 20.4 | −0.4940 |
| S8 | Aspheric | 4.7573 | D8 | | | −1.4625 |
| STO | Spherical | Infinite | −0.7404 | | | |
| S9 | Aspheric | 4.3315 | 2.2200 | 1.50 | 81.4 | 0.0563 |
| S10 | Aspheric | −7.6926 | 0.3388 | | | 1.7370 |
| S11 | Aspheric | 15.9884 | 0.5000 | 1.67 | 19.2 | 24.1904 |
| S12 | Aspheric | 7.3163 | 6.8305 | | | 0.6728 |
| S13 | Aspheric | −6.7539 | 0.4000 | 1.54 | 55.9 | 8.2845 |
| S14 | Aspheric | 5.9043 | 0.0577 | | | −6.7502 |
| S15 | Aspheric | 7.5984 | 0.6355 | 1.67 | 19.2 | −1.6111 |
| S16 | Aspheric | −340.6584 | D17 | | | 99.0000 |
| S17 | Spherical | Infinite | 0.2100 | 1.52 | 64.2 | |
| S18 | Spherical | Infinite | D19 | | | |
| S19 | Spherical | Infinite | | | | |

In the example, positions of the second lens group, the third lens group and the optical filter may be changed to implement continuous zoom of the zoom lens group. In other words, a spacing distance D4 of the first lens group and the second lens group on an optical axis (i.e., a spacing distance from the image-side surface of the second lens E2 to the object-side surface of the third lens E3 on the optical axis), a spacing distance D8 of the second lens group and the third lens group on the optical axis (i.e., a spacing distance from the image-side surface of the fourth lens E4 to the image-side surface of the fifth lens E5 on the optical axis), a spacing distance D17 of the third lens group and the optical filter on the optical axis (i.e., a spacing distance from the image-side surface of the eighth lens E8 to the object-side surface of the optical filter E9 on the optical axis) and a spacing distance D19 of the optical filter and the imaging surface on the optical axis (i.e., a spacing distance from the image-side surface of the optical filter E9 to the imaging surface S19 on the optical axis) are changed to switch the zoom lens group from the wide-angle state to the telephoto state or from the telephoto state to the wide-angle state. A total effective focal length F, maximum field of view (FOV) and F-number (Fno) of the zoom lens group are changed as the zoom lens group is switched from the wide-angle state to the telephoto state or from the telephoto state to the wide-angle state.

Table 14 shows a parameter table changed according to different states of the zoom lens group according to embodiment 5. The units of F, D4, D8, D17 and D19 are all millimeter (mm), and the unit of FOV is degree (°).

TABLE 14

| | F | FOV | Fno | D4 | D8 | D17 | D19 |
|---|---|---|---|---|---|---|---|
| Wide-angle state | 10.17 | 33.3 | 2.63 | 1.18 | 7.63 | 1.37 | 0.18 |
| Intermediate state | 14.48 | 22.8 | 3.01 | 3.26 | 4.50 | 2.19 | 0.41 |
| Telephoto state | 26.00 | 12.8 | 4.33 | 3.68 | 0.48 | 5.69 | 0.51 |

Table 15 shows high-order coefficients that can be used for each aspheric mirror surface in embodiment 5. A surface type of each aspheric surface may be defined by the formula (1) given in embodiment 1.

TABLE 15

| Surface number | A4 | A6 | A8 | A10 | A12 |
|---|---|---|---|---|---|
| S1 | 2.2354E−03 | −2.5038E−03 | 1.6514E−03 | −6.1307E−04 | 1.2943E−04 |
| S2 | 1.4014E−02 | −1.9168E−02 | 1.3694E−02 | −5.6200E−03 | 1.3558E−03 |
| S3 | 1.4014E−02 | −1.9168E−02 | 1.3694E−02 | −5.6200E−03 | 1.3558E−03 |
| S4 | −2.5702E−04 | 1.0455E−03 | −1.0138E−03 | 6.1127E−04 | −2.4052E−04 |
| S5 | −4.4391E−03 | 3.3223E−04 | −1.7270E−05 | 6.1666E−07 | 0.0000E+00 |
| S6 | −4.2229E−03 | −3.3648E−04 | 3.5017E−05 | 4.1621E−07 | −1.7732E−07 |
| S7 | −2.8302E−03 | 2.4813E−03 | −3.4250E−03 | 2.0810E−03 | −4.6748E−04 |
| S8 | −6.4002E−03 | 6.4520E−03 | −9.7307E−03 | 9.5249E−03 | −6.1874E−03 |
| S9 | −1.0480E−03 | −7.3168E−05 | −8.2158E−06 | 7.4515E−07 | −1.0015E−07 |
| S10 | 3.4297E−03 | −6.6703E−04 | 1.3085E−04 | −1.3948E−05 | 5.7391E−07 |
| S11 | −3.9679E−03 | 5.3539E−03 | −1.2772E−02 | 1.9189E−02 | −1.9200E−02 |
| S12 | −5.3769E−03 | 1.3323E−03 | −3.9201E−02 | 7.3647E−02 | −9.0322E−02 |
| S13 | −7.1772E−05 | −2.8252E−02 | 9.5087E−02 | −1.9448E−01 | 2.5423E−01 |
| S14 | −8.2932E−02 | 3.1550E−01 | −5.5684E−01 | 4.9213E−01 | −1.8593E−01 |
| S15 | −8.4043E−02 | 2.9077E−01 | −4.9328E−01 | 4.0614E−01 | −1.0469E−01 |
| S16 | −2.6316E−02 | 6.5790E−02 | −1.2269E−01 | 1.3918E−01 | −1.0337E−01 |

| Surface number | A14 | A16 | A18 | A20 |
|---|---|---|---|---|
| S1 | −1.1866E−05 | −1.2421E−06 | 5.7220E−07 | −9.1602E−08 |
| S2 | −1.6448E−04 | −4.2969E−06 | 5.4171E−06 | −1.0336E−06 |

TABLE 15-continued

| | | | | |
|---|---|---|---|---|
| S3 | −1.6448E−04 | −4.2969E−06 | 5.4171E−06 | −1.0336E−06 |
| S4 | 6.3435E−05 | −1.1280E−05 | 1.3174E−06 | −9.0780E−08 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |
| S7 | −1.9958E−04 | 1.9883E−04 | −7.7897E−05 | 1.8477E−05 |
| S8 | 2.7906E−03 | −9.0171E−04 | 2.1278E−04 | −3.6964E−05 |
| S9 | 0.0000E+00 | 0.0000E+00 | 0.0000E+00 | 0.0000E+00 |
| S10 | 0.0000E+00 | 0.0000E+00 | 0.0000E+00 | 0.0000E+00 |
| S11 | 1.3323E−02 | −6.5652E−03 | 2.3285E−03 | −5.9619E−04 |
| S12 | 7.5514E−02 | −4.4311E−02 | 1.8556E−02 | −5.5729E−03 |
| S13 | −2.2453E−01 | 1.3864E−01 | −6.0992E−02 | 1.9262E−02 |
| S14 | −4.2882E−02 | 8.5297E−02 | −4.6253E−02 | 1.4359E−02 |
| S15 | −1.0283E−01 | 1.2121E−01 | −6.3199E−02 | 2.0339E−02 |
| S16 | 5.3422E−02 | −1.9983E−02 | 5.5524E−03 | −1.1613E−03 |

Figure 28A:
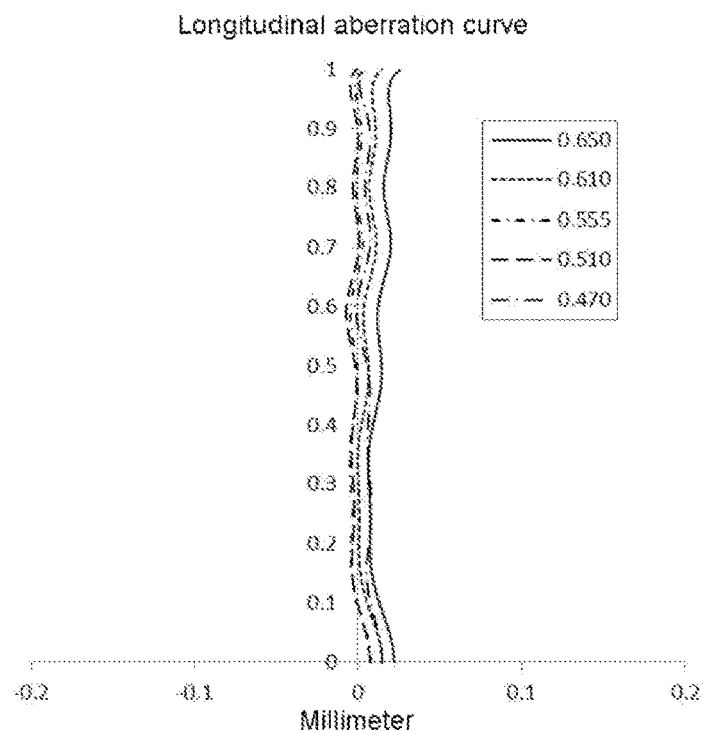
FIGS. 28A to 28D show a longitudinal aberration curve, an astigmatism curve, a distortion curve and a lateral color curve of a zoom lens group in a wide-angle state according to embodiment 5 respectively.
Figure 28B:
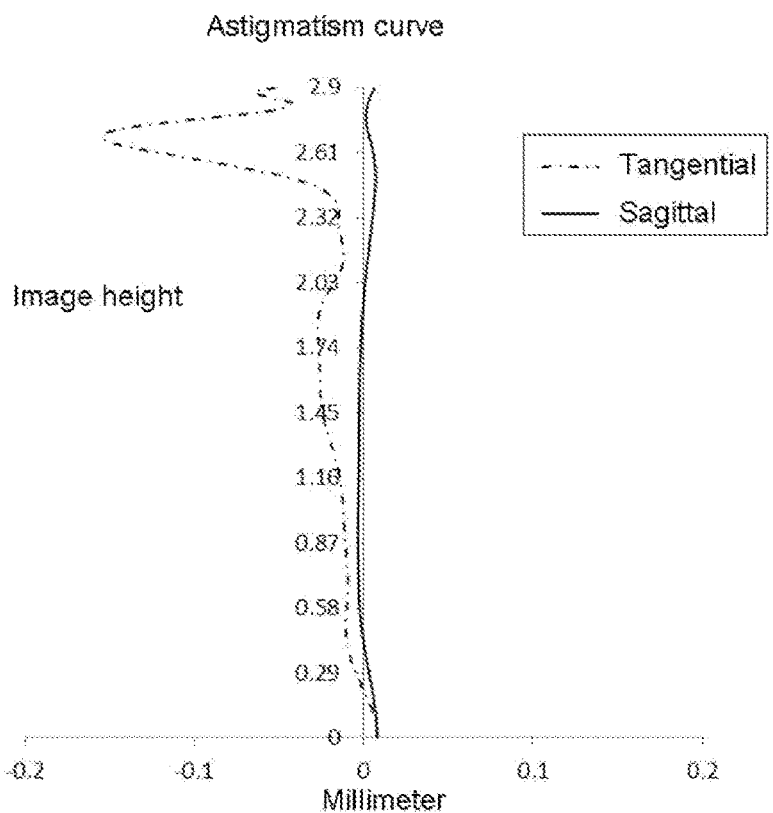
Figure 28C:
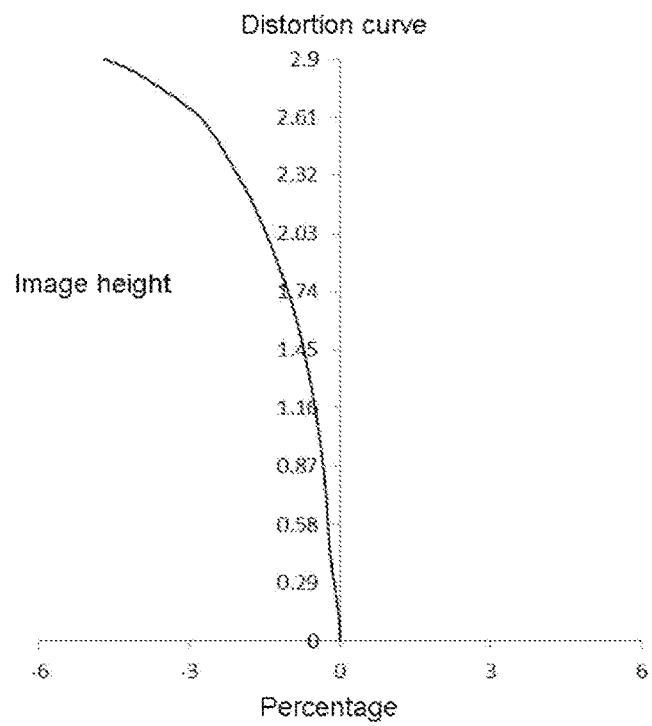
Figure 28D:
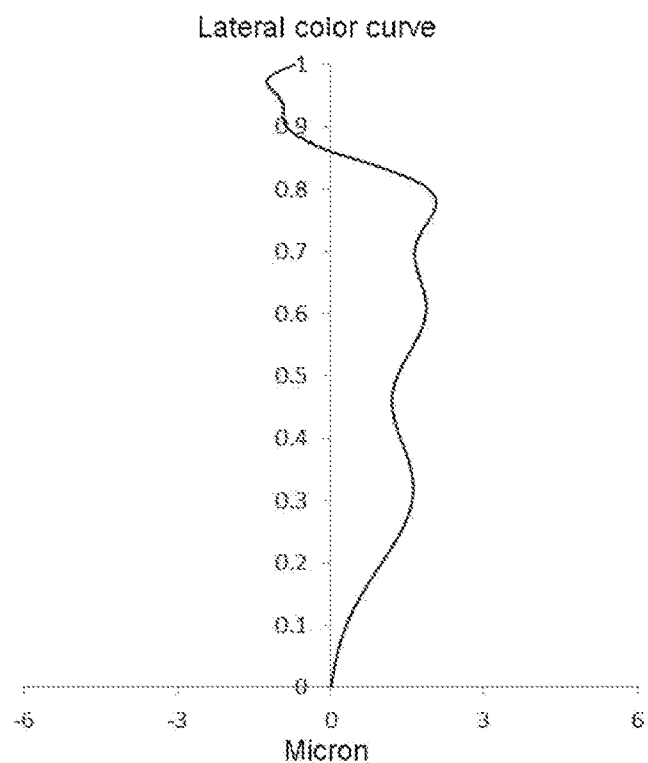
Figure 29A:
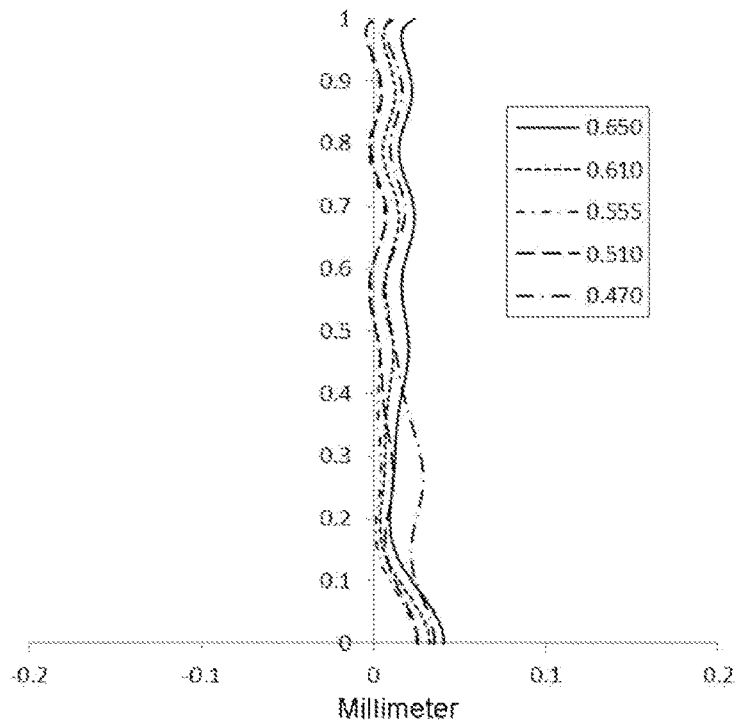
FIGS. 29A to 29D show a longitudinal aberration curve, an astigmatism curve, a distortion curve and a lateral color curve of a zoom lens group in an intermediate state in a process of switching from a wide-angle state to a telephoto state according to embodiment 5 respectively.
Figure 29B:
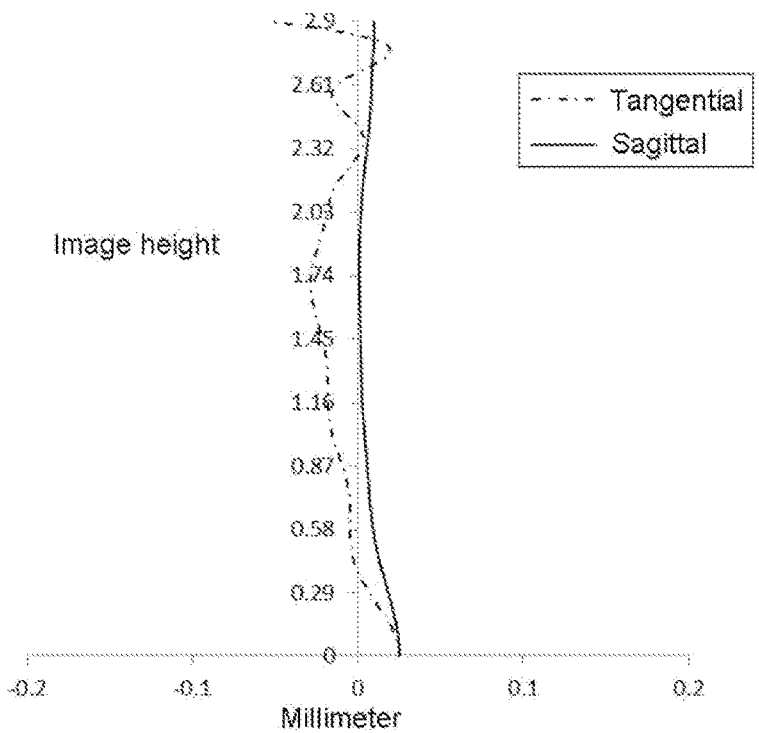
Figure 29C:
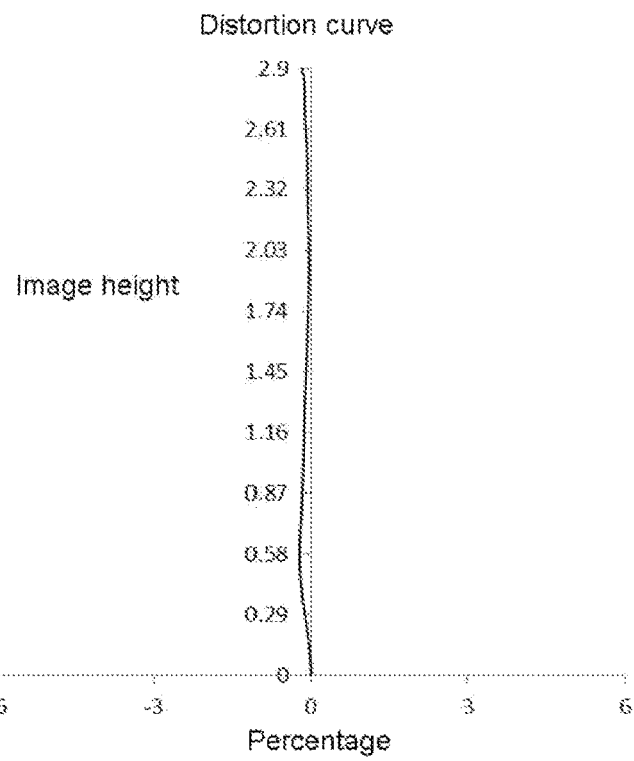
Figure 29D:
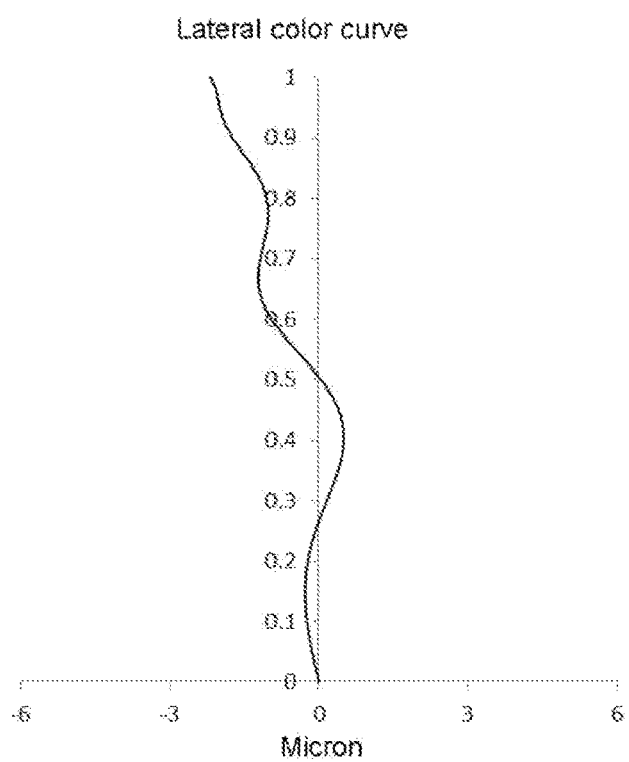
Figure 30A:
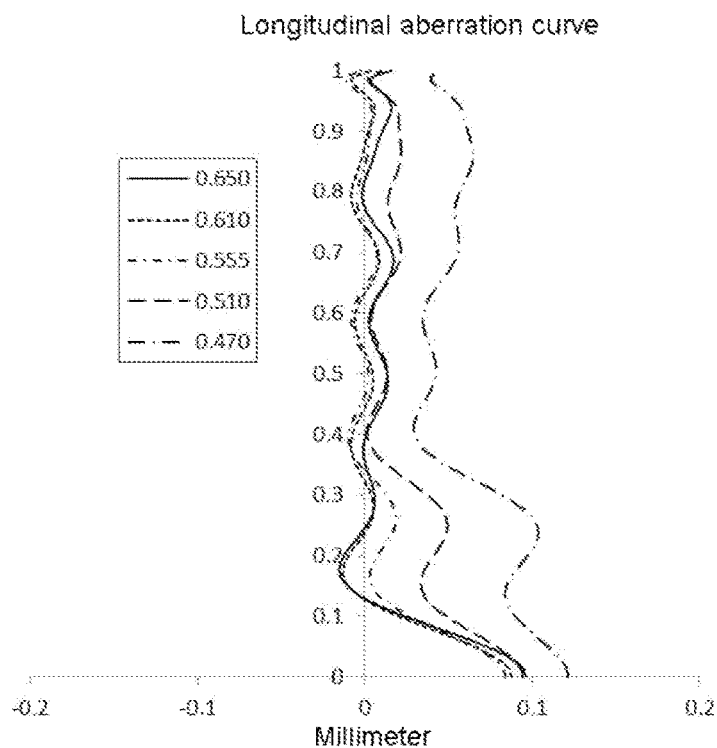
FIGS. 30A to 30D show a longitudinal aberration curve, an astigmatism curve, a distortion curve and a lateral color curve of a zoom lens group in a telephoto state according to embodiment 5 respectively.
Figure 30B:
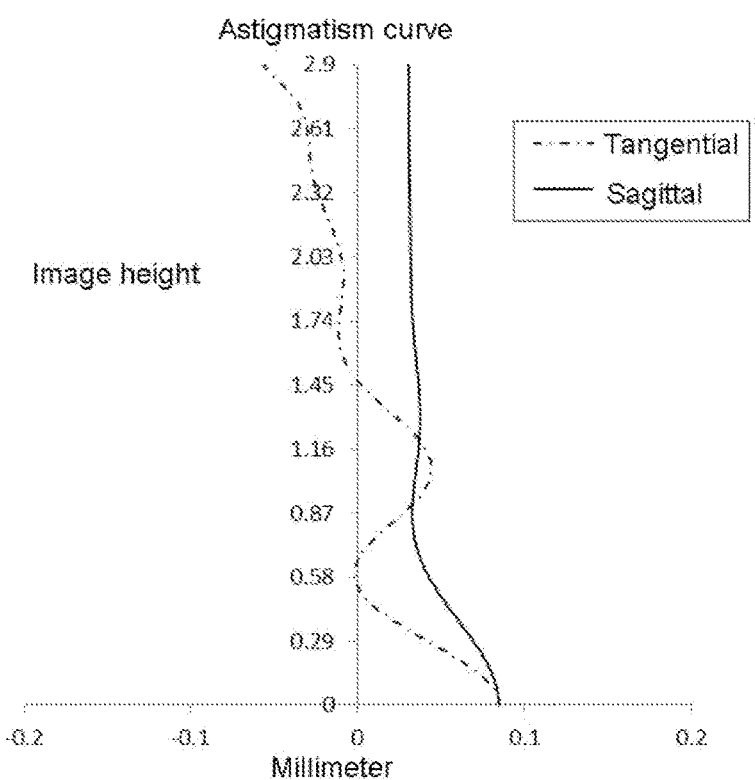
Figure 30C:
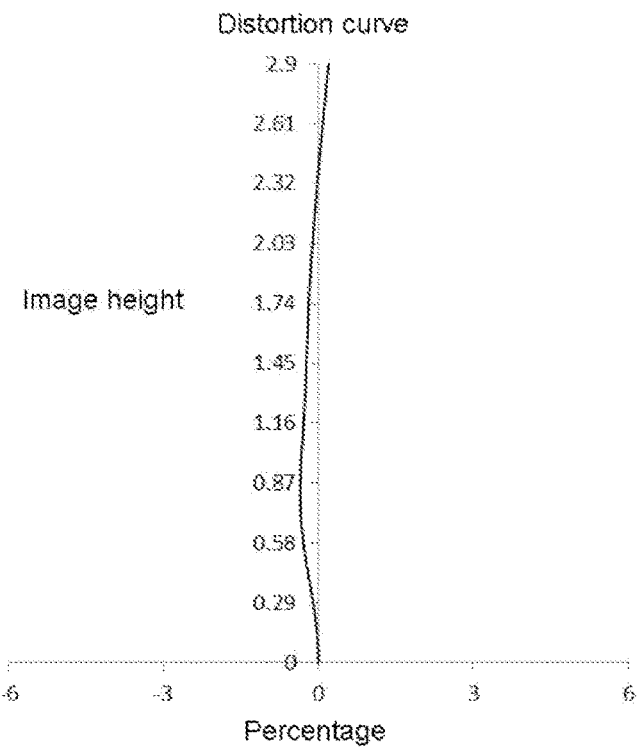
Figure 30D:
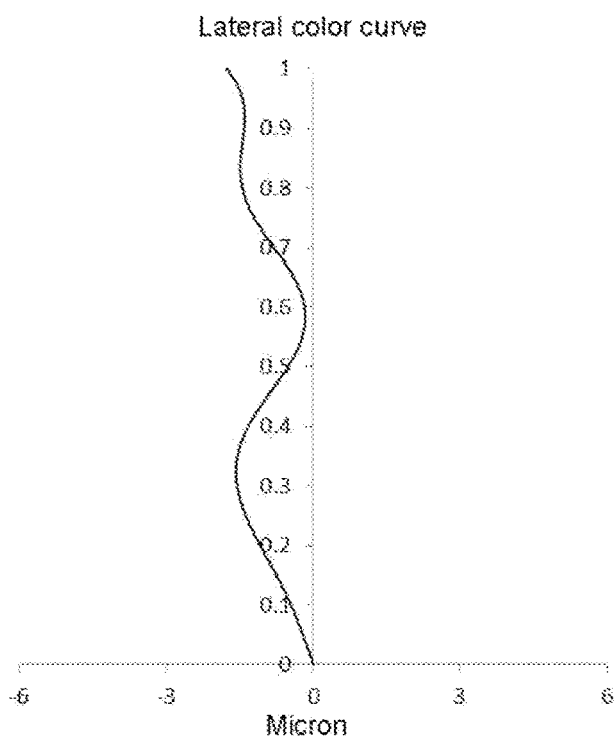

FIGS. 28A, 29A and 30A show longitudinal aberration curves of a zoom lens group in a wide-angle state, an intermediate state and a telephoto state according to embodiment 5 respectively to represent deviations of a convergence focal point after light of different wavelengths passes through the lens. FIGS. 28B, 29B and 30B show astigmatism curves of a zoom lens group in a wide-angle state, an intermediate state and a telephoto state according to embodiment 5 respectively to represent tangential image surface curvatures and sagittal image surface curvatures. FIGS. 28C, 29C and 30C show distortion curves of a zoom lens group in a wide-angle state, an intermediate state and a telephoto state according to embodiment 5 respectively to represent distortion values corresponding to different image heights. FIGS. 28D, 29D and 30D show lateral color curves of a zoom lens group in a wide-angle state, an intermediate state and a telephoto state according to embodiment 5 respectively to represent deviations of different image heights on the imaging surface after the light passes through the lens. According to FIGS. 28A to 30D, it can be seen that the zoom lens group provided in embodiment 5 may achieve high imaging quality in each state.

From the above, embodiment 1 to embodiment 5 meet a relationship shown in Table 16 respectively.

TABLE 16

| Conditional expression/ embodiment | 1 | 2 | 3 | 4 | 5 |
|---|---|---|---|---|---|
| F1/F3 | 5.33 | 5.34 | 5.26 | 5.43 | 5.35 |
| FT/FW | 2.58 | 2.56 | 2.56 | 2.56 | 2.56 |
| (FT + FM + FW)/f8 | 4.60 | 4.89 | 4.39 | 4.36 | 4.61 |
| (f2 − f1)/(f4 − f3) | 5.41 | 2.73 | 3.31 | 3.81 | 5.20 |
| (f5 + f6)/(f7 + f8) | −2.71 | −3.07 | −2.71 | −2.75 | −2.74 |
| T67/(CT5 + CT6 + CT7 + CT8) | 1.8 | 1.9 | 1.9 | 1.9 | 1.82 |
| (R3 + R4)/(R1 + R2) | 1.68 | 1.97 | 1.97 | 1.65 | 1.65 |
| (R5 + R6)/(R7 + R8) | 2.50 | 1.98 | 2.01 | 1.95 | 2.47 |
| TTL/F2 | −2.36 | −2.34 | −2.35 | −2.32 | −2.34 |
| (CT1 + CT2)/(CT3 + CT4) | 1.32 | 1.35 | 1.34 | 1.31 | 1.32 |

The disclosure also provides an imaging device, of which an electronic photosensitive element may be a Charge Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the above-mentioned zoom lens group.

The above description is only description about the preferred embodiments of the disclosure and adopted technical principles. It is understood by those skilled in the art that the scope of invention involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. A zoom lens group, sequentially comprising, from an object side to an image side along an optical axis:
   a first lens group with positive refractive power, comprising a first lens with refractive power and a second lens with refractive power, which are sequentially arranged along the optical axis;
   a second lens group with negative refractive power, comprising a third lens with negative refractive power and a fourth lens with refractive power, which are sequentially arranged along the optical axis; and
   a third lens group with positive refractive power, comprising a fifth lens with positive refractive power, a sixth lens with refractive power, a seventh lens with negative refractive power and an eighth lens with refractive power, which are sequentially arranged along the optical axis, wherein both an object-side surface and an image-side surface of the fifth lens are convex surfaces, and both an object-side surface and an image-side surface of the seventh lens are concave surfaces; and
   positions of the second lens group and the third lens group on the optical axis are adjustable, an effective focal length f1 of the first lens, an effective focal length f2 of the second lens, an effective focal length f3 of the third lens and an effective focal length f4 of the fourth lens meet $2.5 < (f2-f1)/(f4-f3) < 5.5$.

2. The zoom lens group according to claim 1, wherein a total effective focal length FT of the zoom lens group in a telephoto state, a total effective focal length FM of the zoom lens group in an intermediate state in a process of switching from a wide-angle state to the telephoto state, a total effective focal length FW of the zoom lens group in the wide-angle state and an effective focal length f8 of the eighth lens meet $4.2 < (FT+FM+FW)/f8 < 5.0$.

3. The zoom lens group according to claim 2, wherein an effective focal length F1 of the first lens group and an effective focal length F3 of the third lens group meet $5.0 < F1/F3 < 6.0$.

4. The zoom lens group according to claim 1, wherein an effective focal length f5 of the fifth lens, an effective focal length f6 of the sixth lens, an effective focal length f7 of the seventh lens and an effective focal length f8 of the eighth lens meet $-3.3<(f5+f6)/(f7+f8)<-2.3$.

5. The zoom lens group according to claim 1, wherein a center thickness CT5 of the fifth lens on the optical axis, a center thickness CT6 of the sixth lens on the optical axis, a center thickness CT7 of the seventh lens on the optical axis, a center thickness CT8 of the eighth lens on the optical axis and a spacing distance T67 of the sixth lens and the seventh lens on the optical axis meet $1.6<T67/(CT5+CT6+CT7+CT8)<2.1$.

6. The zoom lens group according to claim 1, wherein a curvature radius R3 of an object-side surface of the second lens, a curvature radius R4 of an image-side surface of the second lens, a curvature radius R1 of an object-side surface of the first lens and a curvature radius R2 of an image-side surface of the first lens meet $1.5<(R3+R4)/(R1+R2)<2.0$.

7. The zoom lens group according to claim 1, wherein a curvature radius R5 of an object-side surface of the third lens, a curvature radius R6 of an image-side surface of the third lens, a curvature radius R7 of an object-side surface of the fourth lens and a curvature radius R8 of an image-side surface of the fourth lens meet $1.7<(R5+R6)/(R7+R8)<2.7$.

8. The zoom lens group according to claim 1, wherein a center thickness CT1 of the first lens on the optical axis, a center thickness CT2 of the second lens on the optical axis, a center thickness CT3 of the third lens on the optical axis and a center thickness CT4 of the fourth lens on the optical axis meet $1.1<(CT1+CT2)/(CT3+CT4)<1.5$.

9. The zoom lens group according to claim 1, wherein TTL is a distance from an object-side surface of the first lens to an imaging surface of the zoom lens group, TTL and an effective focal length F2 of the second lens group meet $-2.5<TTL/F2<-2$.

10. The zoom lens group according to claim 1, wherein a total effective focal length FT of the zoom lens group in a telephoto state and a total effective focal length FW of the zoom lens group in a wide-angle state meet $2.0<FT/FW<3.0$.

11. The zoom lens group according to claim 1, wherein at least one of the first lens to the eighth lens is a glass lens; and
at least one of an object-side surface of the first lens to an image-side surface of the eighth lens is an aspheric mirror surface.

12. A zoom lens group, sequentially comprising, from an object side to an image side along an optical axis:
a first lens group with positive refractive power,
a second lens group with negative refractive power, and
a third lens group with positive refractive power,
wherein positions of the second lens group and the third lens group on the optical axis are adjustable; and
an effective focal length F1 of the first lens group and an effective focal length F3 of the third lens group meet $5.0<F1/F3<6.0$, the first lens group comprises a first lens with refractive power and a second lens with refractive power, which are sequentially arranged along the optical axis,
the second lens group comprises a third lens with negative refractive power and a fourth lens with refractive power, which are sequentially arranged along the optical axis,
an effective focal length f1 of the first lens, an effective focal length f2 of the second lens, an effective focal length f3 of the third lens and an effective focal length f4 of the fourth lens meet $2.5<(f2-f1)/(f4-f3)<5.5$.

13. The zoom lens group according to claim 12, wherein the third lens group comprises a fifth lens with positive refractive power, a sixth lens with refractive power, a seventh lens with negative refractive power and an eighth lens with refractive power, which are sequentially arranged along the optical axis, wherein both an object-side surface and an image-side surface of the fifth lens are convex surfaces, and both an object-side surface and an image-side surface of the seventh lens are concave surfaces.

14. The zoom lens group according to claim 13, wherein a total effective focal length FT of the zoom lens group in a telephoto state, a total effective focal length FM of the zoom lens group in an intermediate state in a process of switching from a wide-angle state to the telephoto state, a total effective focal length FW of the zoom lens group in the wide-angle state and an effective focal length f8 of the eighth lens meet $4.2<(FT+FM+FVV)/f8<5.0$.

15. The zoom lens group according to claim 13, wherein an effective focal length f5 of the fifth lens, an effective focal length f6 of the sixth lens, an effective focal length f7 of the seventh lens and an effective focal length f8 of the eighth lens meet $-3.3<(f5+f6)/(f7+f8)<-2.3$.

16. The zoom lens group according to claim 13, wherein a center thickness CT5 of the fifth lens on the optical axis, a center thickness CT6 of the sixth lens on the optical axis, a center thickness CT7 of the seventh lens on the optical axis, a center thickness CT8 of the eighth lens on the optical axis and a spacing distance T67 of the sixth lens and the seventh lens on the optical axis meet $1.6<T67/(CT5+CT6+CT7+CT8)<2.1$.

17. The zoom lens group according to claim 13, wherein a curvature radius R3 of an object-side surface of the second lens, a curvature radius R4 of an image-side surface of the second lens, a curvature radius R1 of an object-side surface of the first lens and a curvature radius R2 of an image-side surface of the first lens meet $1.5<(R3+R4)/(R1+R2)<2.0$.

18. The zoom lens group according to claim 13, wherein a curvature radius R5 of an object-side surface of the third lens, a curvature radius R6 of an image-side surface of the third lens, a curvature radius R7 of an object-side surface of the fourth lens and a curvature radius R8 of an image-side surface of the fourth lens meet $1.7<(R5+R6)/(R7+R8)<2.7$.

* * * * *